(12) United States Patent
Jang et al.

(10) Patent No.: US 12,368,940 B2
(45) Date of Patent: Jul. 22, 2025

(54) CAMERA ACTUATOR AND CAMERA MODULE COMPRISING SAME

(71) Applicant: LG INNOTEK CO., LTD., Seoul (KR)

(72) Inventors: Young Bae Jang, Seoul (KR); Chan Joong Kim, Seoul (KR); Jeung Ook Park, Seoul (KR); Sung Guk Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/644,869

(22) Filed: Apr. 24, 2024

(65) Prior Publication Data

US 2024/0284021 A1    Aug. 22, 2024

Related U.S. Application Data

(63) Continuation of application No. 17/756,704, filed as application No. PCT/KR2020/016561 on Nov. 23, 2020, now Pat. No. 12,003,834.

(30) Foreign Application Priority Data

Nov. 29, 2019   (KR) .................. 10-2019-0157000
Dec. 18, 2019   (KR) .................. 10-2019-0169845

(51) Int. Cl.
  *H04N 23/51*   (2023.01)
  *H04N 23/54*   (2023.01)
  *H04N 23/68*   (2023.01)

(52) U.S. Cl.
  CPC ............. *H04N 23/51* (2023.01); *H04N 23/54* (2023.01); *H04N 23/686* (2023.01)

(58) Field of Classification Search
  CPC ...... H04N 23/51; H04N 23/54; H04N 23/686; H04N 23/58; H04N 23/55; G02B 7/09;
(Continued)

(56) References Cited

U.S. PATENT DOCUMENTS 10,334,146 B2   6/2019  Im et al.
10,678,062 B2 *  6/2020  Im ........................... G02B 7/09
(Continued)

FOREIGN PATENT DOCUMENTS

JP    2006-133281 A   5/2006
KR    10-1892857 B1   8/2018
(Continued)

OTHER PUBLICATIONS

International Search Report dated Mar. 10, 2021 in International Application No. PCT/KR2020/016561.
(Continued)

*Primary Examiner* — Yogesh K Aggarwal
(74) *Attorney, Agent, or Firm* — Saliwanchik, Lloyd & Eisenschenk

(57) ABSTRACT

An embodiment of the present invention discloses a camera actuator comprising: a housing; a mover disposed in the housing and including protrusions on one surface which protrude toward the housing; and a driving unit disposed in the housing and rotating the mover on the basis of a first direction or a second direction perpendicular to the first direction, wherein the protrusions comprise: a first protrusion disposed on the one surface; a second protrusion spaced apart from the first protrusion; and a third protrusion separated from the first protrusion by a distance greater than from the second protrusion, and wherein the housing comprises: a groove in which the first protrusion is seated on an inner surface corresponding to the one surface; a first hole through which the second protrusion passes; and a second hole through which the third protrusion passes, wherein a side surface of the second protrusion is spaced apart from the first hole, and the housing includes a protruding part disposed on a side of the second hole and extending toward the third protrusion.

20 Claims, 47 Drawing Sheets

(58) Field of Classification Search
CPC .................. G02B 27/646; G03B 13/36; G03B 2205/0007; G03B 2205/0046; G03B 2205/0069; G03B 30/00
See application file for complete search history.

(56) References Cited

U.S. PATENT DOCUMENTS

| | | | |
|---|---|---|---|
| 10,866,430 B2 * | 12/2020 | Kim | .................... G02B 27/646 |
| 2016/0182775 A1 | 6/2016 | Cho et al. | |
| 2019/0243087 A1 | 8/2019 | Osaka et al. | |

FOREIGN PATENT DOCUMENTS

| | | |
|---|---|---|
| KR | 10-1901705 B1 | 9/2018 |
| KR | 10-2018-0137278 A | 12/2018 |
| KR | 10-2019-0004121 A | 1/2019 |
| KR | 10-2019-0119832 A | 10/2019 |

OTHER PUBLICATIONS

Supplementary European Search Report dated Dec. 13, 2023 in European Application No. 20894383.7.
Notice of Allowance dated Jan. 24, 2024 in U.S. Appl. No. 17/756,704.

* cited by examiner

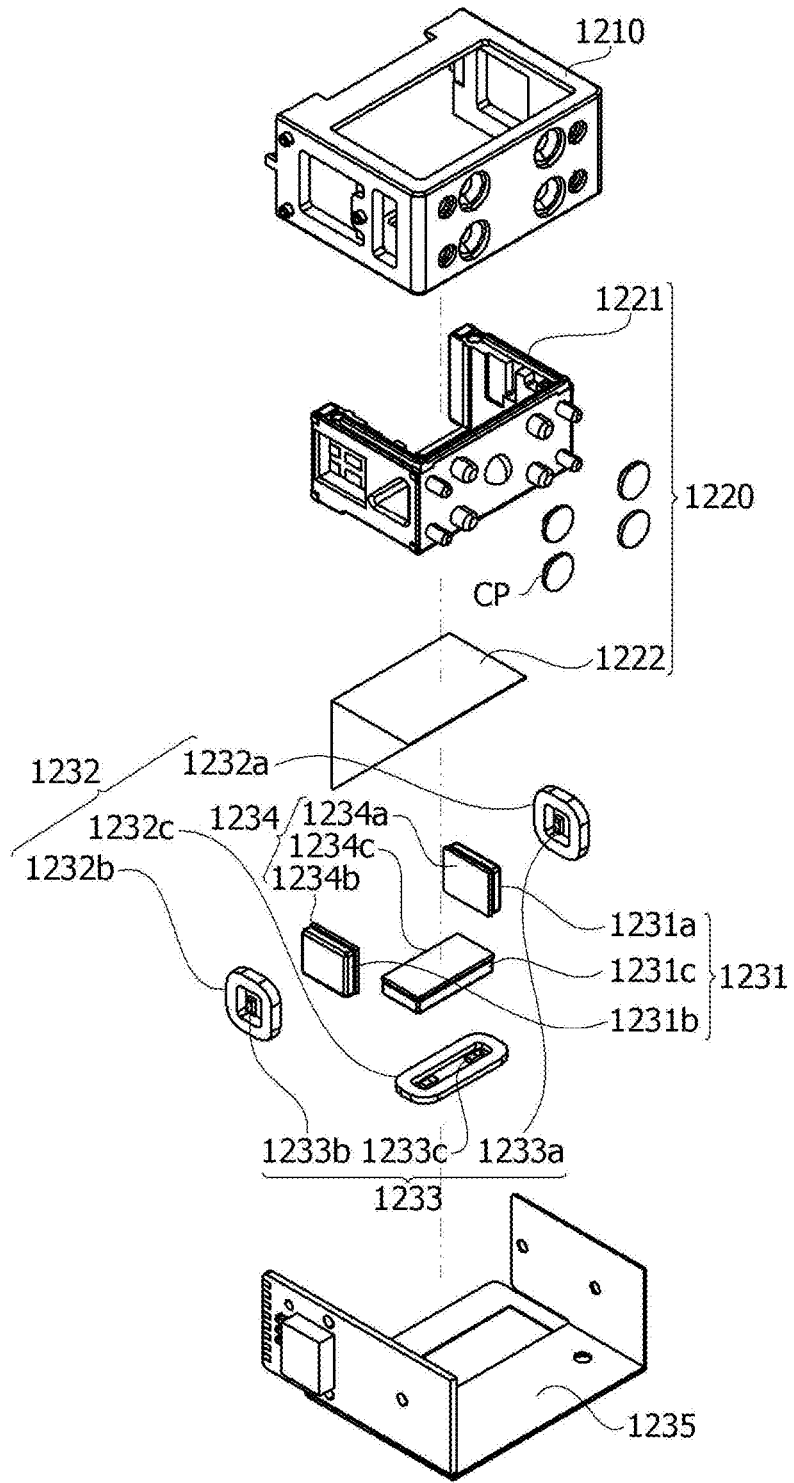

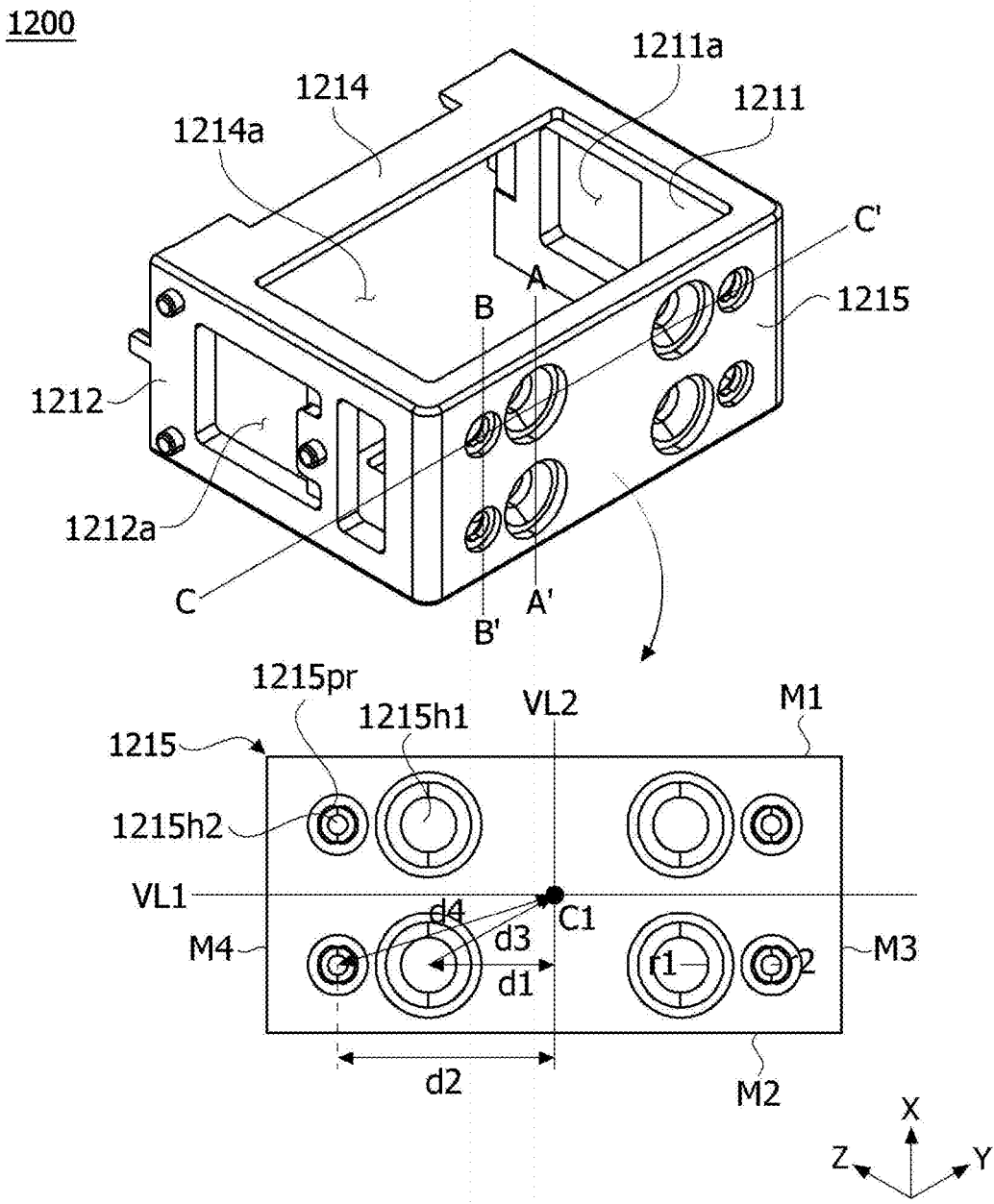

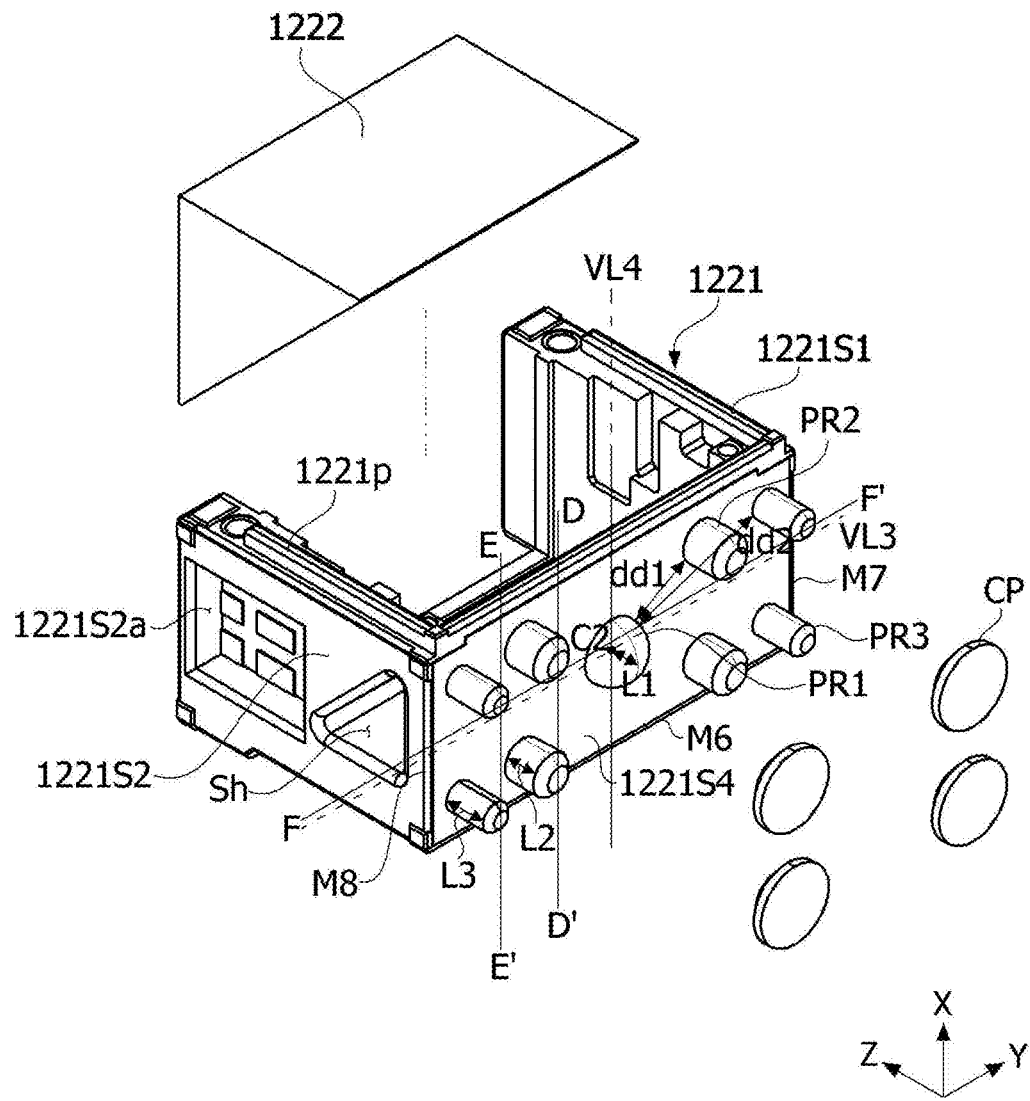

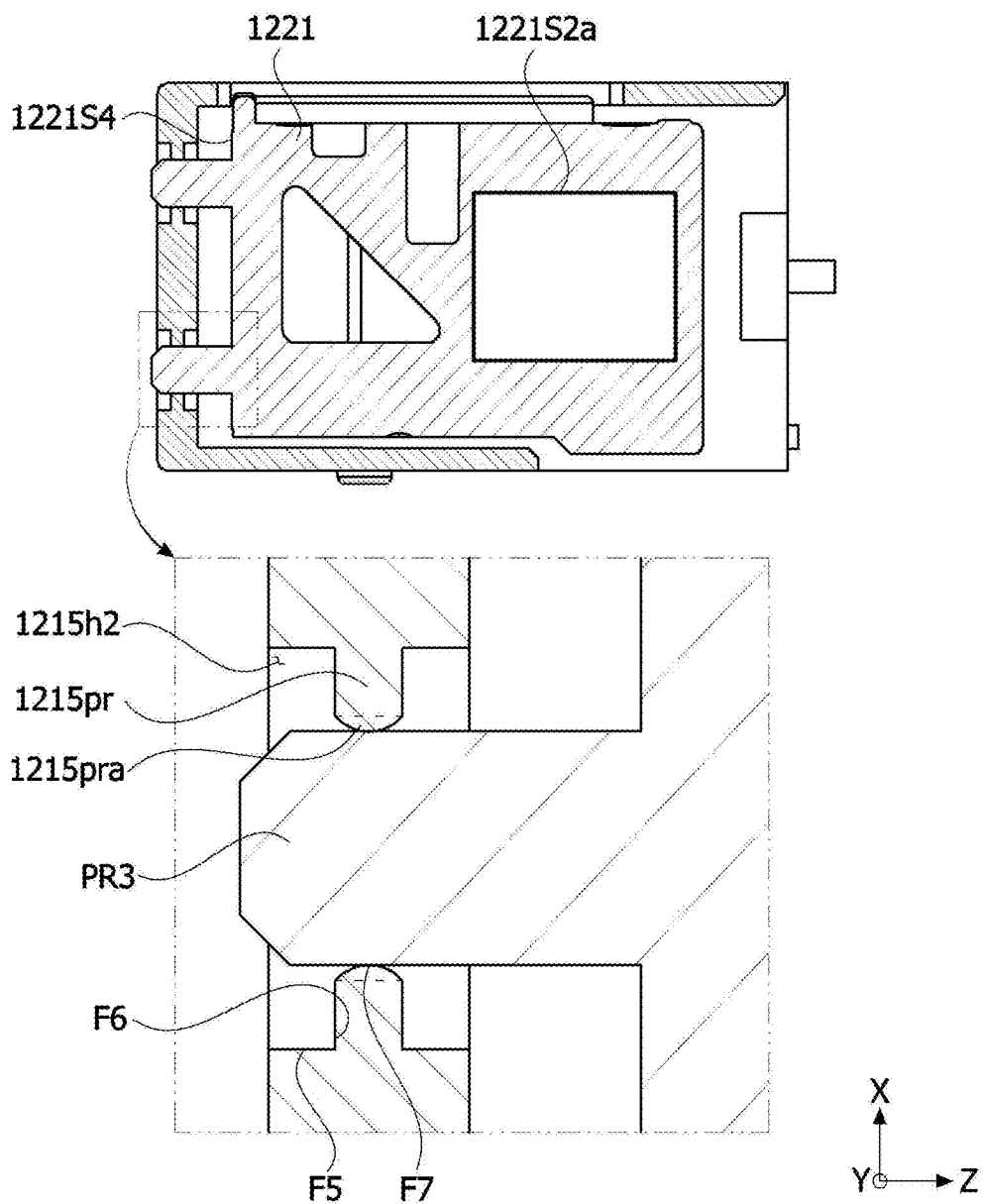

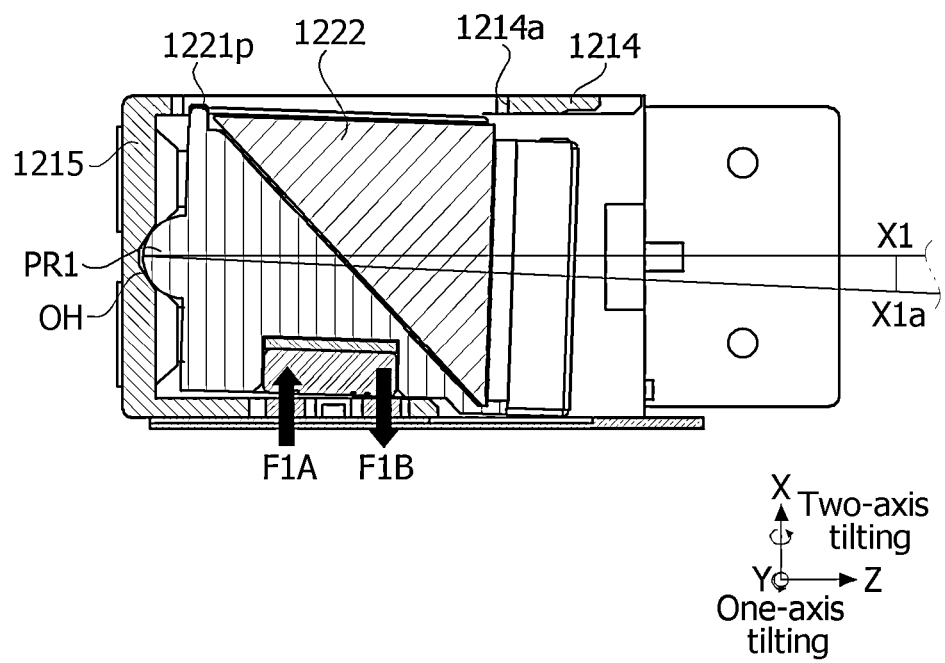

Fig.10a
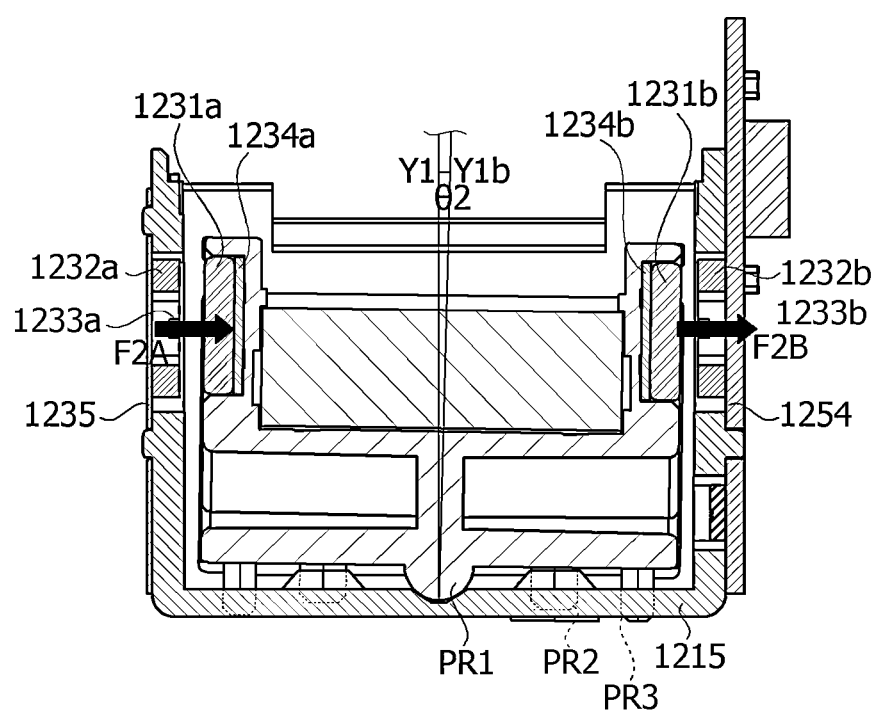
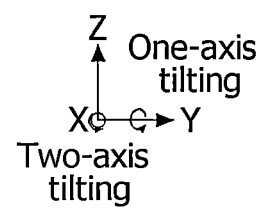

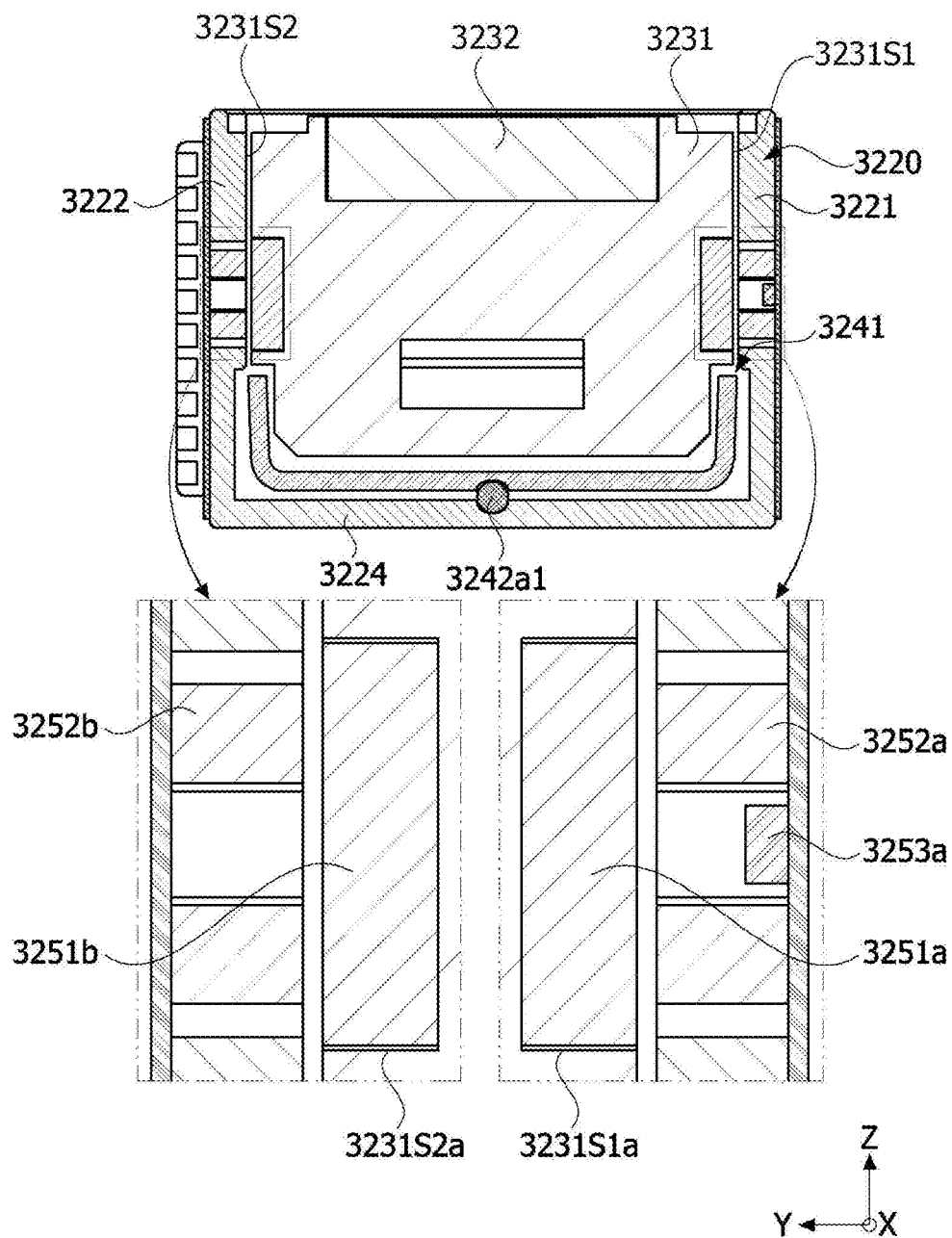

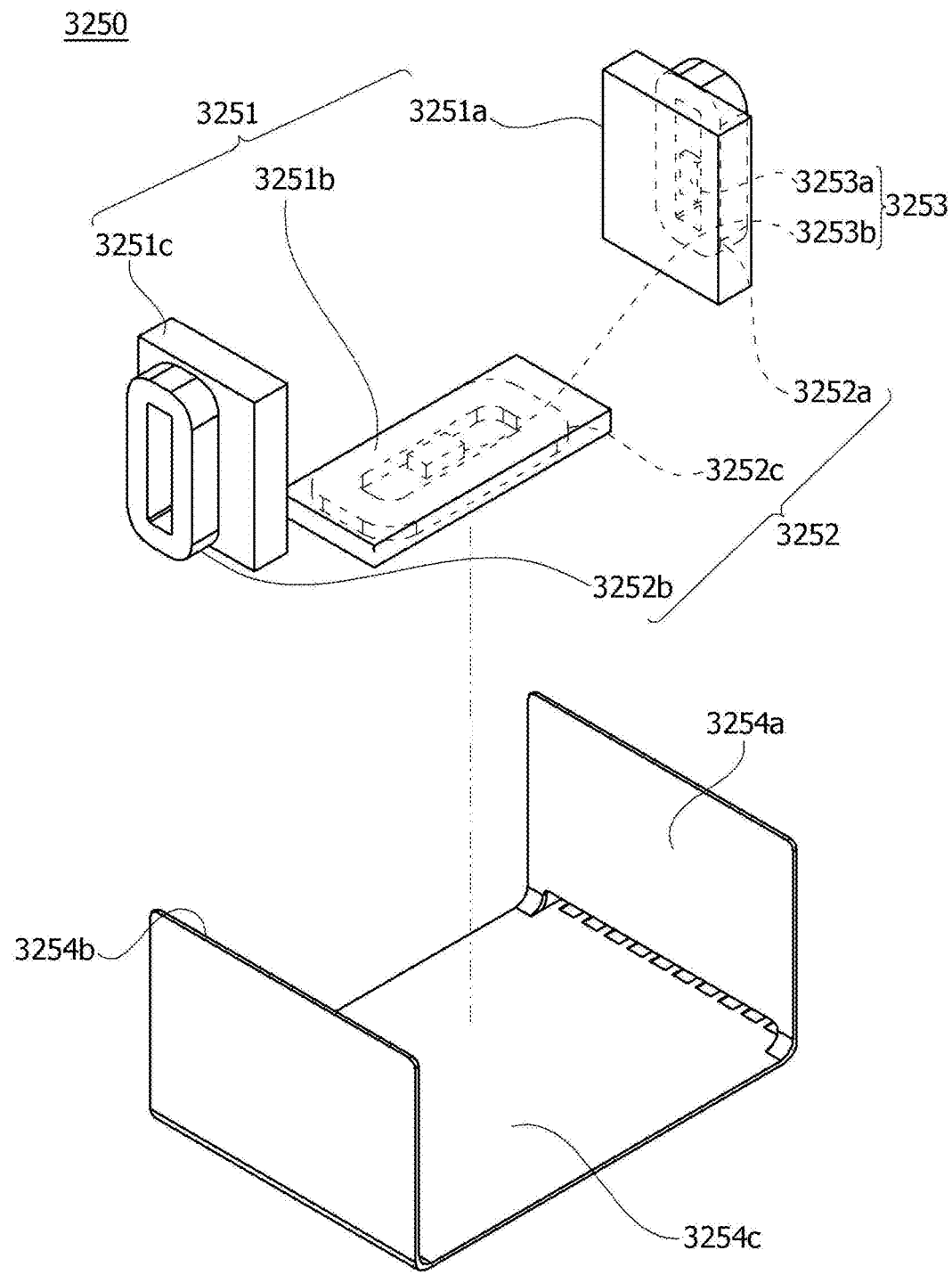

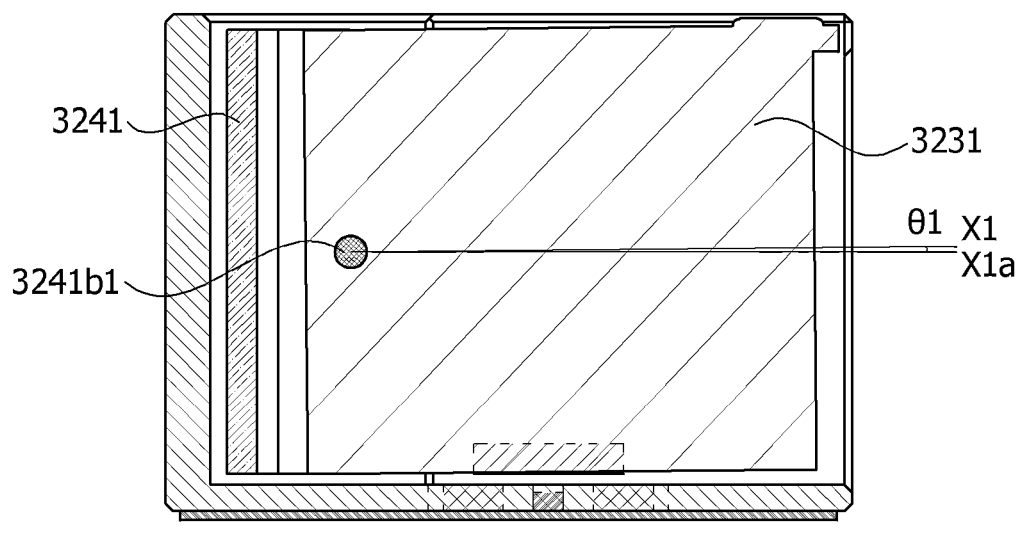
Fig.18e
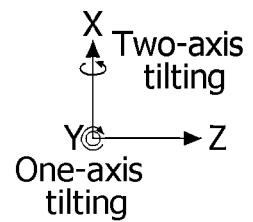

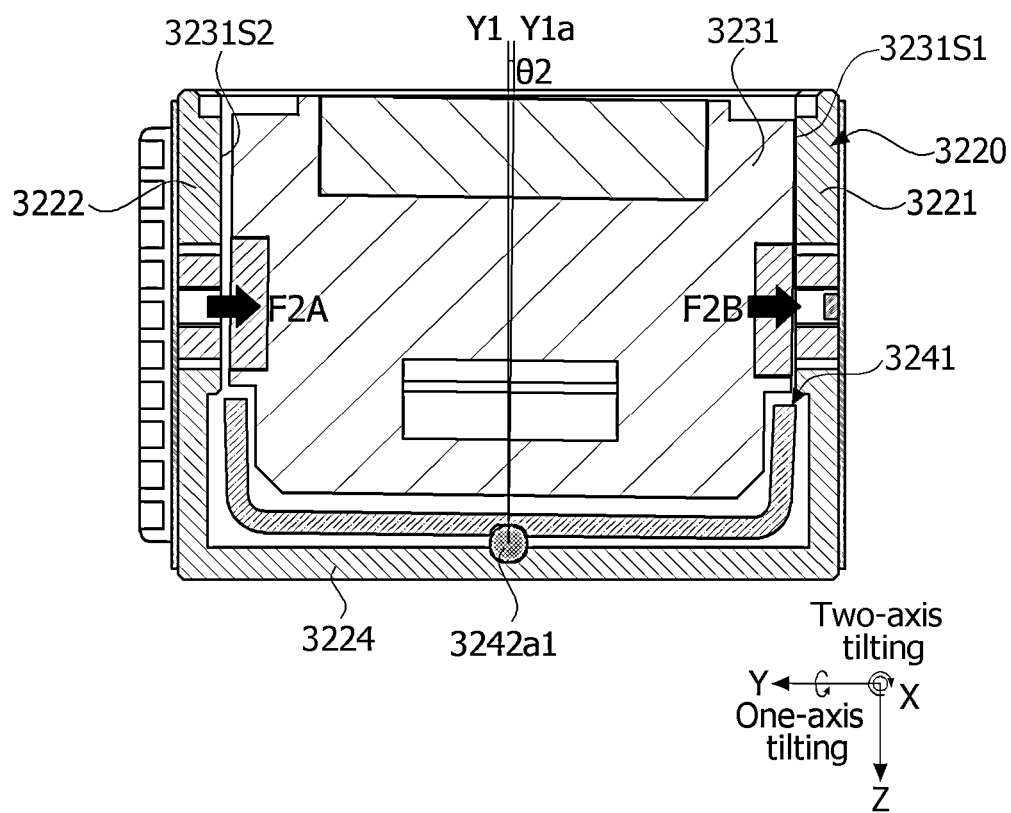

CAMERA ACTUATOR AND CAMERA MODULE COMPRISING SAME

CROSS-REFERENCE TO RELATED APPLICATIONS

This application is a continuation of U.S. application Ser. No. 17/756,704, filed May 31, 2022; which is the U.S. national stage application of International Patent Application No. PCT/KR2020/016561, filed Nov. 23, 2020, which claims the benefit under 35 U.S.C. § 119 of Korean Application Nos. 10-2019-0157000, filed Nov. 29, 2019; and 10-2019-0169845, filed Dec. 18, 2019; the disclosures of each of which are incorporated herein by reference in their entirety.

TECHNICAL FIELD

The present invention relates to a camera actuator and a camera module including the same.

BACKGROUND ART

Cameras are devices that capture a picture or video of a subject, and are mounted on portable devices, drones, vehicles, or the like. A camera module has, in order to improve image quality, an image stabilization (IS) function of correcting or inhibiting shaking of an image caused by a motion of a user, an auto focusing (AF) function of automatically adjusting a distance between an image sensor and a lens to adjust a focal length of the lens, and a zooming function of increasing or decreasing the magnification of a distant subject through a zoom lens.

Meanwhile, in the image sensor, a resolution becomes larger as the number of pixels becomes higher, and thus the size of the pixel is reduced. As the pixel becomes smaller, the quantity of light received for the same time is reduced. Thus, as a camera has the higher number of pixels, the shaking of an image caused by shaking of hands that occurs when a shutter speed is reduced in a dark environment may be more severe. An optical image stabilizer (OIS) technology of correcting motion by changing a path of light is present as a representative IS technology.

According to a general OIS technology, the movement of a camera may be detected through a gyro sensor or the like, and on the basis of the detected movement, a lens may be tilted or moved or a camera module including the lens and an image sensor may be tilted or moved. When the lens or the camera module including the lens and the image sensor are tilted or moved for the OIS, a space for tilting or moving the lens or the camera module needs to be additionally secured around the lens or the camera module.

Meanwhile, an actuator for the OIS may be disposed near the lens. In this case, the actuator for the OIS may include an actuator responsible for tilting in an X axis and an actuator responsible for tilting in a Y axis, the X axis and the Y axis being perpendicular to an optical axis Z.

However, according to the needs of ultra-slim and ultra-small camera modules, a space for arranging the actuator for the OIS may be greatly limited, and it may be difficult to ensure a sufficient space for tilting or moving the lens or the camera module itself including the lens and the image sensor for the OIS. Further, it is preferable that, as the camera has the larger number of pixels, the size of the lens becomes greater to increase the quantity of received light. In this case, there is a limit to increase the size of the lens due to the space occupied by the actuator for the OIS.

DISCLOSURE

Technical Problem

The present invention is directed to providing a camera actuator capable of being applied to an ultra-thin, ultra-small, and high-resolution camera.

Technical Solution

One aspect of the present invention provides a camera actuator including a housing, a mover disposed in the housing and including a boss, which protrudes toward the housing, on one surface thereof, and a driving unit that is disposed in the housing and rotates the mover in a first direction or a second direction perpendicular to the first direction, wherein the boss includes a first boss disposed on the one surface, a second boss spaced apart from the first boss, and a third boss having a larger separation distance from the first boss than from the second boss, the housing includes, in an inner surface corresponding to the one surface, a groove on which the first boss is seated, a first hole through which the second boss passes, and a second hole through which the third boss passes, a side surface of the second boss is spaced apart from the first hole, and the housing includes a protrusion disposed on a side surface of the second hole and extending toward the third boss.

The protrusion may be disposed at a center of the side surface of the second hole.

The protrusion may include extension parts in contact with the third boss, and the extension parts may be disposed to be symmetrical to each other with respect to a center of the second hole and overlaps each other in the first direction.

The extension parts may have a curvature and may be convex toward the center of the second hole.

The mover may further include a cap surrounding an end of the second boss and including a groove on which the second boss is seated.

The cap may be disposed in the first hole and may be spaced apart from a side surface of the first hole.

The first hole may include a first inner surface having a side surface disposed on an outermost side from a center of the first hole, a second inner surface in contact with the first inner surface and extending to the center of the first hole, a third inner surface in contact with the second inner surface and inclined toward the mover, and a fourth inner surface closest to the second boss, and the fourth inner surface may be disposed closer to the mover than the side surface of the second hole.

A radius of the first hole may be greater than a radius of the second hole, and a diameter of the second boss may be greater than a diameter of the third boss.

The driving unit may include a driving magnet and a driving coil, the driving magnet may include a first magnet, a second magnet, and a third magnet, the driving coil may include a first coil, a second coil, and a third coil, the first magnet and the second magnet may be arranged to be symmetrical to each other on the mover in the first direction, the first coil and the second coil may be arranged to be symmetrical to each other between the housing and the mover in the first direction, the third magnet may be disposed on a bottom surface of the mover, and the third coil may be disposed on a bottom surface of the housing.

Another aspect of the present invention provides a camera actuator including a housing, a mover disposed in the housing and including a boss, which protrudes toward the housing, on one surface thereof, and a driving unit that is disposed in the housing and rotates the mover in a first direction or a second direction perpendicular to the first direction, wherein the boss includes a first boss disposed on the one surface, a second boss spaced apart from the first boss, and a third boss having a larger separation distance from the first boss than from the second boss, the housing includes, in an inner surface corresponding to the one surface, a groove on which the first boss is seated, a first hole through which the second boss passes, and a second hole through which the third boss passes, a side surface of the second boss is spaced apart from the first hole, and the housing includes a protrusion disposed on a side surface of the second hole and disposed in contact with the third boss.

Still another aspect of the present invention provides a camera actuator including a housing, a mover disposed in the housing, a tilting plate disposed between the housing and the mover, a ball part including a first ball disposed between the housing and the tilting plate and a second ball disposed between the tilting plate and the mover, and a driving unit that is disposed in the housing and drives the mover, wherein the tilting plate include a base, a first extension part extending from the base to the mover, and a second extension part facing the first extension part, the mover is tilted in a first axis with respect to the first ball pressing a first groove formed in the housing, and the mover is tilted in a second axis perpendicular to the first axis with respect to the second ball pressing a second groove formed in mover.

The driving unit may rotate the mover in a first direction or a second direction perpendicular to the first direction.

The first ball may include a $(1-1)^{th}$ ball and a $(1-2)^{th}$ ball arranged side by side in the first direction, and the second ball may include a $(2-1)^{th}$ ball and a $(2-2)^{th}$ ball overlapping each other in the second direction.

The $(1-1)^{th}$ ball and the $(1-2)^{th}$ ball may be located on an outer surface of the base, the $(2-1)^{th}$ ball may be located on an inner surface of the first extension part, and the $(2-2)^{th}$ ball may be located on an inner surface of the second extension part.

The second groove may include a $(2-1)^{th}$ groove on which the $(2-1)^{th}$ ball is seated and a $(2-2)^{th}$ groove on which the $(2-2)^{th}$ ball is seated, the $(2-1)^{th}$ ball may at least partially overlap the $(2-1)^{th}$ groove in the first direction, and the $(2-2)^{th}$ ball may at least partially overlap the $(2-2)^{th}$ groove in the first direction.

The driving unit may include a driving magnet and a driving coil, the driving magnet may include a first magnet, a second magnet, and a third magnet, the driving coil may include a first coil, a second coil, and a third coil, the first magnet and the second magnet may be arranged to be symmetrical to each other on the mover in the first direction, the first coil and the second coil may be arranged to be symmetrical to each other between the housing and the mover in the first direction, the third magnet may be disposed on a bottom surface of the mover, and the third coil may be disposed on a bottom surface of the housing.

The $(2-1)^{th}$ groove may be disposed between the first magnet and the base, and the $(2-2)^{th}$ groove may be disposed between the second magnet and the base.

The housing may further include a coupling member disposed in a housing side part facing the base.

The coupling member and the tilting plate may be made of a magnetic material and generate an attractive force.

A lubricant disposed in the first groove and the second groove may be further included.

Advantageous Effects

According to an embodiment of the present invention, a camera actuator that can be applied to an ultra-thin, ultra-small, and high-resolution camera can be provided. In particular, an optical image stabilizer (OIS) actuator can be efficiently disposed without increasing the entire size of a camera module.

According to an embodiment of the present invention, X-axis tilting and Y-axis tilting do not generate magnetic field interference therebetween, the X-axis tilting and the Y-axis tilting can be implemented with a stable structure, magnetic field interference with an auto focusing (AF) or zooming actuator is not caused, and thus an accurate OIS function can be implemented.

According to an embodiment of the present invention, as the size limit of a lens is resolved, a sufficient quantity of light can be secured, assembling can be easily performed, and OIS can be implemented with low power consumption.

DESCRIPTION OF DRAWINGS

FIG. 4B is an exploded perspective view of the second camera actuator according to an embodiment.

FIG. 5A is a perspective view of a housing according to an embodiment.

FIG. 6A is a perspective view of a mover according to an embodiment.

FIG. 8E is a cross-sectional view along line JJ' of FIG. 8A.

FIGS. 9A and 9B are views for describing Y-axis tilting of the second camera actuator.

FIGS. 10A and 10B are views for describing X-axis tilting of the second camera actuator.

FIG. 16B is a cross-sectional view along line LL' of FIG. 16A.

FIG. 17 is a view illustrating a driving unit according to another embodiment.

FIGS. 18D and 18E are views for describing one-axis tilting of the second camera actuator according to another embodiment.

FIGS. 20A and 20B are views for describing two-axis tilting of the second camera actuator according to another embodiment.

MODES OF THE INVENTION

Figure 1:
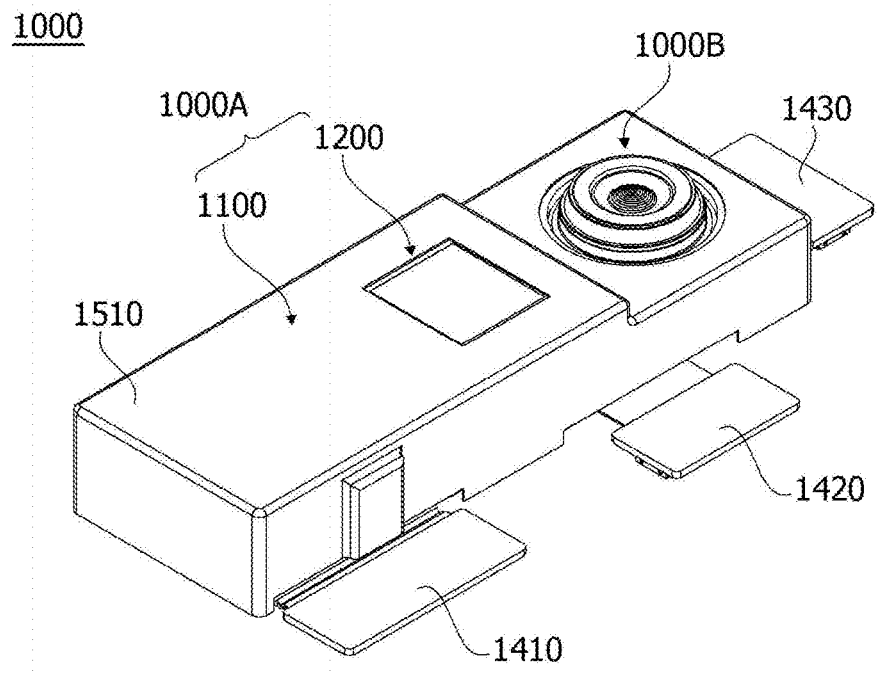
FIG. 1 is a perspective view of a camera module according to an embodiment.

The present invention may be modified in various changes and may have various embodiments and is thus intended to illustrate and describe specific embodiments in the accompanying drawings. However, it should be understood that the present invention is not limited to the specific embodiments and includes all changes, equivalents, and substitutes included in the spirit and scope of the present invention.

Terms including an ordinal number, such as second and first, may be used to describe various components, but the components not limited by the terms. The terms are used only for the purpose of distinguishing one component from another component. For example, without departing from the scope of the present invention, a second component may be referred to as a first component, and similarly, the first component may be referred to as the second component. Term "and/or" includes a combination of a plurality of related listed items or any of the plurality of related listed items.

It should be understood that, when it is referenced that a first component is "connected" or "coupled" to a second component, the first component may be directly connected or coupled to the second component or a third component may be present between the first component and the second component. On the other hand, it should be understood that, when a first component is "directly connected" or "directly coupled" to a second component, a third component is not present therebetween.

Terms used in the present application are used only to describe the specific embodiments and are not intended to limit the present invention. Singular expressions include plural expressions unless clearly otherwise indicated in the context. It should be understood in the present application that terms such as "include" or "have" are intended to indicate that there are features, numbers, steps, operations, components, parts, or combinations thereof that are described in the specification and do not exclude in advance the possibility of the presence or addition of one or more other features, numbers, steps, operations, components, parts, or combinations thereof.

Unless otherwise defined, all terms used herein including technical or scientific terms have the same meanings as those commonly understood by those skilled in the art to which the present invention belongs. Terms defined in commonly used dictionaries should be interpreted as having the same meanings in the context of the related art and may not be interpreted with ideal or excessively formal meanings, unless explicitly defined in the present application.

Hereinafter, embodiments will be described in detail with reference to the accompanying drawings, the same or corresponding components are designated by the same reference numerals regardless of the reference numerals, and the duplicated description thereof will be omitted.

Figure 2A:
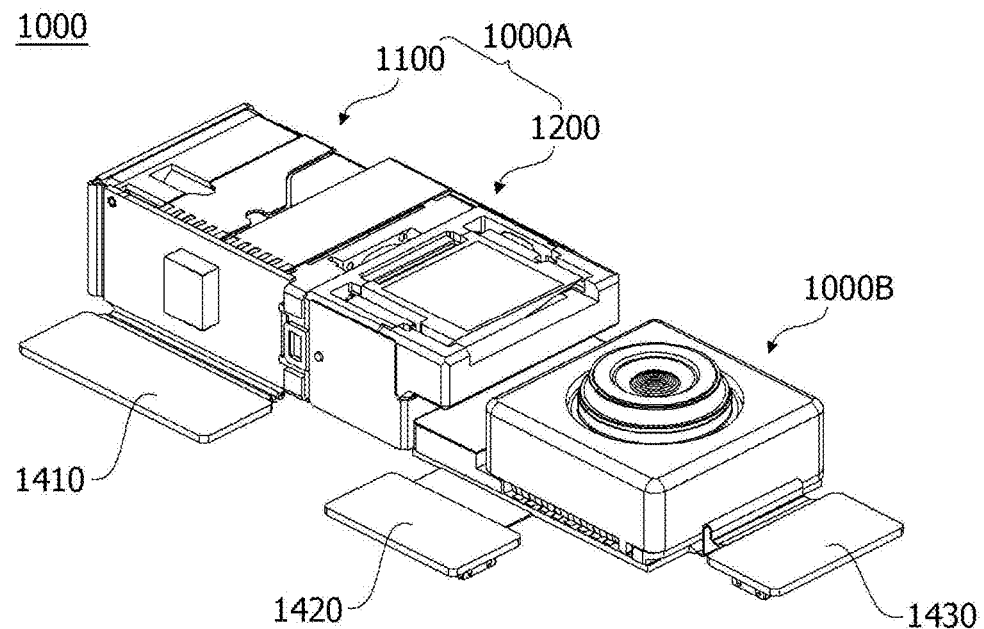
FIG. 2A is a perspective view of a state in which a shield can is removed from a camera illustrated in FIG. 1.
Figure 2B:
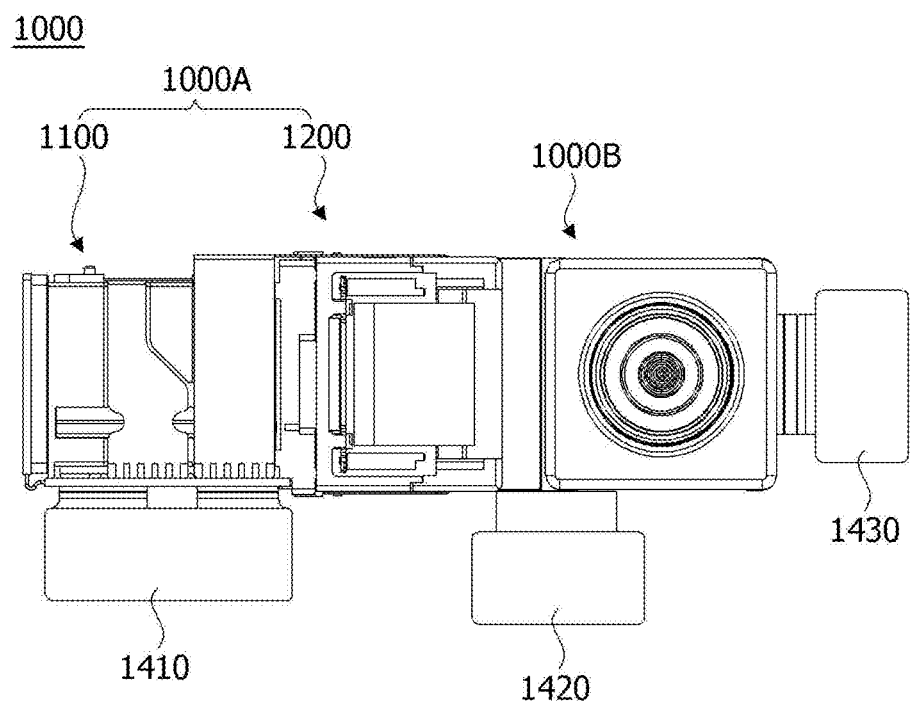
FIG. 2B is a plan view of the camera illustrated in FIG. 2A.

FIG. 1 is a perspective view of a camera module according to an embodiment, FIG. 2A is a perspective view of a state in which a shield can is removed from a camera illustrated in FIG. 1, and FIG. 2B is a plan view of the camera illustrated in FIG. 2A.

Referring to FIG. 1, a camera module 1000 may include one or more camera modules. For example, the camera module 1000 may include a first camera module 1000A and a second camera module 1000B. The first camera module 1000A and the second camera module 1000B may be covered by a predetermined shield can 1510.

Referring to FIGS. 1, 2A, and 2B, the first camera module 1000A may include one or more actuators. For example, the first camera module 1000A may include a first camera actuator 1100 and a second camera actuator 1200.

The first camera actuator 1100 may be electrically connected to a first group circuit board 1410, the second camera actuator 1200 may be electrically connected to a second group circuit board 1420, and although not illustrated, the second group circuit board 1420 may be electrically connected to the first group circuit board 1410. The second camera module 1000B may be electrically connected to a third group circuit board 1430.

The first camera actuator 1100 may be a zooming actuator or an auto focusing (AF) actuator. For example, the first camera actuator 1100 may support one or more lenses and move the lens according to a predetermined control signal of a controller to perform an AF function or a zooming function.

The second camera actuator 1200 may be an optical image stabilizer (OIS) actuator.

The second camera module 1000B may include a fixed focal length lens disposed in a predetermined barrel (not illustrated). The fixed focal length lens may also be referred to as a "single focal length lens" or a "single lens."

The second camera module 1000B may include an actuator (not illustrated) that is disposed in a predetermined housing (not illustrated) and may drive a lens unit. The actuator may be a voice coil motor, a micro actuator, a silicon actuator, or the like, and may be applied in various methods such as an electrostatic method, a thermal method, a bimorph method, and an electrostatic force method, but the present invention is not limited thereto.

Figure 3A:
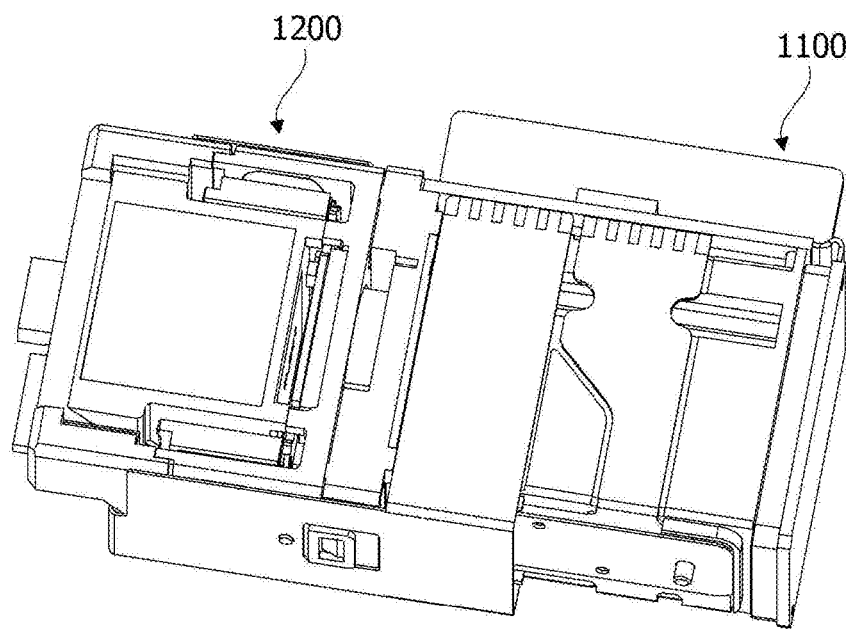
FIG. 3A is a perspective view of a first camera module illustrated in FIG. 2A.
Figure 3B:
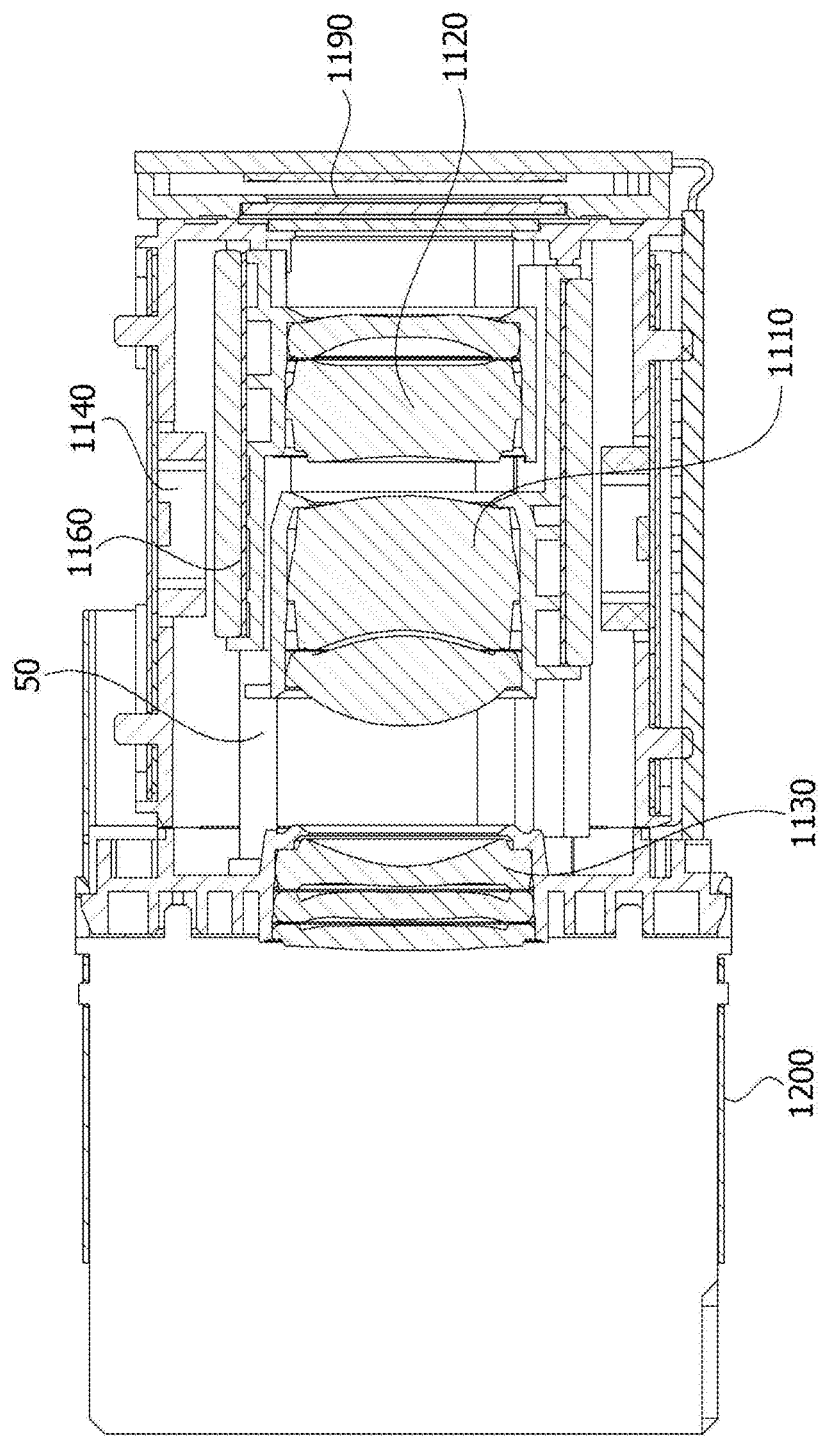
FIG. 3B is a side cross-sectional view of the first camera module illustrated in FIG. 3A.

Next, FIG. 3A is a perspective view of a first camera module illustrated in FIG. 2A, and FIG. 3B is a side cross-sectional view of the first camera module illustrated in FIG. 3A.

Referring to FIG. 3A, the first camera module 1000A may include the first camera actuator 1100 that performs the zooming function and the AF function and the second camera actuator 1200 that is disposed on one side of the first camera actuator 1100 and performs an OIS function.

Referring to FIG. 3B, the first camera actuator 1100 may include an optical system and a lens driving unit. For example, at least one of a first lens assembly 1110, a second lens assembly 1120, a third lens assembly 1130, and a guide pin 50 may be arranged in the first camera actuator 1100.

Further, the first camera actuator 1100 may be provided with a driving coil 1140 and a driving magnet 1160 to perform a high-magnification zooming function.

For example, the first lens assembly 1110 and the second lens assembly 1120 may be moving lenses that move through the driving coil 1140, the driving magnet 1160, and the guide pin 50, and the third lens assembly 1130 may be a fixed lens, but the present invention is not limited thereto. For example, the third lens assembly 1130 may function as a focator that images light at a specific location, and the first lens assembly 1110 may function as a variator that re-images, at another location, the image formed by the third lens assembly 1130 that is the focator. Meanwhile, in the first lens assembly 1110, a distance to a subject or an image distance is greatly changed, and thus a magnification change may be large. The first lens assembly 1110 that is the variator may perform an important role in changing a focal length or a magnification of the optical system. Meanwhile, an image point formed at the first lens assembly 1110 that is the variator may be slightly different according to a location. Accordingly, the second lens assembly 1120 may perform a location compensation function for the image formed by the variator. For example, the second lens assembly 1120 may function as a compensator that accurately images, at an actual location of an image sensor 1190, an image point formed by the first lens assembly 1110 that is the variator.

For example, the first lens assembly 1110 and the second lens assembly 1120 may be driven by an electromagnetic force generated by an interaction between the driving coil 1140 and the driving magnet 1160.

Further, the predetermined image sensor 1190 may be disposed perpendicular to an optical axis direction of parallel light.

Next, the second camera actuator 1200 will be described below in detail with reference to FIGS. 4A and 4B.

Further, the camera module 1000 according to an embodiment may implement the OIS through control of an optical path through the camera actuator, thereby minimizing occurrence of a decenter phenomenon or a tilting phenomenon, and achieving the best optical properties.

FIGS. 1 to 3B and the description thereof are intended to describe the overall structure and operation principle of the camera module 1000 according to the embodiment of the present invention, and thus the embodiment of the present invention is not limited to the detailed configuration illustrated in FIGS. 1 to 3B.

Meanwhile, when an OIS actuator and an AF or zooming actuator are arranged according to the embodiment of the present invention, magnetic field interference with a magnet for the AF or zooming can be inhibited during an OIS operation. Since a driving magnet of the second camera actuator 1200 is disposed separately from the first actuator 1100, magnetic field interference between the first actuator 1100 and the second actuator 1200 can be inhibited. In the present specification, the OIS may be used interchangeably with terms such as hand shaking correction, optical image stabilization, optical image correction, and shaking correction.

Hereinafter, a method of controlling the second actuator and a detailed structure of the second camera actuator according to the embodiment of the present invention will be described in more detail.

Figure 4A:
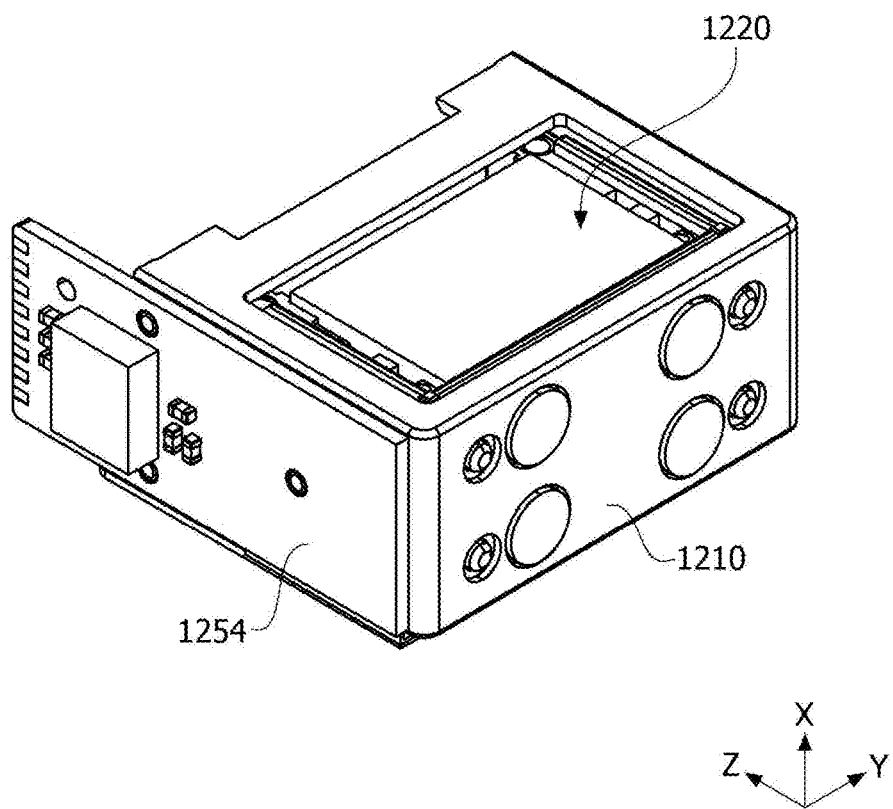
FIG. 4A is a perspective view of a second camera actuator according to an embodiment.

FIG. 4A is a perspective view of a second camera actuator according to an embodiment, and FIG. 4B is an exploded perspective view of the second camera actuator according to an embodiment.

Referring to FIGS. 4A and 4B, the second camera actuator 1200 according to the embodiment includes a housing 1210, a mover 1220, and a driving unit 1230.

The housing 1210 may be located outside the second camera actuator 1200 and may have a reception part. Further, the mover 1220, which will be described below, may be seated on the reception part. The housing 1210 may include a plurality of housing sides, and coils, which will be described below, may be arranged in at least some of the housing sides that include holes. A detailed description thereof will be made below.

Here, a first direction is an X-axis direction on the drawing and may be used interchangeably with a second axis direction. For example, a bottom surface means one side in the first direction. Further, a second direction is a Y-axis direction on the drawing and may be used interchangeably with a first axis direction. The second direction is a direction perpendicular to the first direction. Further, a third direction is a Z-axis direction on the drawing and may be used interchangeably with a third axis direction. Further, the third direction is a direction perpendicular to both the first direction and the second direction. Here, the third direction (the Z-axis direction) corresponds to a direction of an optical axis (for example, a direction parallel to the optical axis), the first direction (the X-axis direction) and the second direction (the Y-axis direction) are directions perpendicular to the optical axis, and the second actuator 1200 may be tilted in the first direction or the second direction. A detailed description thereof will be made below.

The mover 1220 may include a holder 1221, a cap CP, and an optical member 1222.

The holder 1221 may include a plurality of outer holder surfaces. Further, the holder 1221 may include a plurality of bosses protruding toward the housing on one surface among the outer holder surfaces. Further, the housing 1210 may include a plurality of holes in surfaces corresponding to the plurality of bosses. Accordingly, the plurality of bosses may pass through holes formed in one surface of the housing 1210. Further, some of the plurality of bosses may be coupled to the cap CP at ends thereof. A detailed description thereof will be made below.

The cap CP may be coupled to the plurality of bosses formed in one surface of the holder 1221. Accordingly, the housing 1210 and the mover 1220 (or the holder 1221) may be coupled to each other. Due to this configuration, reliability of the camera actuator according to the embodiment can be improved.

In addition, the cap CP may be spaced a predetermined distance from the holes of the housing 1210. Accordingly, the cap CP may secure a space for X-axis tilting or Y-axis tilting of the mover 1220 and limit a tilting radius, thereby improving a coupling force between the mover 1220 and the housing 1210. A detailed description thereof will be made below.

The optical member 1222 may be seated on the holder 1221. To this end, the holder 1221 may have a seating surface.

Further, the optical member 1222 may include a reflective part disposed therein. For example, the optical member 1222 may be a prism or a reflective member (for example, a mirror). However, the present invention is not limited thereto. Further, the optical member 1222 may reflect, into the camera module, light reflected from the outside (e.g., an object). In other words, the optical member 1222 may change a path of the reflected light to improve spatial limitation of the first camera actuator 1100 and the second camera actuator 1200. Accordingly, it should be understood that the camera module may expand the optical path while minimizing a thickness thereof, and thus may also provide a high range of magnifications.

The driving unit 1230 may include a driving magnet 1231, a driving coil 1232, a Hall sensor unit 1233, a yoke part 1234, and a board part 1235.

The driving magnet 1231 may include a plurality of magnets. In one embodiment, the driving magnet 1231 may include a first magnet 1231a, a second magnet 1231b, and a third magnet 1231c.

The first magnet 1231a, the second magnet 1231b, and the third magnet 1231c may be located on the outer surface of the holder 1221. Further, the first magnet 1231a and the second magnet 1231b may be located to face each other. Further, the third magnet 1231c may be located on a bottom surface among the outer surface of the holder 1221. A detailed description thereof will be made below.

The driving coil 1232 may include a plurality of coils. In one embodiment, the driving coil 1232 may include a first coil 1232a, a second coil 1232b, and a third coil 1232c.

The first coil 1232a may be located to face the first magnet 1231a. Accordingly, the first coil 1232a may be located in a first housing hole of a first housing side as described above.

Further, the second coil 1232b may be located to face the second magnet 1231b. Accordingly, the second coil 1232b may be located in a second housing hole of a second housing side as described above.

The first coil 1232a may be located to face the second coil 1232b. That is, the first coil 1232a may be located to be symmetrical to the second coil 1232b in the first direction (the X-axis direction). This may be equally applied even to the first magnet 1231a and the second magnet 1231b. That is, the first magnet 1231a and the second magnet 1231b may be located to be symmetrical to each other in the first direction (the X-axis direction). Further, the first coil 1232a, the second coil 1232b, the first magnet 1231a, and the second magnet 1231b may be arranged to at least partially overlap each other in the second direction (the Y-axis direction). Due to this configuration, the X-axis tilting can be accurately performed without inclination to one side by using an electromagnetic force between the first coil 1232a and the first magnet 1231a and an electromagnetic force between the second coil 1232b and the second magnet 1231b.

The third coil 1232c may be located to face the third magnet 1231c. Accordingly, as described above, the third coil 1232c may be located in a third housing hole 1223a of a third housing side part 1213. The third coil 1232c, together with the third magnet 1231c, may generate an electromagnetic force, and thus the Y-axis tilting of the mover 1220 may be performed with respect to the housing 1210.

Here, the X-axis tilting means tilting with respect to an X axis, and the Y-axis tilting means tilting with respect to a Y axis. Furthermore, the X-axis tilting is used interchangeably with two-axis tilting, and the Y-axis tilting is used interchangeably with one-axis tilting.

The Hall sensor unit 1233 may include a plurality of Hall sensors. In one embodiment, the Hall sensor unit 1233 may include a first Hall sensor 1233a, a second Hall sensor 1233b, and a third Hall sensor 1233c.

The first Hall sensor 1233a may be located inside the first coil 1232a. The first Hall sensor 1233a may detect a change in magnetic flux inside the first coil 1232a.

The second Hall sensor 1233b may be located inside the second coil 1232b. The second Hall sensor 1233b may detect a change in magnetic flux inside the second coil 1232b.

Accordingly, location sensing between the first and second magnets 1231a and 1231b and the first and second Hall sensors 1233a and 1233b may be performed. Therefore, the second camera actuator according to an embodiment may control the X-axis tilting.

Further, the third Hall sensor 1233*c* may be located inside the third coil 1232*c*. The third Hall sensor 1233*c* may detect a change in magnetic flux inside the third coil 1232*c*. Accordingly, location sensing between the third magnet 1231*c* and the third Hall sensor 1233*c* may be performed. Therefore, the second camera actuator according to an embodiment may control the Y-axis tilting.

The yoke part 1234 may include a first yoke 1234*a*, a second yoke 1234*b*, and a third yoke 1234*c*.

The first yoke 1234*a* may be disposed on the first magnet 1231*a*. Further, the second yoke 1234*b* may be disposed on the second magnet 1231*b*. Further, the third yoke 1234*c* may be disposed on the third magnet 1231*c*.

The first yoke 1234*a*, the second yoke 1234*b*, and the third yoke 1234*c* may be arranged inside a seating groove formed in an outer surface of the holder 1221. Further, the first yoke 1234*a*, the second yoke 1234*b*, and the third yoke 1234*c*, together with the first magnet 1231*a*, the second magnet 1231*b*, and the third magnet 1231*c*, may be located in grooves formed in the outer surface of the holder 1221. For example, the first yoke 1234*a*, the second yoke 1234*b*, and the third yoke 1234*c* may be seated on the grooves formed in the outer surface of the holder 1221 by a bonding member such as an epoxy.

Accordingly, the first yoke 1234*a*, the second yoke 1234*b*, and the third yoke 1234*c* can improve a coupling force between the first to third magnets 1231*a* to 1231*c*, thereby improving reliability of the camera actuator 1200.

The board part 1235 may be located below the driving unit 1230. The board part 1235 may be electrically connected to the driving coil 1232 and the Hall sensor unit 1233. For example, the board part 1235 may be coupled to the driving coil 1232 and the Hall sensor unit 1233 by using a surface mounter technology (SMT). However, the present invention is not limited to this method.

The board part 1235 may be located outside the housing 1210 and coupled to the housing 1210. Various coupling methods may be performed as described above. Further, through the coupling, the driving coil 1232 and the Hall sensor unit 1233 may be located in a housing hole formed in a lateral side of the housing 1210.

Further, the board part 1235 may include a circuit board having wiring patterns that may be electrically connected, such as a rigid printed circuit board (PCB), a flexible PCB, and a rigid flexible PCB. However, the present invention is not limited to these types.

Figure 5B:
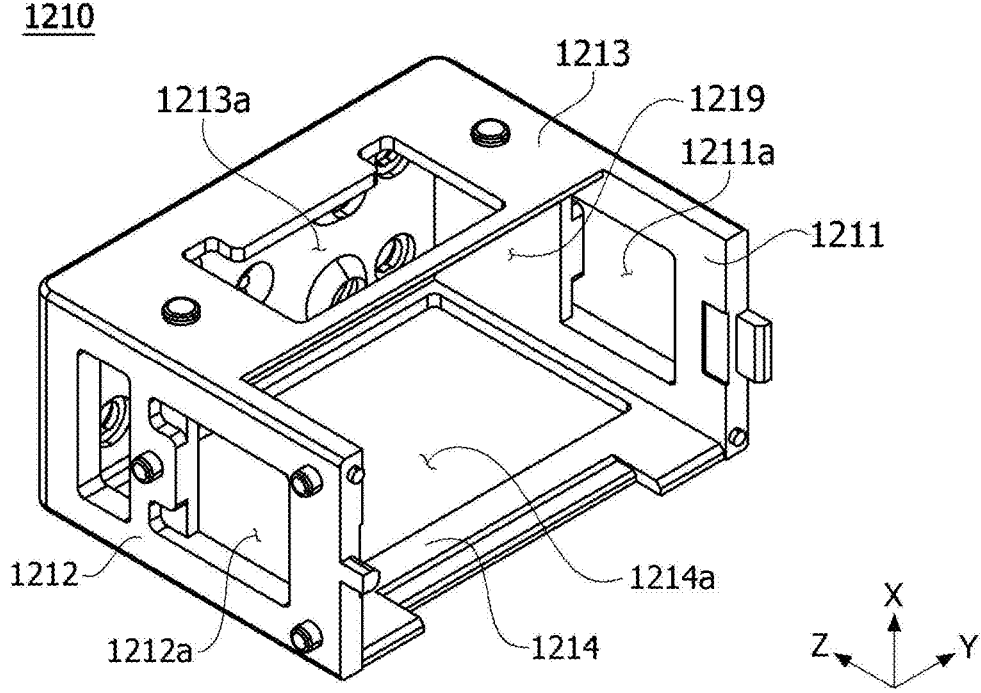
FIG. 5B is a bottom view of the housing according to an embodiment.
Figure 5C:
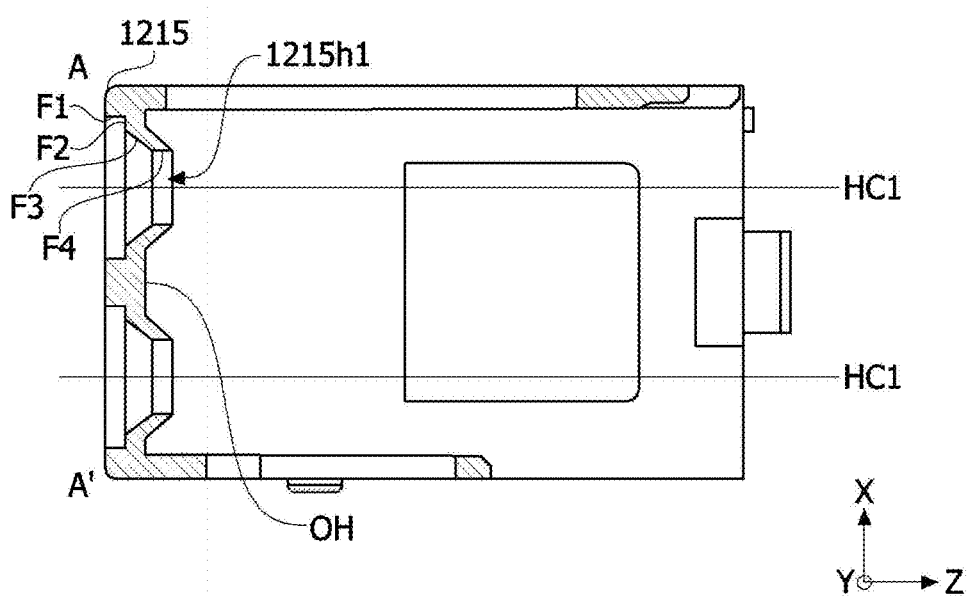
FIG. 5C is a cross-sectional view along line AA' of FIG. 5A.
Figure 5D:
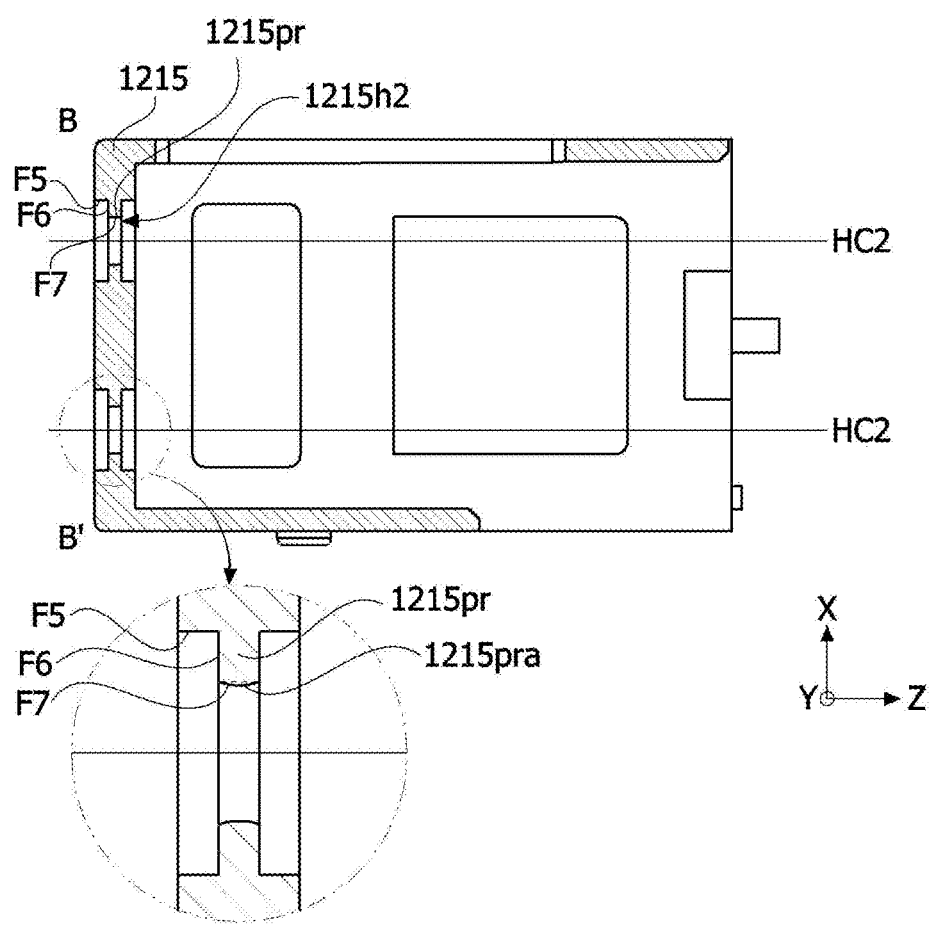
FIG. 5D is a cross-sectional view along line BB' of FIG. 5A.
Figure 5E:
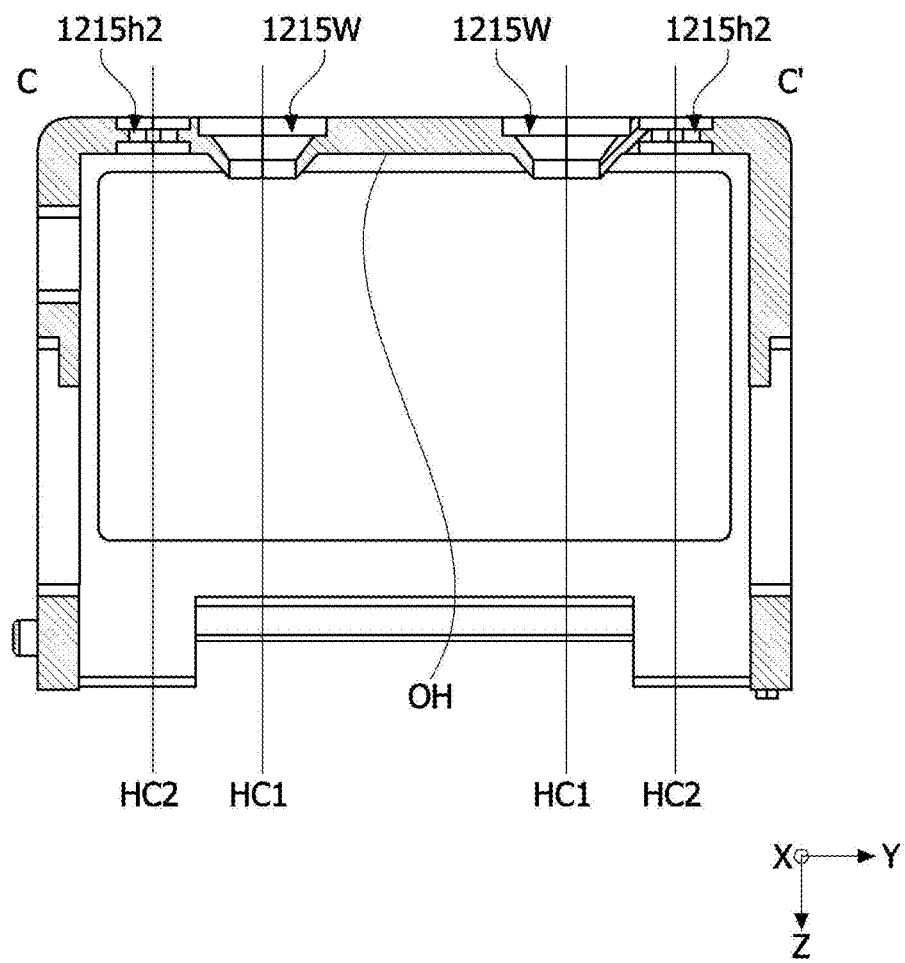
FIG. 5E is a cross-sectional view along line CC' of FIG. 5A.

FIG. 5A is a perspective view of a housing according to an embodiment, FIG. 5B is a bottom view of the housing according to an embodiment, FIG. 5C is a cross-sectional view along line AA' of FIG. 5A, FIG. 5D is a cross-sectional view along line BB' of FIG. 5A, and FIG. 5E is a cross-sectional view along line CC' of FIG. 5A.

Referring to FIGS. 5A and 5B, the housing 1210 according to the embodiment may include a first housing side part 1211, a second housing side part 1212, a third housing side part 1213, a fourth housing side part 1214, and a fifth housing side part 1215.

The first housing side part 1211 and the second housing side part 1212 may be arranged to face each other. Further, the third housing side part 1213 and the fourth housing side part 1214 may be arranged to face each other. In this case, the first housing side part 1211 may be located at a left side (or a right side) of the housing 1210, the second housing side part 1212 may be located at the right side (or the left side) of the housing 1210, the third housing side part 1213 may be located at a lower side of the housing 1210, and the fourth housing side part 1214 may be located at an upper side of the housing 1210.

Further, the first housing side part 1211 and the second housing side part 1212 may be located between the third housing side part 1213 and the fourth housing side part 1214 and may be in contact with the third housing side part 1213 and the fourth housing side part 1214.

Further, the first housing side part 1211 and the second housing side part 1212 may be located to be spaced apart from each other in the second direction (the Y-axis direction) and to be symmetrical to each other in the first direction (the X-axis direction).

The third housing side part 1213 and the fourth housing side part 1214 may be located to be spaced apart from each other in the first direction (the X-axis direction) and to be symmetrical to each other in the third direction (the Z-axis direction).

The fifth housing side part 1215 may be located between the first housing side part 1211 and the second housing side part 1212 and may be in contact with the first housing side part 1211 and the second housing side part 1212. Further, the fifth housing side part 1215 may be located between the third housing side part 1213 and the fourth housing side part 1214 and may be in contact with the third housing side part 1213 and the fourth housing side part 1214.

The housing 1210 may include an open region. In particular, a region of the housing 1210, which faces the fifth housing side part 1215, may be open.

Further, the housing 1210 may include a mover accommodation part 1219. The mover accommodation part 1219 may be located inside the first housing side part 1211 to the fifth housing side part 1215. That is, the mover accommodation part 1219 may be surrounded by first housing side part 1211 to the fifth housing side part 1215. Further, the mover may be located in the mover accommodation part 1219. For example, the mover may move through the above-described open region and thus may be located in the mover accommodation part 1219 of the housing 1210. To this end, reliability of the mover and the like can be improved, and assembling in the housing 1210 can be easy.

Further, the mover may be spaced apart from other housing side parts (for example, the first housing side part 1211 to the third housing side part 1213) except for the fifth housing side part 1215. Through this spacing, the mover may rotate inside the housing 1210 in the X axis or the Y axis.

Further, the first housing side part 1211 may include a first housing hole 1211*a*. The first coil may be located in the first housing hole 1211*a*. Further, the first Hall sensor may be located in the first housing hole 1211*a*.

Further, the second housing side part 1212 may include a second housing hole 1212*a*. The second coil may be located in the second housing hole 1212*a*. Further, the second Hall sensor may be located in the second housing hole 1212*a*.

Further, the second housing hole 1212*a* may be located to be symmetrical to the first housing hole 1211*a* in the first direction (the X-axis direction). Further, the size and location of the second housing hole 1212*a* may correspond to those of the first housing hole 1211*a*. Accordingly, the X-axis tilting can be accurately performed without inclination to one side by using an electromagnetic force generated by the first coil inside the first housing hole 1211*a* and the second coil inside the second housing hole 1212*a*.

The third housing side part 1213 may include a third housing hole 1213*a*. The third coil may be located in the third housing hole 1213*a*. Further, the third Hall sensor may be located in the third housing hole 1213a. The third Hall sensor may be provided as a plurality of third Hall sensors inside the third housing hole 1213a.

The first housing side part 1211 to the third housing side part 1213 may additionally include bosses and grooves (or holes) sh. Due to this configuration, a coupling force with the board part can be improved or the weight of the camera actuator can be reduced.

For example, the first housing side part 1211 to the third housing side part 1213 may be easily coupled to the board part through the bosses. That is, electrical connection between the coils arranged in the first housing side part 1211 to the third housing side part 1213 and the board part is easily maintained, and thus the reliability of the camera actuator can be improved.

Further, the weights of the first housing side part 1211 to the third housing side part 1213 can be reduced due to the grooves (or the holes). Accordingly, the weight of the camera actuator can be reduced. In particular, in the first housing side part 1211 to the third housing side part 1213, the above-described grooves (or the holes) may be arranged to be symmetrical to each other in the first direction (the X-axis direction). For example, the groove formed in the first housing side part 1211 and the groove formed in the second housing side part 1212 may overlap each other in the second direction (the Y-axis direction). Due to this configuration, the weights of the housing side parts may be maintained constant. Accordingly, a malfunction in which the X-axis tilting or the Y-axis tilting is concentrated on one side or in one direction due to the different weights of the housing side parts can be inhibited.

The fourth housing side part 1214 may include a fourth housing hole 1214a.

The fourth housing hole 1214a may be larger than the optical member which will be described below. Due to this configuration, light incident through the fourth housing hole 1214a is transmitted to the optical member, and thus the camera actuator according to the embodiment can minimize light loss.

Further, the fourth housing hole 1214a may overlap a mover stopper, which will be described below, in the second direction (the Y-axis direction) or the third direction (the Z-axis direction). Accordingly, tilting of the mover is limited by the mover stopper, and thus, the optical member inside the mover may not collide with other housing side parts during the tilting. That is, in the camera actuator according to the embodiment, reliability of respective components can be improved.

The fifth housing side part 1215 may include a first hole 1215h1, a second hole 1215h2, and a groove OH (see FIG. 5C).

The groove OH (see FIG. 5C) may be located at a first center C1 of the fifth housing side part 1215 on an inner surface of the fifth housing side part 1215. For example, the first center C1 of the fifth housing side part 1215 may be the center of gravity of the fifth housing side part 1215.

Further, the first center C1 of the fifth housing side part 1215 may be an intersection between a first virtual line VL1 and a second virtual line VL2 that each bisect an outer surface 1215a of the fifth housing side part 1215 in the first direction (the X-axis direction) and the second direction (the Y-axis direction).

The first virtual line VL1 may be a line that bisects a third corner M3 and a fourth corner M4 of the outer surface 1215a in the fifth housing side part 1215. The first virtual line VL1 may be parallel to the second direction (the Y-axis direction).

The second virtual line VL2 may be a line that bisects a first corner M1 and a second corner M2 of the outer surface 1215a in the fifth housing side part 1215. The second virtual line VL2 may be parallel to the first direction (the X-axis direction).

Further, the first corner M1 and the second corner M2 may be located to face each other and may be located to correspond to each other in the second direction (the Y-axis direction). Further, the third corner M3 and the fourth corner M4 may be located to face each other and may be located to correspond to each other in the first direction (the X-axis direction).

Further, the first hole 1215h1 may be provided as a plurality of first holes 1215h1. Further, the second hole 1215h2 may be provided as a plurality of second holes 1215h2. Further, the first hole 1215h1 and the second hole 1215h2 may have any shape such as a circular shape or a polygonal shape in a plan view. In one embodiment, the first hole 1215h1 and the second hole 1215h2 may have a circular shape.

The first hole 1215h1 may be located closer to the first center C1 than the second hole 1215h2. That is, a separation distance between the first hole 1215h1 and the first center C1 may be greater than a separation distance between the second hole 1215h2 and the first center C1. As an example, a separation distance d1 between the first hole 1215h1 and the first center C1 in the second direction (the Y-axis direction) may be smaller than a separation distance d2 between the second hole 1215h2 and the first center C1 in the second direction (the Y-axis direction). Further, a separation distance d3 between the first hole 1215h1 and the first center C1 may be greater than a separation distance d4 between the second hole 1215h2 and the first center C1. Here, the separation distance will be described on the basis of the first hole 1215h1 and the second hole 1215h2. Further, it should be understood that the separation distance may be applied as a minimum distance or a minimum distance.

Further, a radius r1 of the first hole 1215h1 may be greater than a radius r2 of the second hole 1215h2. Accordingly, a contact area between the housing 1210 and the mover is increased through the first hole 1215h1 closer to the first center C1 during the tilting. Accordingly, a support force of the housing with respect to the mover can be improved.

Further, protrusions 1215pr facing each other in the first direction (the X-axis direction) may be located on side surfaces of the second hole 1215h2. The protrusions 1215pr may be located to overlap each other in the first direction (the X-axis direction).

Further, the protrusion 1215pr may further include an extension part extending toward a center HC2 of the second hole or a third boss. That is, at least a portion of the protrusion 1215pr may be in contact with the third boss. Due to this configuration, the extension part can inhibit the Y-axis tilting from occurring while the mover performs the X-axis tilting. That is, the camera actuator according to the embodiment may perform the accurate X-axis tilting.

Further, the protrusion 1215pr may be located at a center of a side surface of the second hole 1215h2. In the fifth housing side part 1215, the side surface of the second hole 1215h2 may be an exposure surface exposed through the second hole 1215h2. Further, the side surface of the second hole 1215h2 may be an inner surface of the fifth housing side part 1215 on a plane XY. Further, the protrusion 1215pr may be located at the center of the side surface of the second hole 1215h2 in the third direction (the Z-axis direction). That is, the length of the side surface of the second hole 1215h2 in the third direction (the Z-axis direction) may be symmetrical with respect to the protrusion 1215*pr*. Due to this configuration, a space in which the third boss passing through the second hole 1215*h*2 performs the Y-axis tilting can be secured.

Referring to FIG. 5C, the first hole 1215*h*1 may have a step. Accordingly, a radius of a side surface of the first hole 1215*h*1 can be reduced in the third direction (the Z-axis direction).

The side surface of the first hole 1215*h*1 may include a first inner surface F1, a second inner surface F2, a third inner surface F3, and a fourth inner surface F4. The first inner surface F1 may be located at an outermost side based on the center HC1 of the first hole 1215*h*1. In other words, the first inner surface F1 may be a side surface having the greatest distance from the center HC1 of the first hole 1215*h*1. Hereinafter, it should be understood that a center of a hole may be a center of a circle or may be the center of gravity according to a shape of the hole.

Further, the second inner surface F2 is a flat surface in contact with the first inner surface F1 and may extend to the center HC1 of the first hole 1215*h*1. The second inner surface F2 may be a region on which the cap CP, which will be described below, is seated.

The third inner surface F3 is a surface in contact with the second inner surface F2 and the fourth inner surface F4 and may be an inclined surface. In one embodiment, the third inner surface F3 may be located to be inclined toward the mover in the housing.

The fourth inner surface F4 may be a side surface having the smallest distance from the center HC1 of the first hole 1215*h*1 among the side surfaces of the first hole 1215*h*1. The fourth inner surface F4 may be a surface closest to a second boss which will be described below.

Further, at least a portion of the fourth inner surface F4 may be spaced apart from the second boss in the first direction (the X-axis direction). In other words, a separation space may be located between the fourth inner surface F4 and the second boss, and the second boss rotated by the separation space so that the X-axis tilting or the Y-axis tilting may be performed.

Further, the fourth inner surface F4 may be located closer to the mover than the side surface of the second hole 1215*h*2, which will be described below. In one embodiment, the fourth inner surface F4 may be spaced apart from the second hole 1215*h*2 in the third direction and may not overlap the second hole 1215*h*2 in the first direction (the X-axis direction). Accordingly, a rotation radius of the second boss corresponding to the separation distance between the fourth inner surface F4 and the second boss may increase. As well, a space of the cap, which will be described below, can be easily secured.

Further, as described above, the groove OH may be located in an inner surface of the fifth housing side part 1215, and a first boss may be seated on the groove OH. The first boss may be in contact with the groove OH to perform the X-axis tilting or the Y-axis tilting.

Referring to FIG. 5D, the protrusion 1215*pr* may be located on the side surface of the second hole 1215*h*2. In other words, the housing 1210 or the fifth housing side part 1215 may include the protrusion 1215*pr*.

Further, the protrusion 1215*pr* may be located at the center of the side surface of the second hole 1215*h*2. In the fifth housing side part 1215, the side surface of the second hole 1215*h*2 may be an exposure surface exposed through the second hole 1215*h*2. Further, the side surface of the second hole 1215*h*2 may be an inner surface of the fifth housing side part 1215 on a plane XY.

Further, the protrusion 1215*pr* may be located at the center of the side surface of the second hole 1215*h*2 in the third direction (the Z-axis direction). Due to this configuration, during the Y-axis tilting, the third boss may not be in contact with a bottom surface F5 of the second hole 1215*h*. Accordingly, the third boss in contact with the protrusion 1215*pr* can easily perform the Y-axis tilting. As well, the protrusion 1215*pr* can easily support the third boss.

Further, the protrusions 1215*pr* may be arranged to be symmetrical to each other with respect to the center HC2 of the second hole 1215*h*2. Further, the protrusions 1215*pr* may be located to overlap each other in the first direction (the X-axis direction) while facing each other inside the second hole 1215*h*2. Due to this configuration, the protrusion 1215*pr* can inhibit inaccurate tilting by performing the Y-axis tilting while the mover performs the X-axis tilting. That is, the camera actuator according to the embodiment can perform the accurate X-axis tilting.

Further, the side surface of the second hole 1215*h*2 may have a step formed by the protrusion 1215*pr*. In one embodiment, a predetermined angle between the bottom surface F5 of the second hole 1215*h*2 and a side surface F6 of the protrusion 1215*pr* may be provided.

Further, an end surface F7 of an extension part 1215*pra* may be in contact with the third boss. In one embodiment, the end surface F7 may have a curvature. Further, the extension part 1215*pra* may be convex toward the third boss or the center HC2 of the second hole 1215*h*2. Accordingly, the third boss in contact with the extension part 1215*pra* can easily perform the Y-axis tilting, and the protrusion 1215*pr* can be inhibited from being damaged by the tiling.

Further, as described above, since the protrusion 1215*pr* is located at the center of the side surface of the second hole 1215*h*2, the side surface of the protrusion 1215*pr* and the bottom surface F5 of the second hole 1215*h*2 may be located to be symmetrical to each other with respect to the end surface F7 of the extension part 1215*pra*.

Further, a region of the side surface of the second hole 1215*h*2 except for the protrusion 1215*pr* may be spaced apart from the third boss. Accordingly, the third boss can easily perform the X-axis tilting.

Referring to FIG. 5E, the first holes 1215*h*1 may be located between the second holes 1215*h*2 adjacent to each other in the second direction (the Y-axis direction). Further, the centers HC1 of the first holes 1215*h*1 may be located between the centers HC2 of the second holes 1215*h*2 adjacent to each other in the second direction (the Y-axis direction).

Further, the maximum diameter of the first hole 1215*h*1 may be greater than the maximum diameter of the second hole 1215*h*2. Accordingly, a coupling force between the housing and the mover can be improved through coupling of the second hole 1215*h*2 and the third boss while easily adjusting a tilting radius through the first hole 1215*h*1 and the cap.

Figure 6B:
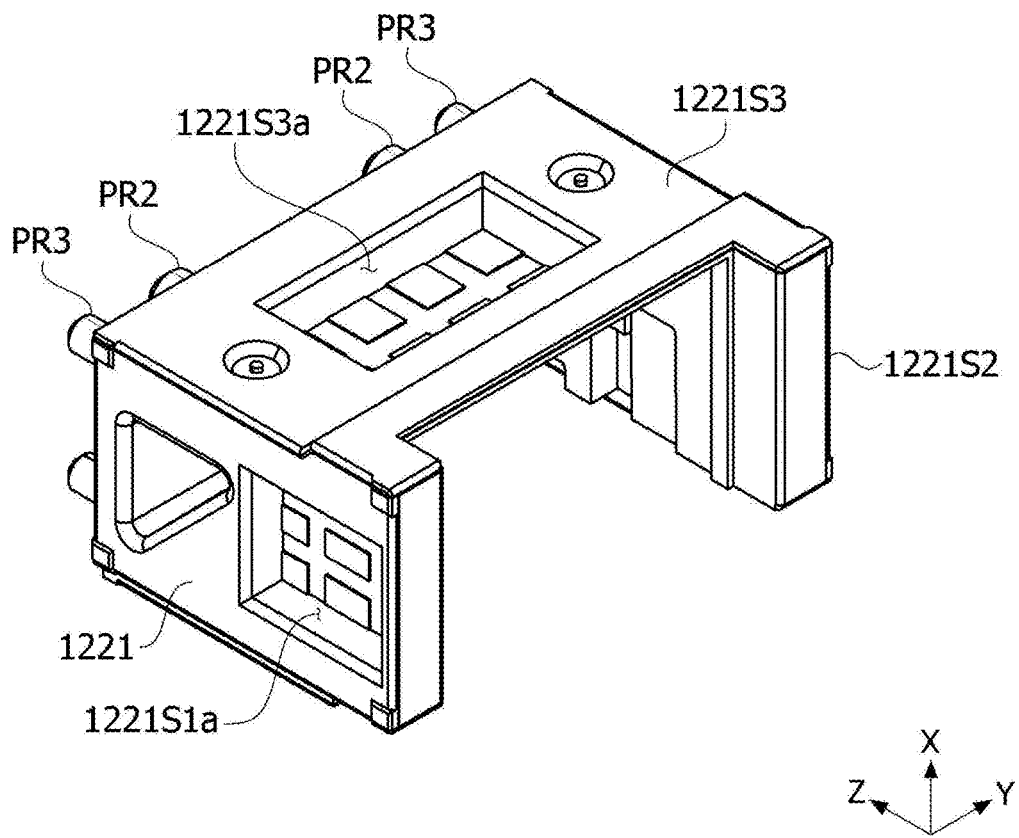
FIG. 6B is a bottom view of the mover according to an embodiment.
Figure 6C:
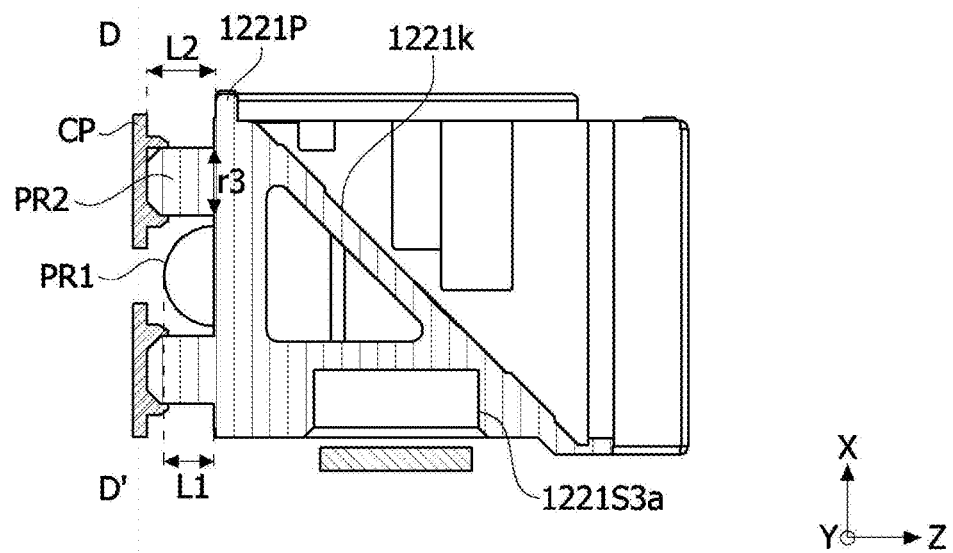
FIG. 6C is a cross-sectional view along line DD' of FIG. 6A.
Figure 6D:
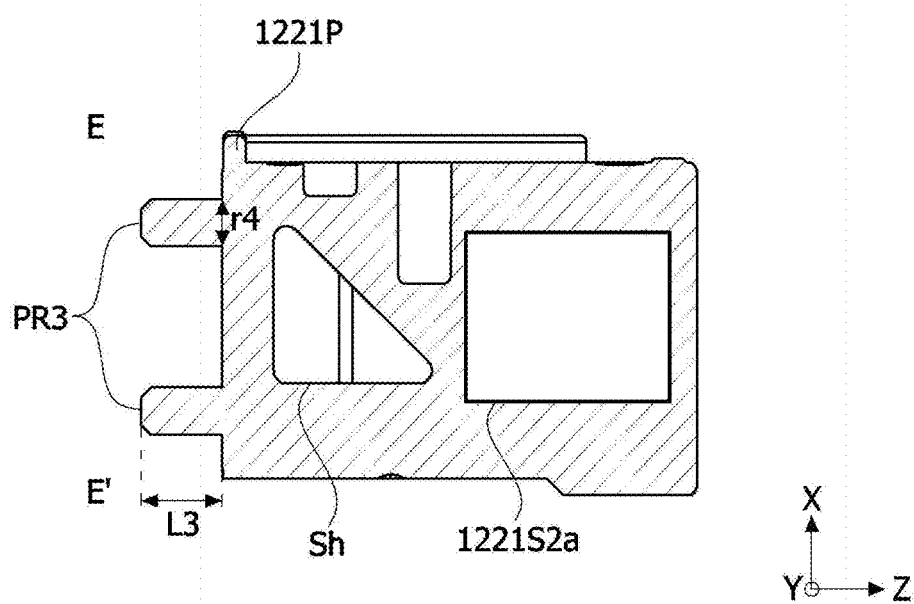
FIG. 6D is a cross-sectional view along line EE' of FIG. 6A.
Figure 6E:
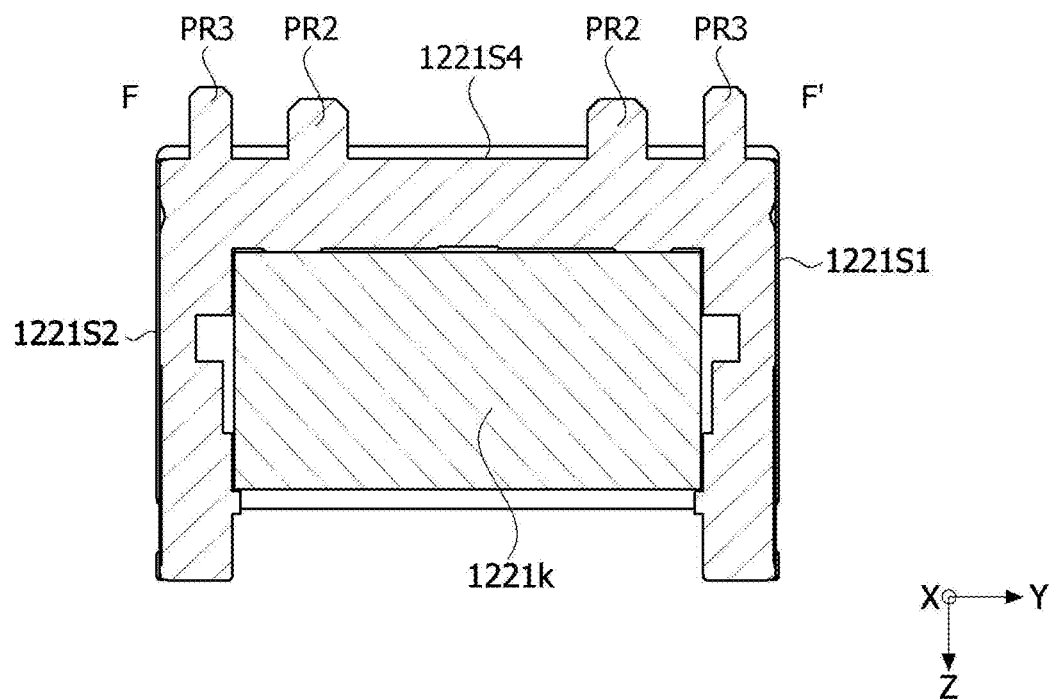
FIG. 6E is a cross-sectional view along line FF' of FIG. 6A.

FIG. 6A is a perspective view of a mover according to an embodiment, FIG. 6B is a bottom view of the mover according to an embodiment, FIG. 6C is a cross-sectional view along line DD' of FIG. 6A, FIG. 6D is a cross-sectional view along line EE' of FIG. 6A, and FIG. 6E is a cross-sectional view along line FF' of FIG. 6A.

Referring to FIGS. 6A to 6E, the mover according to the embodiment may include the holder 1221, the cap CP, and the optical member 1222. The above description may be equally applied to a description of the optical member 1222.

The holder 1221 may include a plurality of outer surfaces. In one embodiment, the holder 1221 may include a first outer holder surface 1221S1, a second outer holder surface 1221S2, a third outer holder surface 1221S3, and a fourth outer holder surface 1221S4.

The first outer holder surface 1221S1 may be located to face the second outer holder surface 1221S2. The first outer holder surface 1221S1 may be disposed to be symmetrical to the second outer holder surface 1221S2 in the first direction (the X-axis direction).

The first outer holder surface 1221S1 may be located to face the first housing side part. Further, the second outer holder surface 1221S2 may be located to face the second housing side part.

Further, the first outer holder surface 1221S1 may include a first seating groove 1221S1a. Further, the second outer holder surface 1221S2 may include a second seating groove 1221S2a. The first seating groove 1221S1a and the second seating groove 1221S2a may be arranged to be symmetrical to each other in the first direction (the X-axis direction).

Further, the first yoke and the first magnet may be arranged in the first seating groove 1221S1a, and the second yoke and the second magnet may be arranged in the second seating groove 1221S2a.

The third outer holder surface 1221S3 may be located between the first outer holder surface 1221S1 and the second outer holder surface 1221S2 and may be in contact with the first outer holder surface 1221S1 and the second outer holder surface 1221S2. Further, the third outer holder surface 1221S3 may be a surface extending from one sides of the first outer holder surface 1221S1 and the second outer holder surface 1221S2 in the second direction (the Y-axis direction). The third outer holder surface 1221S3 may be a bottom surface of the holder 1221.

Further, the third outer holder surface 1221S3 may include a third seating groove 1221S3a. The third yoke and the third magnet may be located in the third seating groove 1221S3a.

The fourth outer holder surface 1221S4 may be an outer surface that is in contact with the first outer holder surface 1221S1 and the second outer holder surface 1221S2 and extends from the first outer holder surface 1221S1 and the second outer holder surface 1221S2 in the first direction (the X-axis direction). Further, the fourth outer holder surface 1221S4 may be located between the first outer holder surface 1221S1 and the second outer holder surface 1221S2.

The fourth outer holder surface 1221S4 may include a plurality of bosses. In one embodiment, the fourth outer holder surface 1221S4 may include a first boss PR1, a second boss PR2, and a third boss PR3. The first boss PR1, the second boss PR2, and the third boss PR3 may extend toward the housing, particularly, the fourth housing side part.

Further, the holder 1221 may include a seating surface 1221k on which the optical member 1222 is seated. The seating surface 1221k may be an inclined surface and may be located inside the holder 1221. Further, the holder 1221 may include a step portion (not illustrated) on the seating surface 1221k and may be coupled to a boss portion (not illustrated) of the optical member 1222.

The first boss PR1 may be located in a second center C2 of the fourth outer holder surface 1221S4. The second center C2 may be the center of gravity of the fourth outer holder surface 1221S4. Further, the first boss PR1 may be located to correspond to the above-described groove.

Further, the second center C2 of the fourth outer holder surface 1221S4 may be an intersection between a third virtual line VL3 and a fourth virtual line VL4 that each bisect the fourth outer holder surface 1221S4 in the first direction (the X-axis direction) and the second direction (the Y-axis direction).

The third virtual line VL3 may be a line that bisects a seventh corner M7 and an eighth corner M8 of the fourth outer holder surface 1221S4. The third virtual line VL3 may be parallel to the second direction (the Y-axis direction).

The fourth virtual line VL4 may be a line that bisects a fifth corner M5 and a sixth corner M6 of the fourth outer holder surface 1221S4. The fourth virtual line VL4 may be parallel to the first direction (the X-axis direction).

Further, the fifth corner M5 and the sixth corner M6 may be located to face each other and may be located to correspond to each other in the second direction (the Y-axis direction). Further, the seventh corner M7 and the eighth corner M8 may be located to face each other and may be located to correspond to each other in the first direction (the X-axis direction).

The first boss PR1 may be located at the center of the fourth outer holder surface 1221S4 and inhibit the weight from being concentrated to one side when the mover performs the X-axis tilting or the Y-axis tilting.

The second boss PR2 may be located to correspond to the first hole. The second boss PR2 may be spaced apart from the first boss PR1. In other words, the second boss PR2 may be spaced apart from the center of the fourth outer holder surface 1221S4. Further, the second boss PR2 may be disposed to surround the first boss PR1. Hereinafter, as illustrated in the drawings, an example of a case in which four second bosses PR2 are present will be described.

The plurality of second bosses PR2 may be located to be symmetrical with respect to the third virtual line VL3 or the fourth virtual line VL4. Due to this configuration, structural stability may be provided when the mover is tilted in two axes with respect to the first boss PR1.

The caps CP may be located correspond to the second bosses PR2. The cap CP may include a groove and may be coupled to the second boss PR2 through the groove. The second boss PR2 may be seated on the groove of the cap CP. An adhesive member or the like for coupling between the cap CP and the second boss PR2 may be disposed. Further, the second boss PR2 may be coupled to the cap CP through the first hole. Accordingly, separation between the holder 1221 and the housing can be inhibited. That is, the reliability of the camera actuator according to the embodiment can be improved.

Further, the second boss PR2 may be spaced apart from the first hole as described above. As well, the cap CP may be spaced apart from the first hole. This spacing makes it easy for the mover to perform the X-axis tilting or the Y-axis tilting.

Further, the first boss PR1 and the second boss PR2 may overlap the seating surface 1221k in the third direction (the Z-axis direction). In other words, the first boss PR1 and the second boss PR2 may overlap the optical member 1222 in the third direction (the Z-axis direction).

The third boss PR3 may be located to correspond to the second hole. In one embodiment, the third boss PR3 may be provided as a plurality of third bosses PR3, and an example of a case in which four third bosses PR3 are present will be described.

Further, the third boss PR3 may be spaced apart from the first boss PR1 and the second boss PR2. The third boss PR3 may be spaced apart from the second center C2 of the fourth outer holder surface 1221S4.

Further, the third boss PR3 may have a larger separation distance from the first boss PR1 than from the second boss PR2. In one embodiment, a minimum distance dd2 between the third boss PR3 and the first boss PR1 may be greater than a minimum distance dd1 between the second boss PR2 and the first boss PR1.

Further, the third boss PR3 may not overlap the seating surface 1221*k* in the third direction (the Z-axis direction). In other words, the third boss PR3 may not overlap the optical member 1222 in the third direction (the Z-axis direction). Accordingly, since the third boss PR3 is in contact with a third hole outside the optical member 1222, vibration of the holder 1221 can be minimized, and accurate tilting can be provided.

A length L1 of the first boss PR1 in the third direction (the Z-axis direction) may be smaller than a length L2 of the second boss PR2 in the third direction (the Z-axis direction) and a length L3 of the third boss PR3 in the third direction (the Z-axis direction).

Further, the length L2 of the second boss PR2 in the third direction (the Z-axis direction) may be smaller than the length L3 of the third boss PR3 in the third direction (the Z-axis direction).

Due to this configuration, the third boss PR3 may not be separated from the second hole even when moving in the second hole during the X-axis tilting or the Y-axis tilting. That is, the reliability of the camera actuator can be improved.

Further, a diameter r3 of the second boss PR2 may be greater than a diameter r4 of the third boss PR3. Accordingly, the second boss PR2 may be easily coupled to the cap CP to easily inhibit separation between the holder 1221 and the housing. Further, the second boss PR2 may increase the contact area between the housing 1210 and the mover through the adjacent first hole, thereby improving a support force of the housing with respect to the mover.

Further, the holder 1221 may include a mover stopper 1221*p* disposed on an upper side thereof to extend along the first outer holder surface 1221S1, the second outer holder surface 1221S2, and the fourth outer holder surface 1221S4. The mover stopper 1221*p* may be located in the fourth housing hole. Accordingly, the mover stopper 1221*p* may operate as a stopper when the mover 1220 performs the X-axis tilting or the Y-axis tilting. That is, an element such as an optical member can be easily inhibited from colliding with another element by tilting.

Figure 7:
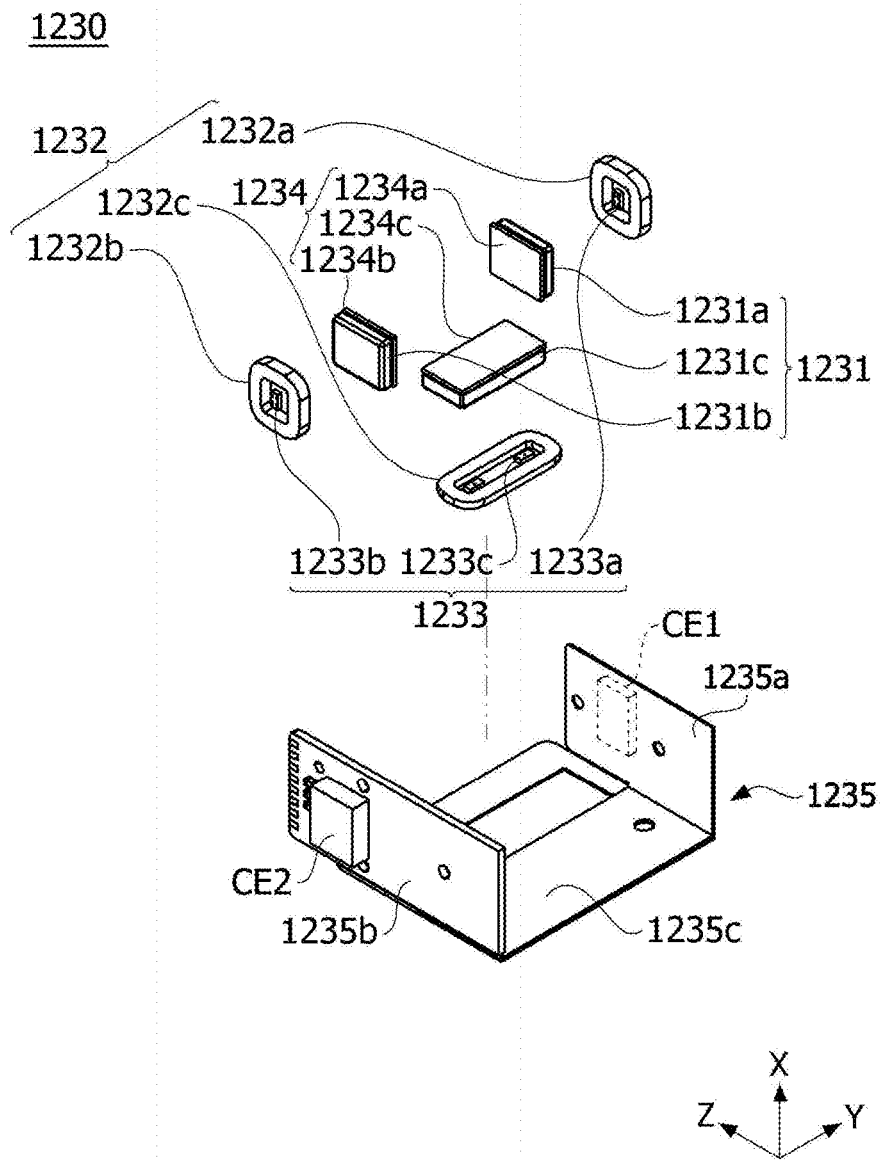
FIG. 7 is a perspective view of a driving unit according to an embodiment.

FIG. 7 is a perspective view of a driving unit according to an embodiment.

Referring to FIG. 7, the driving unit 1230 according to the embodiment includes the driving magnet 1231, the driving coil 1232, the Hall sensor unit 1233, the yoke part 1234, and the board part 1235.

The second camera actuator according to the embodiment may control the mover to be rotated in the first axis direction (the X-axis direction) or the second axis direction (the Y-axis direction) by an electromagnetic force between the driving magnet 1231 and the driving coil 1232, to minimize occurrence of the decenter phenomenon or the tilting phenomenon when the OIS is implemented, thereby providing the best optical properties.

The driving magnet 1231 may include a plurality of magnets. In one embodiment, the driving magnet 1231 may include a first magnet 1231*a*, a second magnet 1231*b*, and a third magnet 1231*c*.

The first magnet 1231*a*, the second magnet 1231*b*, and the third magnet 1231*c* may be located on the outer surface of the holder 1221. In one embodiment, the first magnet 1231*a* may be located inside the first seating groove. The second magnet 1231*b* may be located inside the second seating groove. Further, the third magnet 1231*c* may be located inside the third seating groove.

The driving coil 1232 may include a plurality of coils. In one embodiment, the driving coil 1232 may include the first coil 1232*a*, the second coil 1232*b*, and the third coil 1232*c*.

The first coil 1232*a* may be located to face the first magnet 1231*a*. The first coil 1232*a* may be located in the first housing hole of the first housing side part as described above. Further, when a current flows in the first coil 1232*a*, the first magnet 1231*a* may generate a force in which a magnetic field generated by the first coil 1232*a* is reflected.

Further, the second coil 1232*b* may be located to face the second magnet 1231*b*. The second coil 1232*b* may be located in the second housing hole of the second housing side part as described above. Further, when a current flows in the second coil 1232*b*, the second magnet 1231*b* may generate a force in which a magnetic field generated by the second coil 1232*b* is reflected.

Further, the first coil 1232*a* may be located to face the second coil 1232*b*. That is, the first coil 1232*a* may be located to be symmetrical to the second coil 1232*b* in the first direction (the X-axis direction). This may be equally applied even to the first magnet 1231*a* and the second magnet 1231*b* as described above. That is, the first magnet 1231*a* and the second magnet 1231*b* may be located to be symmetrical to each other in the first direction (the X-axis direction).

Further, the first coil 1232*a*, the second coil 1232*b*, the first magnet 1231*a*, and the second magnet 1231*b* may be arranged to at least partially overlap each other in the second direction (the Y-axis direction). Due to this configuration, the X-axis tilting can be accurately performed without inclination to one side by using an electromagnetic force between the first coil 1232*a* and the first magnet 1231*a* and an electromagnetic force between the second coil 1232*b* and the second magnet 1231*b*.

The third coil 1232*c* may be located to face the third magnet 1231*c*. Accordingly, the third coil 1232*c* may be located in the third housing hole of the third housing side part as described above. The third coil 1232*c*, together with the third magnet 1231*c*, may generate an electromagnetic force, and thus the Y-axis tilting of the mover 1220 with respect to the housing 1210 may be performed.

The Hall sensor unit 1233 may include a plurality of Hall sensors. As described above, in one embodiment, the first Hall sensor 1233*a* may be located inside the first coil 1232*a*. The first Hall sensor 1233*a* may detect a change in magnetic flux inside the first coil 1232*a*.

The second Hall sensor 1233*b* may be located inside the second coil 1232*b*. The second Hall sensor 1233*b* may detect a change in magnetic flux inside the second coil 1232*b*.

Accordingly, location sensing between the first and second magnets 1231*a* and 1231*b* and the first and second Hall sensors 1233*a* and 1233*b* may be performed. Therefore, the second camera actuator according to the embodiment may control the X-axis tilting.

Further, the third Hall sensor 1233*c* may be located inside the third coil 1232*c*. The third Hall sensor 1233*c* may detect a change in magnetic flux inside the third coil 1232*c*. Accordingly, location sensing between the third magnet 1231*c* and the third second Hall sensor 1233*c* may be performed. Therefore, the second camera actuator according to the embodiment may control the Y-axis tilting.

The yoke part 1234 may include the first yoke 1234*a*, the second yoke 1234*b*, and the third yoke 1234*c*. The above description may be equally applied to a description thereof.

The board part 1235 may include a first board side part 1235a, a second board side part 1235b, and a third board side part 1235c.

The first board side part 1235a and the second board side part 1235b may be arranged to face each other. Further, the third board side part 1235c may be located between the first board side part 1235a and the second board side part 1235b.

The first board side part 1235a may be coupled and electrically connected to the first coil 1232a. Further, the first board side part 1235a may be coupled and electrically connected to the first Hall sensor 1233a.

The second board side part 1235b may be coupled and electrically connected to the second coil 1232b. Further, it should be understood that the second board side part 1235b may be coupled and electrically connected to the second Hall sensor 1233b.

The third board side part 1235c may be coupled and electrically connected to the third coil 1232c. Further, the third board side part 1235c may be coupled and electrically connected to the third Hall sensor 1233c.

Further, the first board side part 1235a, the second board side part 1235b, and the third board side part 1235c may be integrally formed or separately formed. As well, a first circuit element CE1 and a second circuit element CE2 may be arranged in the first board side part 1235a, the second board side part 1235b, and the third board side part 1235c and may be electrically connected to the first board side part 1235a, the second board side part 1235b, and the third board side part 1235c. The first circuit element CE1 and the second circuit element CE2 may include a driver, an integrated circuit (IC), a sensor (e.g., a gyro sensor), and the like.

Figure 8A:
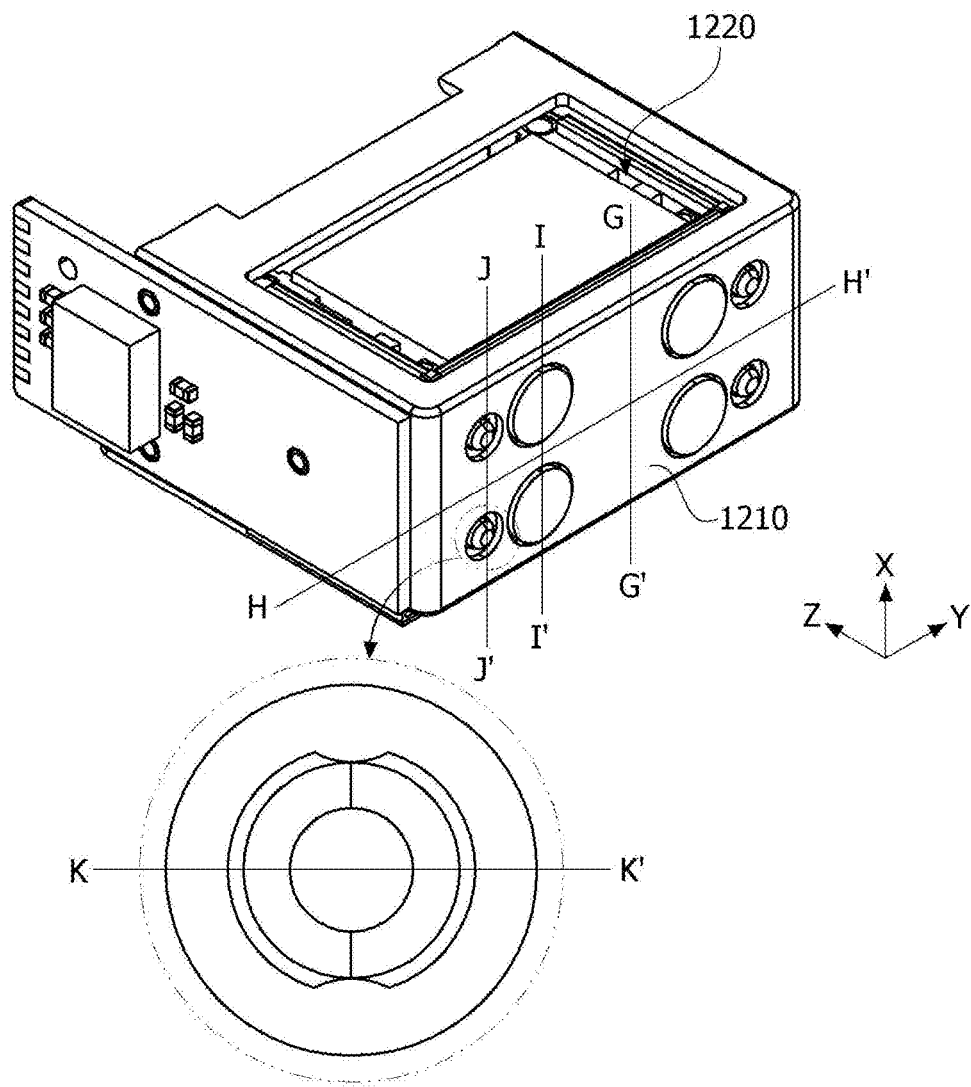
FIG. 8A is a perspective view of the second camera actuator according to an embodiment.
Figure 8B:
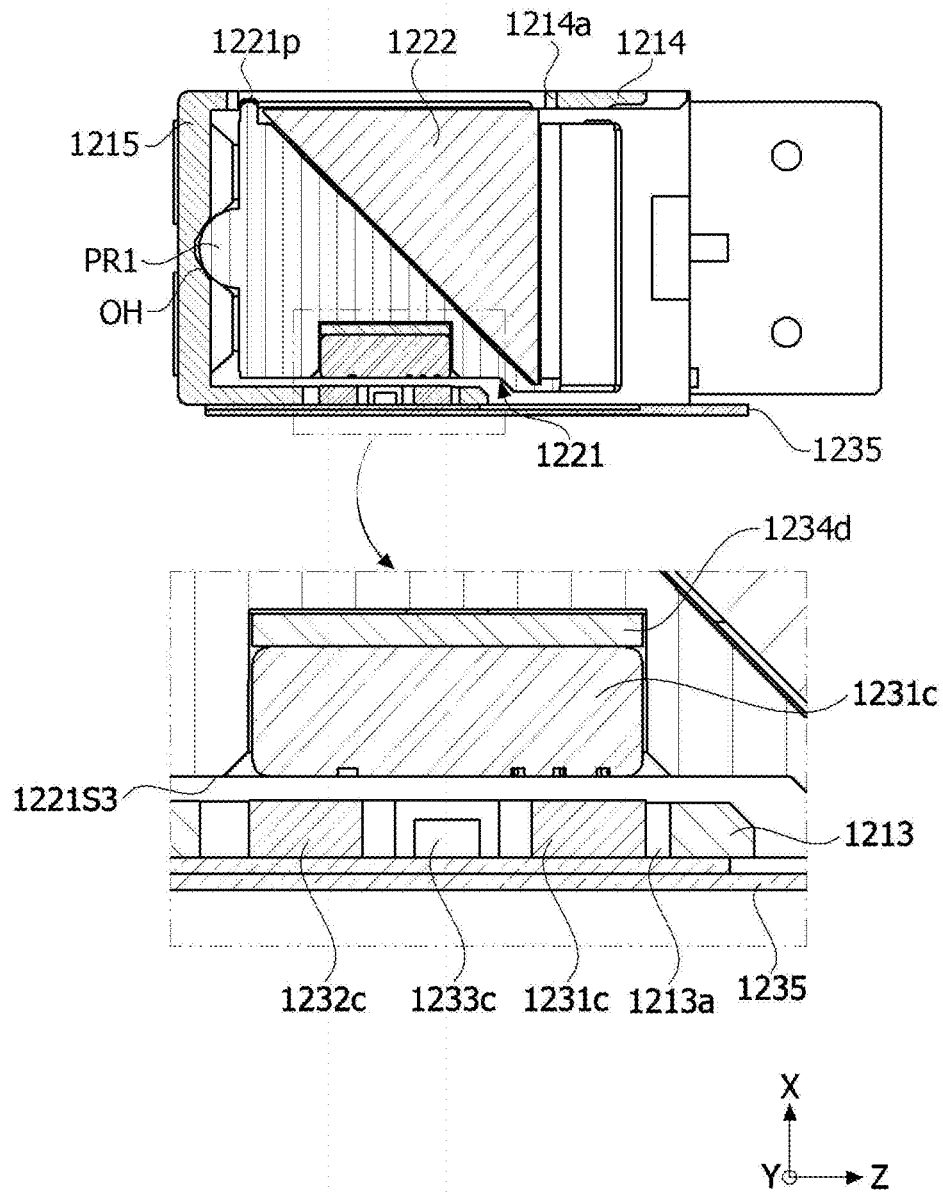
FIG. 8B is a cross-sectional view along line GG' of FIG. 8A.
Figure 8C:
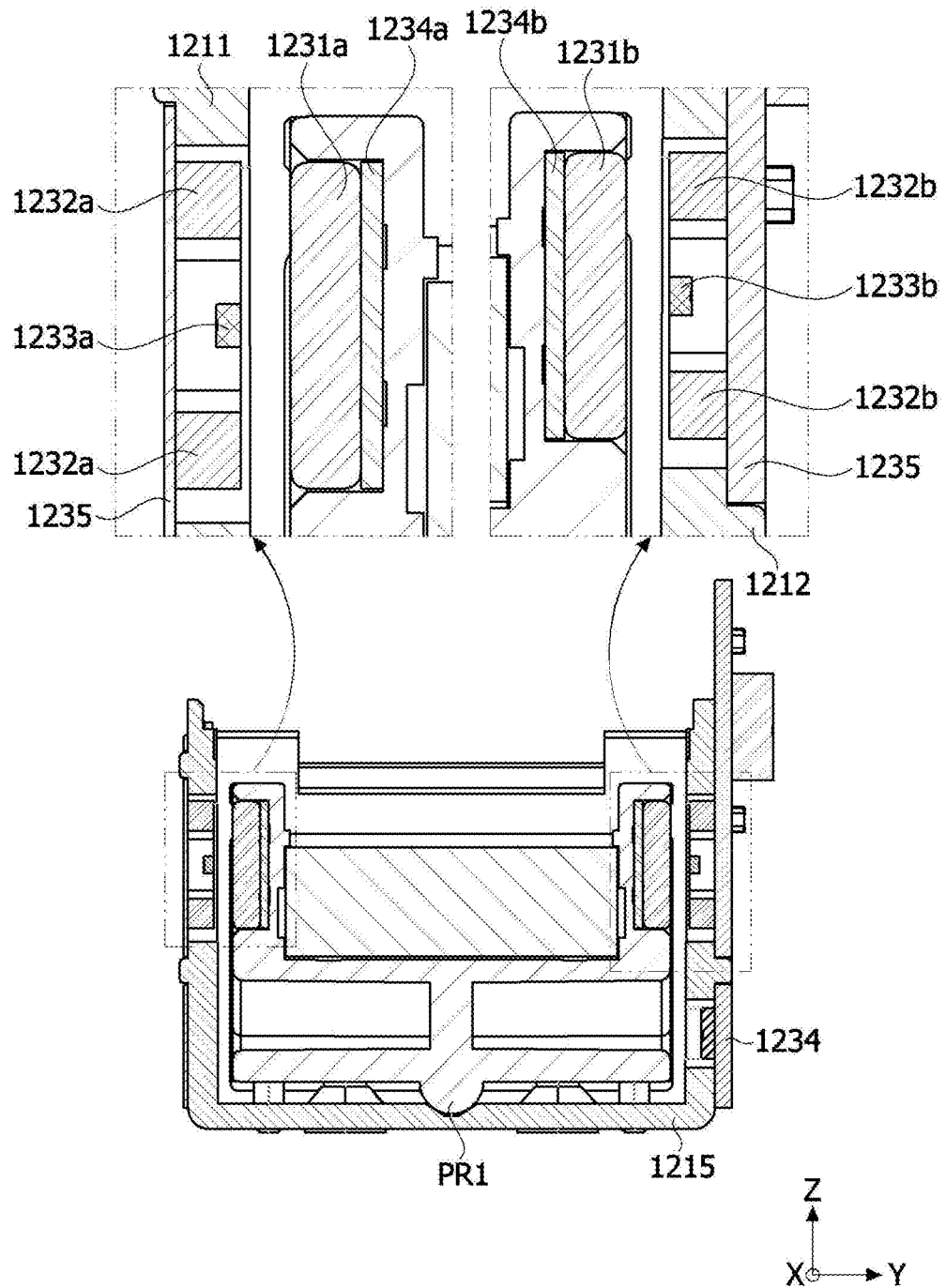
FIG. 8C is a cross-sectional view along line HH' of FIG. 8A.
Figure 8D:
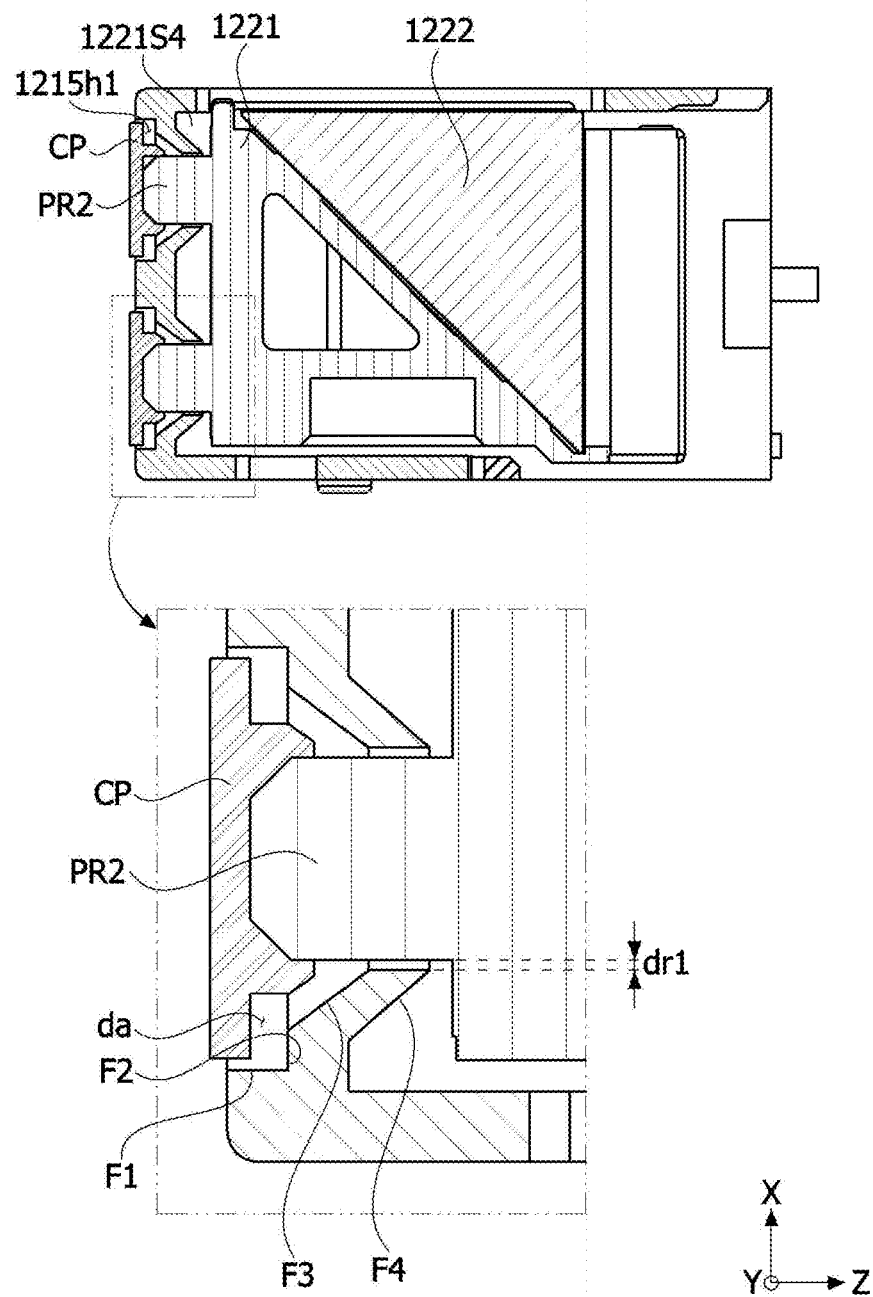
FIG. 8D is a cross-sectional view along line II' of FIG. 8A.
Figure 8F:
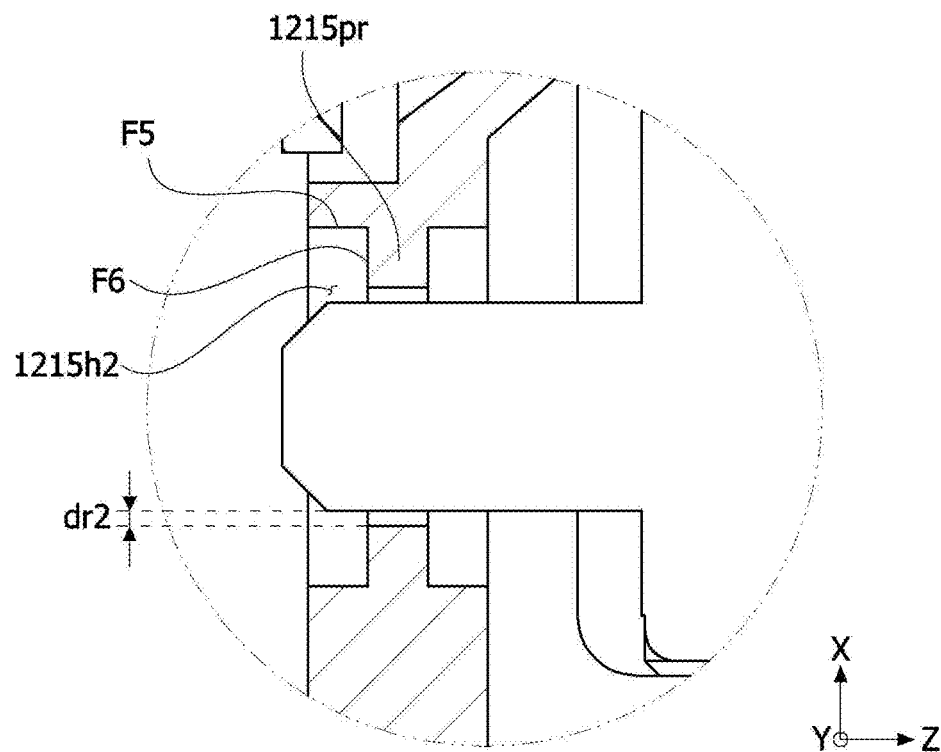
FIG. 8F is a cross-sectional view along line KK' of FIG. 8A.

FIG. 8A is a perspective view of the second camera actuator according to an embodiment, FIG. 8B is a cross-sectional view along line GG' of FIG. 8A, FIG. 8C is a cross-sectional view along line HH' of FIG. 8A, FIG. 8D is a cross-sectional view along line II' of FIG. 8A, FIG. 8E is a cross-sectional view along line JJ' of FIG. 8A, and FIG. 8F is a cross-sectional view along line KK' of FIG. 8A.

Referring FIGS. 8A to 8C, the first coil 1232a may be located in the first housing side part 1211, and the first magnet 1231a and the first yoke 1234a may be located inside the first seating groove on the first outer holder surface. Further, the first coil 1232a and the first magnet 1231a may be located to face each other. In one embodiment, the first magnet 1231a may at least partially overlap the first coil 1232a in the second direction (the Y-axis direction).

The second coil 1232b may be located on the second housing side part 1212, and the second magnet 1231b and the second yoke 1234b may be located inside the second seating groove on the second outer holder surface 1221S2. Accordingly, the second coil 1232b and the second magnet 1231b may be located to face each other. In one embodiment, the second magnet 1231b may at least partially overlap the second coil 1232b in the second direction (the Y-axis direction).

Further, the first coil 1232a and the second coil 1232b may overlap each other in the second direction (the Y-axis direction), and the first magnet 1231a and the second magnet 1231b may overlap each other in the second direction (the Y-axis direction). Due to this configuration, an electromagnetic force applied to the outer surface (for example, the first outer holder surface and the second outer holder surface) of the holder 1221 may be provided to be coaxial with the first outer holder surface 1221S1 and the second outer holder surface 1221S2 due to the locations of the first and second seating grooves and the first and second magnets. For example, a region (for example, a portion having the strongest electromagnetic force) applied onto the first outer holder surface 1221S1 and a region (for example, a portion having the strongest electromagnetic force) applied onto the second outer holder surface 1221S1 may be located on an axis parallel to the second direction (the Y-axis direction). Accordingly, the X-axis tilting can be accurately performed.

Further, as described above, the first Hall sensor 1233a and the second Hall sensor 1233b may be located outside the housing 1210 to be electrically connected and coupled with the board part 1235. However, the embodiments are not limited to the above location.

Further, the third outer holder surface 1221S3 may be located to face the third housing side part 1213. Further, the third coil 1232c may be located inside the third housing hole 1213a of the third housing side part 1213, and the third magnet 1231c and the third yoke 1234c may be located in the third seating groove of the third outer holder surface 1221S3.

The third seating groove may at least partially overlap the third housing hole 1213a in the first direction (the X-axis direction). Accordingly, the third magnet 1231c in the third seating groove and the third coil 1232c in the third housing hole 1213a may be located to face each other.

The third coil 1232c and the third magnet 1231c may at least partially overlap each other in the first direction (the X-axis direction). Accordingly, the intensity of the electromagnetic force between the third coil 1232c and the third magnet 1231c can be easily controlled.

Further, the third magnet and the third coil generates the electromagnetic force, so that the camera actuator according to the embodiment may perform the Y-axis tilting.

Further, the X-axis tilting may be performed by the plurality of magnets (the first and second magnets 1231a and 1231b, but the Y-axis tilting may be performed only by the third magnet 1231c. In one embodiment, the width of the third seating groove may be greater than the width of the first seating groove or the second seating groove. Due to this configuration, the Y-axis tilting may be performed using current control similar to that of the X-axis tilting.

Referring to FIG. 8D, the second boss PR2 may pass through the first hole 1215h1 and may be coupled to the cap CP at an end thereof. The cap CP may surround the end of the second boss PR2. Further, the cap CP may at least partially overlap the first hole 1215h1 in the first direction (the X-axis direction). Accordingly, the cap CP can improve a coupling force between the holder 1221 and the housing and inhibit separation therebetween.

Further, the second boss PR2 may be spaced apart from the side surface of the first hole 1215h1. In one embodiment, the second boss PR2 may have a minimum separation distance dr1 from the fourth inner surface F4. Through this minimum separation distance dr1, the mover may perform the X-axis tilting and the Y-axis tilting. As well, each of the housing side parts may be spaced apart from a corresponding one of the outer holder surfaces. For example, the third housing side part 1213 and the third outer holder surface 1221S3 are spaced apart from each other in the first direction, and thus the X-axis tilting can be easily performed.

Further, the cap CP may be spaced apart from the side surface of the first hole 1215h1. In one embodiment, a separation distance da may be present between the cap CP and the first hole 1215h1. Accordingly, the mover can easily perform the X-axis tilting and the Y-axis tilting. Further, tilting radii of the X-axis tilting and the Y-axis tilting may be limited by the separation distance da. In other words, the cap CP may function as a stopper.

Referring to FIGS. 8E and 8F, the third boss PR3 may pass through the second hole 1215h2. In this case, as described above, the protrusion 1215pr may be located at the center of the side surface of the second hole 1215h2 in the third direction (the Z-axis direction). Accordingly, the length of the side surface of the second hole 1215h2 in the third direction (the Z-axis direction) may be symmetrical with respect to the protrusion 1215pr. For example, the length of the side surface of the second hole 1215h2 in the third direction (the Z-axis direction) may be bisected with respect to the protrusion 1215pr. Further, the protrusion 1215pr may further include the extension part 1215pra extending from an end thereof toward the third boss PR3. The extension parts 1215pra may be located to overlap each other in the first direction (the X-axis direction) while facing each other inside the second hole 1215h2. Further, the extension parts 1215pra may be arranged to be symmetrical to each other with respect to the center of the second hole 1215h2.

Further, the extension part 1215pra may perform the Y-axis tilting while performing the X-axis tilting while in contact with the third boss PR3, thereby inhibiting inaccurate tilting. That is, the camera actuator according to the embodiment may perform the accurate X-axis tilting.

Further, the end surface F7 of the extension part 1215pra may be in contact with the third boss. In one embodiment, the end surface F7 may have a curvature. Accordingly, the third boss in contact with the end surface F7 can easily perform the Y-axis tilting, and the protrusion 1215pr can be inhibited from being damaged by the tiling.

In one embodiment, the protrusion 1215pr may have a separation distance dr2 from the third boss PR3. Due to this separation distance dr2, the third boss PR3 may move inside the second hole 1215h2 in a left-right direction. That is, the mover may perform the X-axis tilting.

Figure 9A:
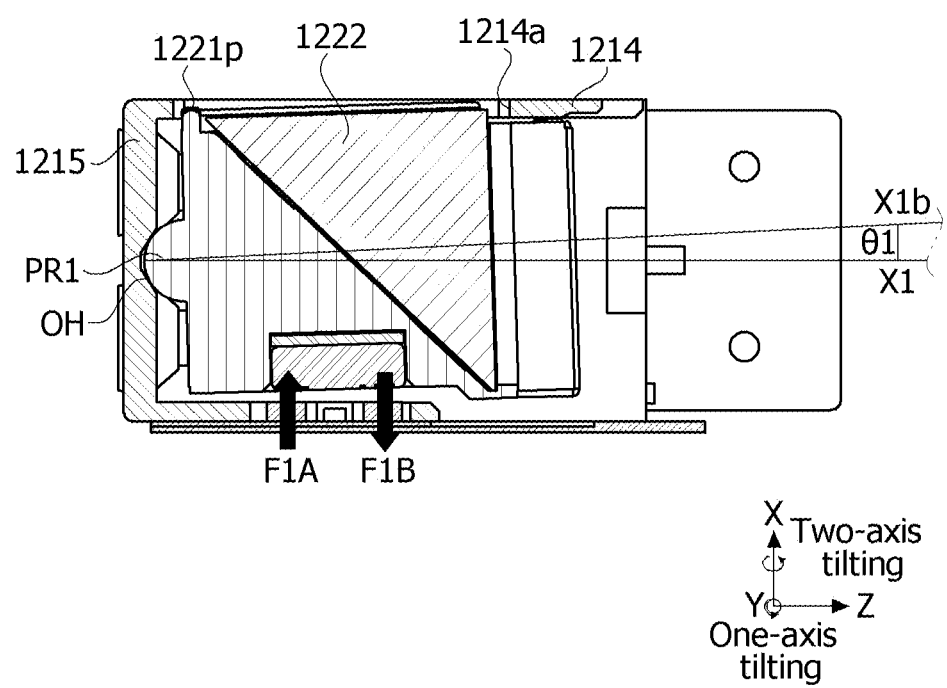

FIGS. 9A and 9B are views for describing Y-axis tilting of the second camera actuator.

Referring to FIGS. 9A and 9B, the Y-axis tilting may be performed. That is, the mover may rotate in the first direction (the X-axis direction) to implement the OIS.

In one embodiment, the third magnet 1231c disposed below the holder 1221 may generate an electromagnetic force together with the third coil 1232c to tilt or rotate the first boss PR1 (or the mover) in the second direction (the Y-axis direction).

The OIS may be implemented by rotating the mover 1220 at a first angle θ1 in the X-axis direction (X1→X1a or X2→X2b) by first electromagnetic forces F1A and F1B between the third magnet 1231c disposed in the third seating groove and the third coil 1232c disposed in the third housing side part. That is, the mover 1220 may be rotated at the first angle θ1 by adjusting the intensities of the first electromagnetic forces F1A and F1B. The first angle θ1 may be in the range of ±1° to ±4°. However, the present invention is not limited thereto.

Figure 10B:
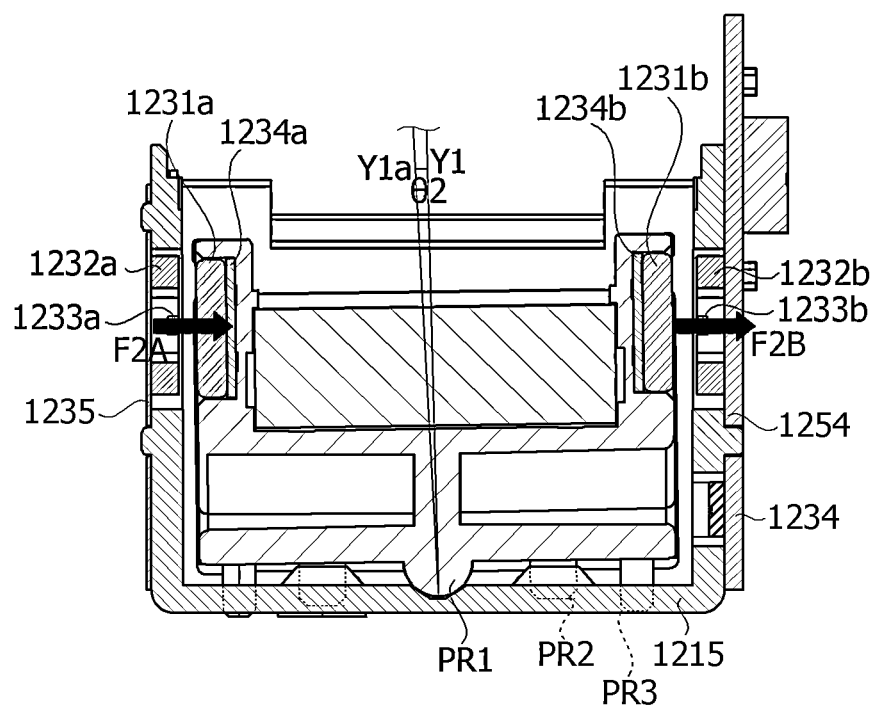

FIGS. 10A and 10B are views for describing X-axis tilting of the second camera actuator.

Referring to FIGS. 10A and 10B, the X-axis tilting may be performed. That is, while the mover is tilted or rotated in the Y-axis direction, the OIS may be implemented.

In one embodiment, the first magnet 1231a and the second magnet 1231b arranged in the holder 1221 may respectively generate electromagnetic forces together with the first coil 1232a and the second coil 1232b, thereby tilting or rotating the first boss PR1 (or the mover) in the first direction (the X-axis direction).

Further, the OIS may be implemented by rotating the first boss PR1 (or the mover) at a second angle θ2 in the Y-axis direction (Y1→Y1a or X2→X2b) by second electromagnetic forces F2A and F2B between the first and second magnets 1231a and 1231b disposed in the first seating groove and the first and second coils 1232a and 1232b disposed in the first and second housing side parts. That is, the mover 1220 may be rotated at the second angle θ2 by adjusting the intensities of the second electromagnetic forces F2A and F2B. The second angle θ2 may be in the range of ±1° to ±4°. However, the present invention is not limited thereto.

In this way, the second camera actuator according to the embodiment may control the mover to be rotated in the first axis direction (the X-axis direction) or the second axis direction (the Y-axis direction) by the electromagnetic force between the driving magnet in the holder and the driving coil disposed in the housing, to minimize occurrence of the decenter phenomenon or the tilting phenomenon when the OIS is implemented, thereby providing the best optical properties.

Figure 11:
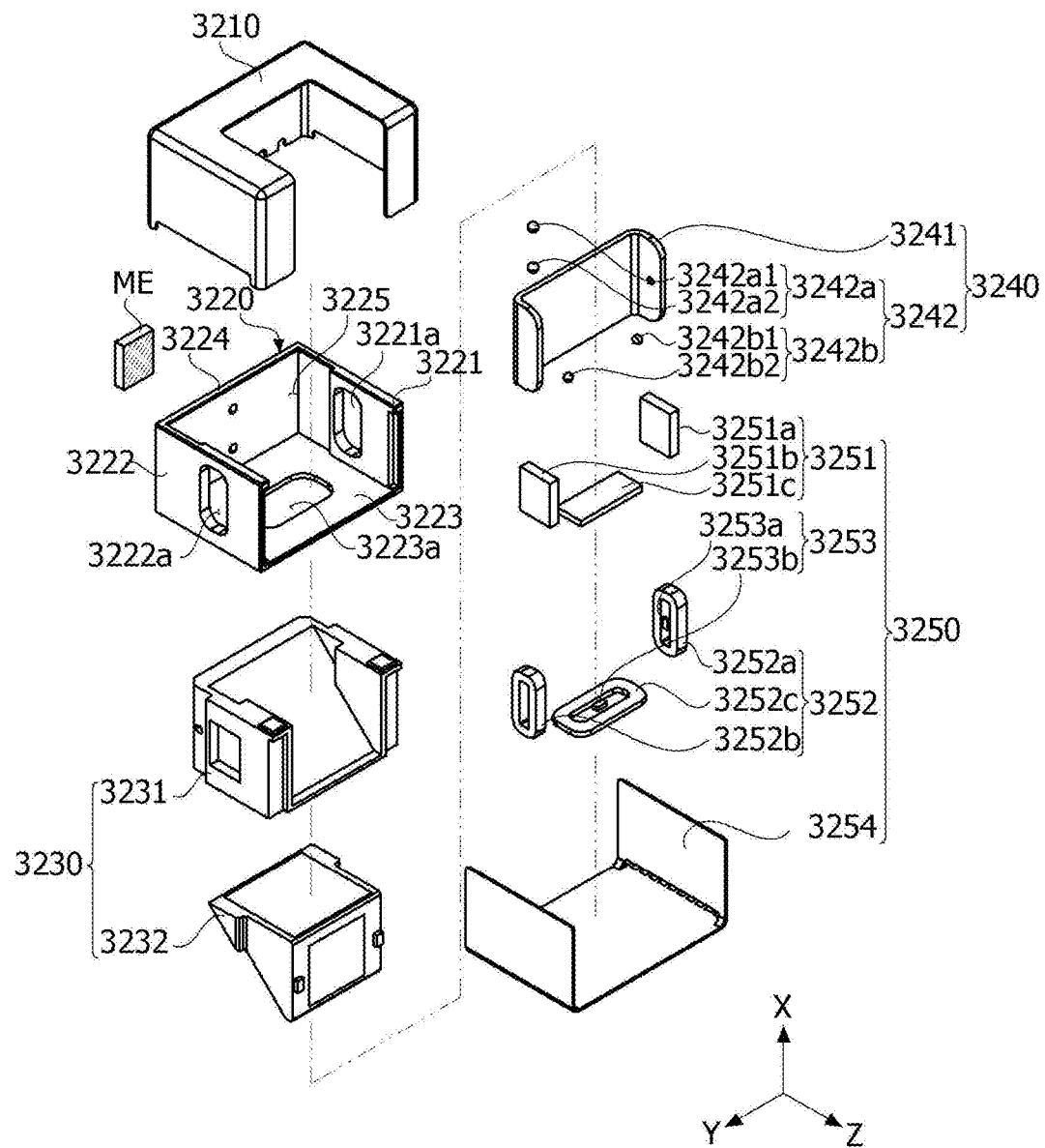
FIG. 11 is an exploded perspective view of a second camera actuator according to another embodiment.

FIG. 11 is an exploded perspective view of a second camera actuator according to another embodiment.

Referring to 11, the second camera actuator 3200 according to the embodiment includes a shield can 3210, a housing 3220, a mover 3230, a rotation part 3240, and a driving unit 3250.

The mover 3230 may include a prism holder 3231 and a prism 3232 seated on the prism holder 3231. Further, the rotation part 3240 includes a tilting plate 3241 and a ball part 3242. Further, the driving unit 3250 may include a driving magnet 3251, a driving coil 3252, a Hall sensor unit 3253, and a board part 3254.

The shield can 3210 may be located at the outermost side of the second camera actuator 3200 to surround the rotation part 3240 and the driving unit 3250, which will described below.

The shield can 3210 may block or reduce external electromagnetic waves. Accordingly, a malfunction can be inhibited from occurring in the rotation part 3240 or the driving unit 3250.

The housing 3220 may be located inside the shield can 3210. Further, the housing 3220 may be located inside the board part 3254, which will be described below. The housing 3220 may be fastened to the shield can 3210 as the housing 3220 and the shield can 3210 are fitted or engaged with each other.

The housing 3220 may include a first housing side part 3221, a second housing side part 3222, a third housing side part 3223, and a fourth housing side part 3224.

The first housing side part 3221 and the second housing side part 3222 may be arranged to face each other. Further, the third housing side part 3223 and the fourth housing side part 3224 may be arranged between the first housing side part 3221 and the second housing side part 3222.

The third housing side part 3223 may be in contact with the first housing side part 3221, the second housing side part 3222, and the fourth housing side part 3224. Further, the third housing side part 3223 may be a bottom surface of the housing 3220.

Here, the bottom surface means one side in the first direction. Further, the first direction is the X-axis direction on the drawing and may be used interchangeably with the second axis direction. The second direction is the Y-axis direction on the drawing and may be used interchangeably with the first axis direction. The second direction is a direction perpendicular to the first direction. Further, the third direction is a Z-axis direction on the drawing and may be used interchangeably with the third axis direction. The third direction is a direction perpendicular to both the first direction and the second direction. Here, the third direction (the Z-axis direction) may correspond to a direction of the optical axis, the first direction (the X-axis direction) and the second direction (the Y-axis direction) are directions perpendicular to the optical axis, and the tilting may be performed by the second camera actuator. A detailed description thereof will be made below.

Further, the first housing side part 3221 may include a first housing hole 3221a. A first coil 3252a, which will be described below, may be located in the first housing hole 3221a.

Further, the second housing side part 3222 may include a second housing hole 3222a. Further, a second coil 3252b, which will be described below, may be located in the second housing hole 3222a.

The first coil 3252a and the second coil 3252b may be coupled to the board part 3254. In one embodiment, the first coil 3252a and the second coil 3252b may be electrically connected to the board part 3254 so that a current may flow therethrough. This current is a component of an electromagnetic force by which the second camera actuator may be tilted with respect to the X axis. Further, the board part 3254 may surround a side surface of the housing 3220 and may be coupled to the housing 3220 through a hole or the like.

Further, the third housing side part 3223 may include a third housing hole 3223a. A third coil 3252c, which will be described below, may be located in the third housing hole 3223a. The third coil 3252c may be coupled to the board part 3254. Further, the third coil 3252c may be electrically connected to the board part 3254 so that a current may flow therethrough. This current is a component of an electromagnetic force by which the second camera actuator may be tilted with respect to the Y axis.

Figure 12A:
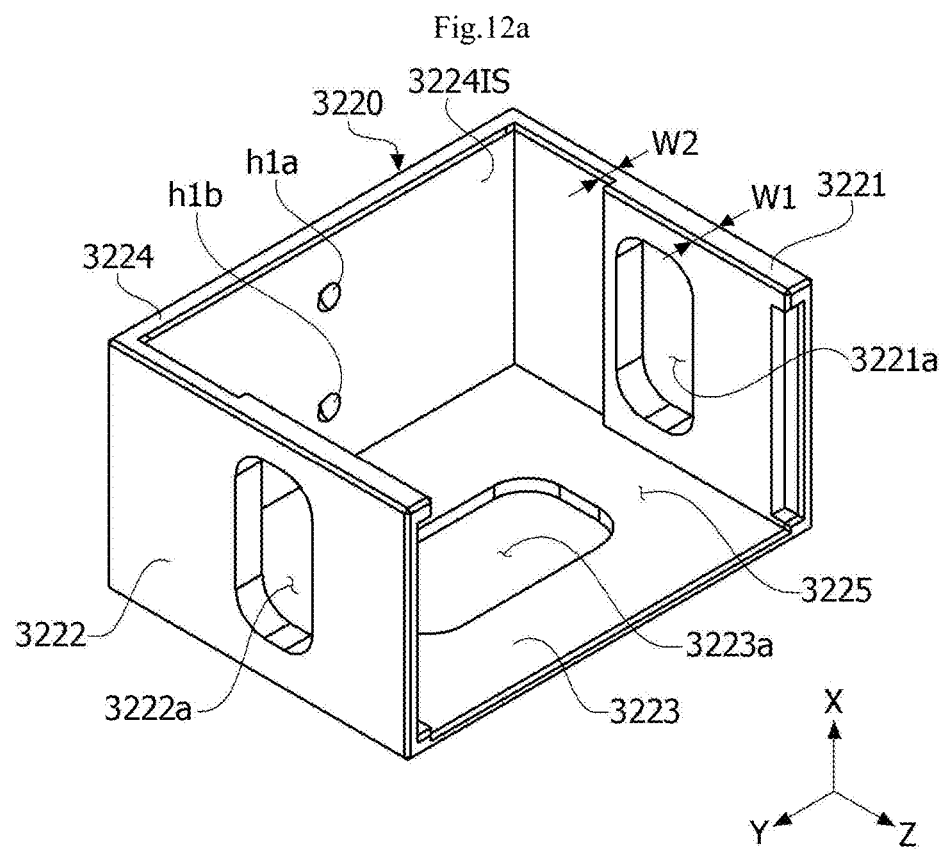
FIG. 12A is a perspective view of a housing according to another embodiment.
Figure 12B:
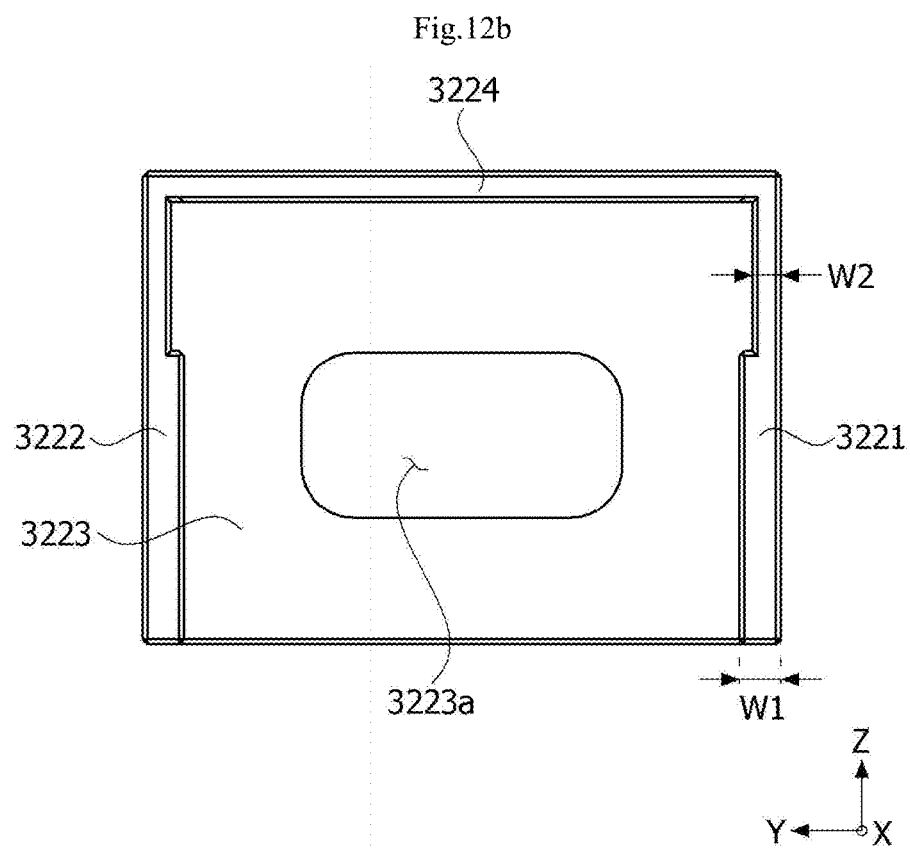
FIG. 12B is a top view of the housing according to another embodiment.
Figure 12C:
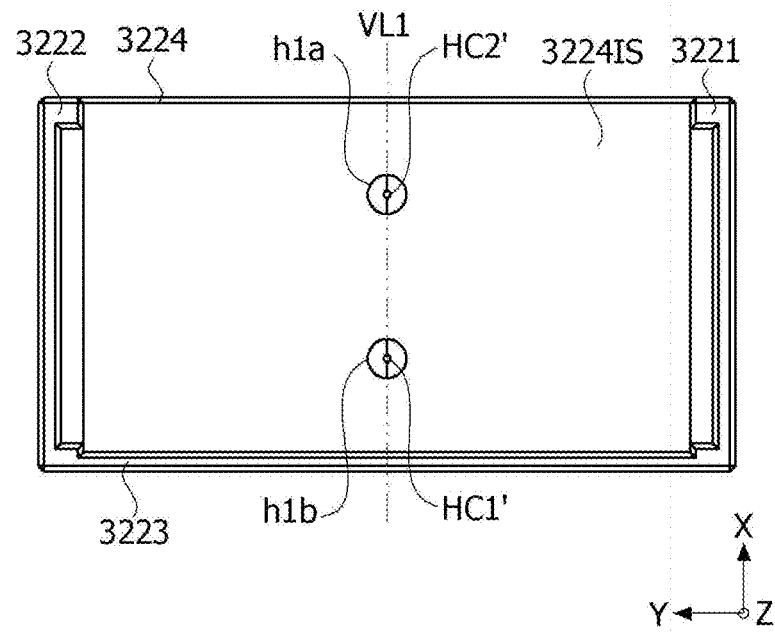
FIG. 12C is a side view of the housing according to another embodiment.
Figure 12D:
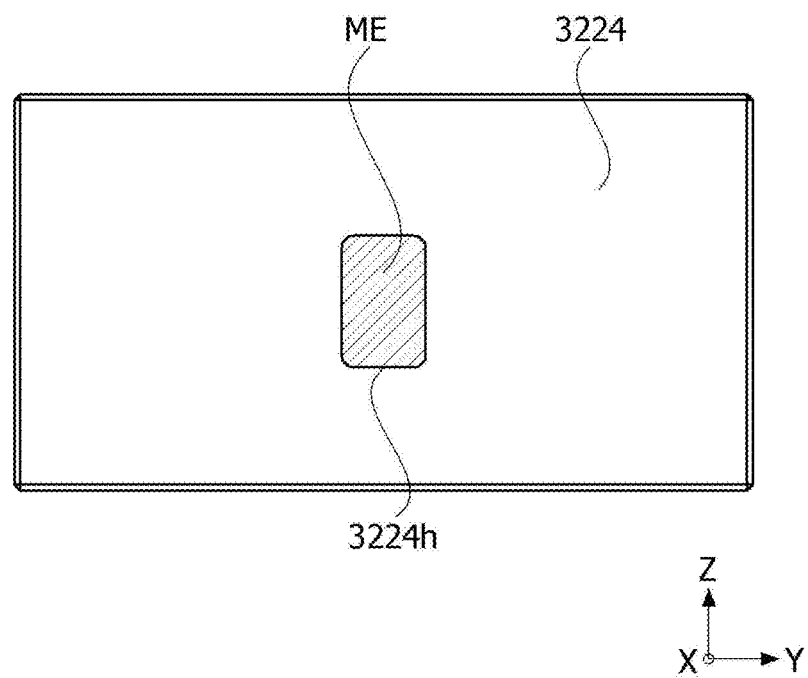
FIG. 12D is a bottom view of the housing according to another embodiment.

The fourth housing side part 3224 may include a coupling groove 3224h (see FIG. 12D). The coupling groove 3224h may be located on the outer surface of the fourth housing side part 3224. Further, a coupling member ME may be seated on the coupling groove 3224h. Further, the coupling member ME may be made of a magnetic material. Accordingly, an attractive force may be formed between the coupling member ME and a tilting plate that is made of a metal, an elastic material, or the like and will be described below. Accordingly, the housing 3220 and the tilting plate 3241 may be coupled to each other by an attractive force between the coupling member ME and the ball part 3242.

Further, the housing 3220 may include an accommodation part 3225 formed by the first housing side part 3221 to the fourth housing side part 3224. The mover 3230 may be located in the accommodation part 3225.

The mover 3230 includes the prism holder 3231 and the prism 3232 seated on the prism holder 3231.

The prism holder 3231, together with the prism 3232, may be seated on the accommodation part 3225 of the housing 3220. The prism holder 3231 may include a first outer prism surface to a fourth outer prism surface respectively corresponding to the first housing side part 3221, the second housing side part 3222, the third housing side part 3223, and the fourth housing side part 3224. A detailed description thereof will be made below.

The prism 3232 may be seated on the prism holder 3231. To this end, the prism holder 3231 may have a seating surface, and the seating surface may be formed by an accommodation groove. The prism 3232 may include a reflective part disposed therein. However, the present invention is not limited thereto. Further, the prism 3232 may reflect, into the camera module, light reflected from the outside (e.g., an object). In other words, the prism 3232 may change a path of the reflected light so as to improve spatial limitation of the first camera actuator and the second camera actuator. Accordingly, it should be understood that the camera module may expand the optical path while minimizing a thickness thereof, and thus may also provide a high range of magnifications.

Furthermore, the prism 3232 may be an optical member, an optical element, and an optical module. Accordingly, it should be understood that the prism 3232 may also be a mirror or a lens.

The rotation part 3240 may include the tilting plate 3241 and the ball part 3242.

The tilting plate 3241 may be coupled to the mover 3230 and the housing 3220 through the ball part 3242. Further, the tilting plate 3241 may perform first and second axis tilting with respect to the mover through the ball part 3242 so as to easily change (for example, move) the optical path.

The tilting plate 3241 may include a base and first and second extension parts extending from the base to the mover.

The ball part 3242 may include a first ball 3242a and a second ball 3242b, and the first ball 3242a may include a $(1\text{-}1)^{th}$ ball 3242a1 and a $(1\text{-}2)^{th}$ ball 3242a2. Further, the second ball 3242b may include a $(2\text{-}1)^{th}$ ball 3242b1 and a $(2\text{-}2)^{th}$ ball 3242b2.

The tilting plate 3241 and the mover 3230 may perform the X-axis tilting through the first ball 3242a, and the mover 3230 may perform the Y-axis tilting through the second ball 3242b.

Further, since an attractive force is formed between the first ball 3242a and the coupling member ME as described above, the rotation part 3240 and the mover 3230 may press the fourth housing side part 3224 through the first ball 3242a. Further, the mover 3230 may be spaced apart from a side wall of each housing in the housing 3220 in the first direction (the X-axis direction) and the second direction (the Y-axis direction), and the mover 3230 may rotate in two axes in a space through the spacing.

Further, the second ball 3242b may be seated on a second groove formed in an outer surface of the prism holder 3231. Accordingly, the rotation part 3240 and the mover 3230 may be coupled to each other. A detailed description thereof will be made below.

Further, in the present specification, a lubricant may be applied in the grooves (for example, the first groove, the second groove, or the like) on which the first ball 3242a and the second ball 3242b are seated. That is, it should be understood that the lubricant may be located between the first ball 3242a and the second ball 3242b and the grooves.

The driving unit 3250 includes the driving magnet 3251, the driving coil 3252, the Hall sensor unit 3253, and the board part 3254.

The driving magnet 3251 may include a plurality of magnets. In one embodiment, the driving magnet 3251 may include a first magnet 3251a, a second magnet 3251b, and a third magnet 3251c.

The first magnet 3251a, the second magnet 3251b, and the third magnet 3251c may be located on the outer surface of the prism holder 3231. Further, the first magnet 3251a and the second magnet 3251b may be located to face each other. Further, the third magnet 3251c may be located on a bottom surface among the outer surface of the prism holder 3231. A detailed description thereof will be made below.

The driving coil 3252 may include a plurality of coils. In one embodiment, the driving coil 3252 may include the first coil 3252a, the second coil 3252b, and the third coil 3252c.

The first coil 3252*a* may face the first magnet 3251*a*. Accordingly, as described above, the first coil 3252*a* may be located in the first housing hole 3221*a* of the first housing side part 3221.

Further, the second coil 3252*b* may face the second magnet 3251*b*. Accordingly, as described above, the second coil 3252*b* may be located in the second housing hole 3222*a* of the second housing side part 3222.

The first coil 3252*a* may be located to face the second coil 3252*b*. That is, the first coil 3252*a* may be located to be symmetrical to the second coil 3252*b* in the first direction (the X-axis direction). This may be equally applied even to the first magnet 3251*a* and the second magnet 3251*b*. That is, the first magnet 3251*a* and the second magnet 3251*b* may be located to be symmetrical to each other in the first direction (the X-axis direction). Further, the first coil 3252*a*, the second coil 3252*b*, the first magnet 3251*a*, and the second magnet 3251*b* may be arranged to at least partially overlap each other in the second direction (the Y-axis direction). Due to this configuration, the X-axis tilting can be accurately performed without inclination to one side by using the electromagnetic force between the first coil 3252*a* and the first magnet 3251*a* and the electromagnetic force between the second coil 3252*b* and the second magnet 3251*b*.

The third coil 3252*c* may face the third magnet 3251*c*. Accordingly, as described above, the third coil 3252*c* may be located in the third housing hole 3223*a* of the third housing side part 3223. The third coil 3252*c* may generate an electromagnetic force together with the third magnet 3251*c* 3230, and thus the Y-axis tilting of the mover 3230 and the rotation part 3240 with respect to the housing 3220 may be performed.

Here, the X-axis tilting means tilting with respect to the X axis, and the Y-axis tilting means tilting with respect to the Y axis.

The Hall sensor unit 3253 may include a plurality of Hall sensors. In one embodiment, the Hall sensor unit 3253 may include a first Hall sensor 3253*a* and a second Hall sensor 3253*b*. The first Hall sensor 3253*a* may be located inside the first coil 3252*a* or the second coil 3252*b*. The first Hall sensor 3253*a* may detect a change in magnetic flux inside the first coil 3252*a* or the second coil 3252*b*. Accordingly, location sensing between the first and second magnets 3251*a* and 3251*b* and the first Hall sensor 3253*a* may be performed. Therefore, the second camera actuator according to an embodiment may control the X-axis tilting.

Further, the second Hall sensor 3253*b* may be located inside the third coil 3252*c*. The second Hall sensor 3253*b* may detect a change in magnetic flux inside the third coil 3252*c*. Accordingly, location sensing between the third magnet 3251*c* and the second Hall sensor 3253*b* may be performed. Therefore, the second camera actuator according to an embodiment may control the Y-axis tilting.

The board part 3254 may be located below the driving unit 3250. The board part 3254 may be electrically connected to the driving coil 3252 and the Hall sensor unit 3253. For example, the board part 3254 may be coupled to the driving coil 3252 and the Hall sensor unit 3253 by using the SMT. However, the present invention is not limited to this method.

The board part 3254 may be located between the shield can 3210 and the housing 3220 and may be coupled to the shield can 3210 and the housing 3220. Various coupling methods may be performed as described above. Further, through the coupling, the driving coil 3252 and the Hall sensor unit 3253 may be located on an outer surface of the housing 3220.

This board part 3254 may include a circuit board having wiring patterns that may be electrically connected, such as a rigid PCB, a flexible PCB, and a rigid flexible PCB. However, the present invention is not limited to these types.

FIG. 12A is a perspective view of a housing according to another embodiment, FIG. 12B is a top view of the housing according to another embodiment, FIG. 12C is a side view of the housing according to another embodiment, and FIG. 12D is a bottom view of the housing according to another embodiment.

Referring to FIGS. 12A to 12B, the housing 3220 according to the embodiment may include the first housing side part 3221, the second housing side part 3222, the third housing side part 3223, and the fourth housing side part 1214.

As described above, the first housing side part 3221 and the second housing side part 3222 may be arranged to face each other. Further, the third housing side part 3223 and the fourth housing side part 3224 may be arranged to face each other. In this case, the first housing side part 3221 may be located on a left side (or a right side) of the housing 3220, the second housing side part 3222 may be located on the right side (or the left side) of the housing 3220, the third housing side part 3223 may be located on a lower side of the housing 3220, and the fourth housing side part 3224 may be located between the first housing side part 3221 and the second housing side part 3222 and on an upper side of the third housing side part 3223.

Further, the first housing side part 3221 and the second housing side part 3222 may be located between the third housing side part 3223 and the fourth housing side part 3224 and may be in contact with the third housing side part 3223 and the fourth housing side part 3224.

Further, the first housing side part 3221 and the second housing side part 3222 may be located to be spaced apart from each other in the second direction (the Y-axis direction) and to be symmetrical to each other in the first direction (the X-axis direction). The third housing side part 3223 and the fourth housing side part 3224 may be located to be spaced apart from each other in the first direction (the X-axis direction) and to be symmetrical to each other in the third direction (the Z-axis direction).

Further, the housing 3220 may include the accommodation part 3225. The accommodation part 3225 may be located inside the first housing side part 3221 to the fourth housing side part 3224. Further, the accommodation part 3225 may be surrounded by first housing side part 3221 to the fourth housing side part 3214. Further, the mover may be located in the accommodation part 3225. To this end, reliability of the mover and the like can be improved, and assembling in the housing 3220 can be easy.

Further, the mover may be spaced apart from the housing side parts (for example, the first housing side part 3211 to the third housing side part 3213). As described above, through this spacing, the mover may rotate inside the housing 3220 in the X axis or the Y axis.

The first housing side part 3221 may include a first housing hole 3211*a*. The first coil may be located in the first housing hole 3211*a*. Further, the first Hall sensor may be located in the first housing hole 3211*a*.

Further, the second housing side part 3222 may include a second housing hole 3212*a*. The second coil may be located in the second housing hole 3212*a*. Further, the second Hall sensor may be located in the second housing hole 3212*a*.

Further, the second housing hole 3212a may be located to be symmetrical to the first housing hole 3211a in the first direction (the X-axis direction). Further, the size and location of the second housing hole 3212a may correspond to those of the first housing hole 3211a. Accordingly, the X-axis tilting can be accurately performed without inclination to one side by using the electromagnetic force generated by the first coil inside the first housing hole 3211a and the second coil inside the second housing hole 3212a.

The third housing side part 3223 may include a third housing hole 3213a. The third coil may be located in the third housing hole 3213a. Further, the third Hall sensor may be located in the third housing hole 3213a. The third Hall sensor may be provided as a plurality of third Hall sensors inside the third housing hole 3213a.

The first housing side part 3221 to the third housing side part 3223 may additionally include bosses and grooves (or holes). Due to this configuration, a coupling force with the board part can be improved or the weight of the camera actuator can be reduced, and thus weight reduction of the camera actuator can finally be implemented.

For example, the first housing side part 3221 to the third housing side part 3223 may be easily coupled to the board part through the boss (not illustrated). That is, electrical connection between the coils arranged in the first housing side part 3221 to the third housing side part 3223 and the board part is easily maintained, and thus the reliability of the camera actuator can be improved.

Further, in the first housing side part 3221 to the third housing side part 3223, the above-described grooves (or holes) may be arranged to be symmetrical to each other in the first direction (the X-axis direction). For example, the groove formed in the first housing side part 3221 and the groove formed in the second housing side part 3222 may overlap each other in the second direction (the Y-axis direction). Due to this configuration, the weights of the housing side parts may be maintained constant. Accordingly, a malfunction in which the X-axis tilting or the Y-axis tilting is concentrated on one side or in one direction due to the different weights of the housing side parts can be inhibited.

The fourth housing side part 3224 may include first grooves h1a and h1b in an inner surface 3224s thereof. Hereinafter, the first groove will be described as a $(1-1)^{th}$ groove h1a and a $(1-2)^{th}$ groove h1b.

In one embodiment, the $(1-1)^{th}$ groove h1a and the $(1-2)^{th}$ groove h1b may be arranged side by side in the first direction (the X-axis direction). In other words, the $(1-1)^{th}$ groove h1a and the $(1-2)^{th}$ groove may be arranged side by side along the second axis. Further, the $(1-1)^{th}$ groove h1a and the $(1-2)^{th}$ groove h1b may be arranged apart from each other along the second axis. Further, the $(1-1)^{th}$ groove h1a and the $(1-2)^{th}$ groove h1b may located in the inner surface 3224s of the fourth housing side part and overlap each other in the first direction (the X-axis direction).

Further, centers HC1' and HC2' of the $(1-1)^{th}$ groove h1a and the $(1-2)^{th}$ groove h1b may be arranged side by side in the first direction (the X-axis direction). Further, the centers HC1' and HC2' of the $(1-1)^{th}$ groove h1a and the $(1-2)^{th}$ groove h1b may be located on the same line VL1 as the first direction (the X-axis direction). The $(1-1)^{th}$ groove h1a and the $(1-2)^{th}$ groove may have a circular shape. However, the present invention is not limited thereto.

Further, the center HC1' of the $(1-1)^{th}$ groove h1a and the center HC2' of the $(1-2)^{th}$ groove h1b may overlap each other in the first direction (the X-axis direction), and the center HC1' of the $(1-1)^{th}$ groove ha1 may be located below the center HC2' of the $(1-2)^{th}$ groove h1b.

Further, the center HC1' of the $(1-1)^{th}$ groove h1a may be located above an inner surface 3224IS of the fourth housing side part 3224. Further, the center HC2' of the $(1-2)^{th}$ groove h1b may be located below the inner surface 3224IS of the fourth housing side part 3224.

The $(1-1)^{th}$ ball 3242a1 may be seated in the $(1-1)^{th}$ groove h1a. Further, the $(1-2)^{th}$ ball 3242a2 may be seated in the (1-2)th groove h1b.

Further, the $(1-1)^{th}$ groove h1a and the $(1-2)^{th}$ groove h1b may at least partially overlap the coupling groove 3224h in the third direction (the Z-axis direction). As a result, an attractive force formed between the coupling member ME and the $(1-1)^{th}$ ball 3242a1 in the $(1-1)^{th}$ groove h1a (or the $(1-2)^{th}$ ball 3242a2 in the $(1-2)^{th}$ groove h1b) may increase, and thus a coupling force between the housing 3220 and the rotation part (or the mover) may increase.

Further, in one embodiment, the $(1-1)^{th}$ groove h1a and the $(1-2)^{th}$ groove h1b may not overlap the coupling groove 3224h in the third direction (the Z-axis direction). In this case, the $(1-1)^{th}$ groove h1a and the $(1-2)^{th}$ groove h1b may at least partially overlap the coupling groove 3224h in the first direction (the X-axis direction). The attractive force formed between the coupling member ME and the $(1-1)^{th}$ ball 3242a1 in the $(1-1)^{th}$ groove h1a (or the $(1-2)^{th}$ ball 3242a2 in the $(1-2)^{th}$ groove h1b) may increase, and thus the coupling force between the housing 3220 and the rotation part (or the mover) may increase.

Further, it is described in the present specification that the coupling groove 3224h is located on an outer surface of the fourth housing side part 3224, but as a modification, the coupling groove may be located inside the fourth housing side part 3224. That is, the coupling groove is not exposed to the outside, and the coupling member ME may also be located inside the fourth housing side part 3224. Alternatively, as a modification, the coupling groove may be located in the inner surface of the fourth housing side part 3224.

Further, the width of the first housing side part 3221 and the second housing side part 3222 in the second direction (the Y-axis direction) may be changed in the third direction.

A width W2 of the first housing side part 3221 in an inner region adjacent to the fourth housing side part 3224 may be smaller than a width W1 of the first housing side part 3221 in an outer region away from the fourth housing side part 3224. As a result, the tilting plate 3241 3241 of the rotation part 3240 may be located inside the accommodation part 3225. Furthermore, the rotation part 3240 may secure a sufficient space for pressing the prism holder from the side through the second ball.

This may be equally applied to the second housing side part 3222. In other words, a width of the second housing side part 3222 in an inner region adjacent to the fourth housing side part 3224 may be smaller than a width of the second housing side part 3222 in an outer region away from the fourth housing side part 3224.

In one embodiment, the base of the tilting plate may be located between the third housing hole 3223a and the fourth housing side part 3224. Furthermore, the base of the tilting plate may not overlap the third housing hole 3223a in the first direction (the X-axis direction). Accordingly, an electromagnetic force generated between the third coil and the third magnet inside the third housing hole 3223a may be provided to the prism holder connected to the tilting plate.

Further, the second housing side part 3222 may be arranged to be symmetrical to the first housing side part 3221 in the third direction (the Z-axis direction).

Figure 13A:
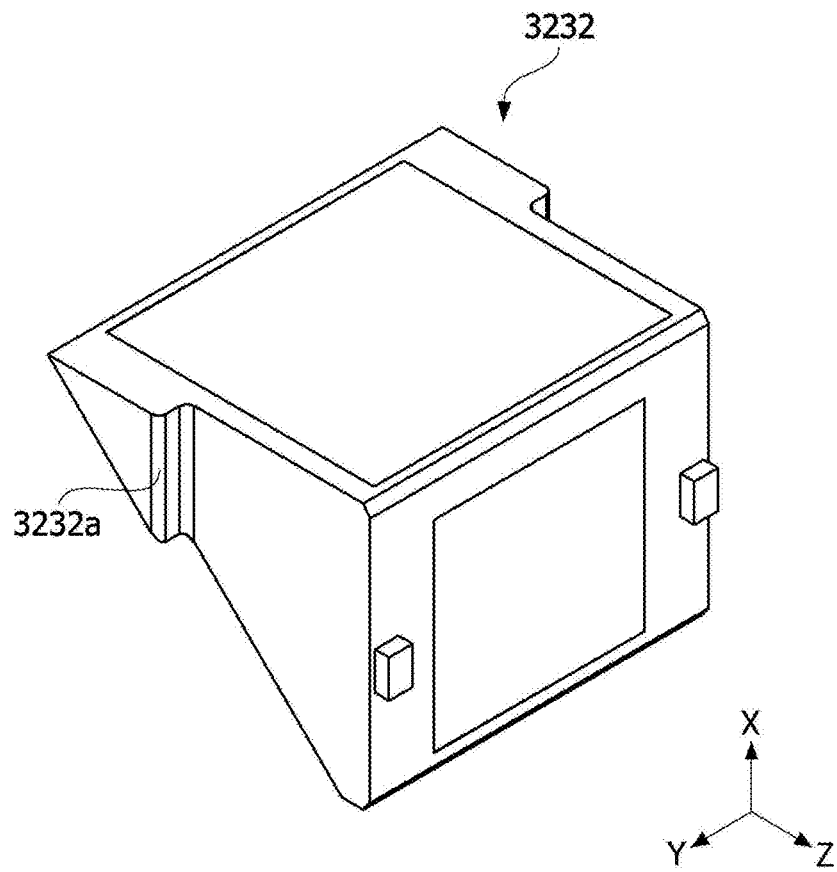
FIG. 13A is a perspective view of a mover according to another embodiment.
Figure 13B:
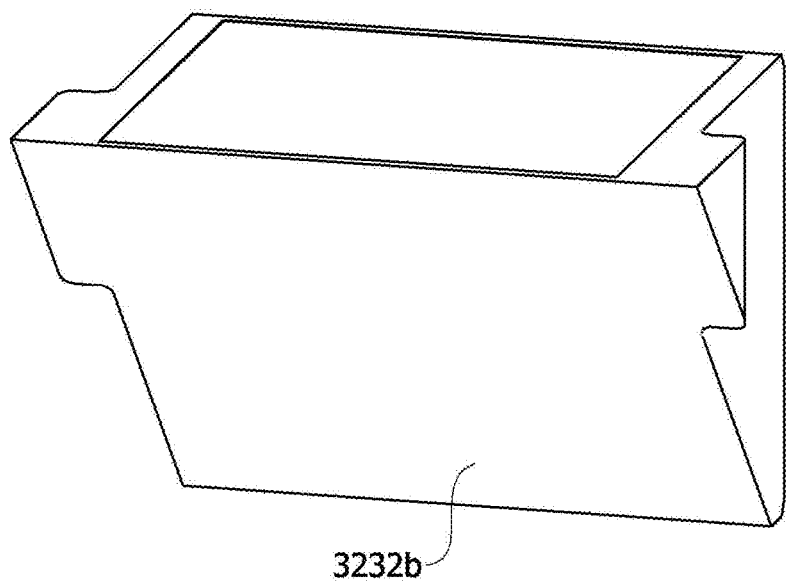
FIG. 13B is a bottom view of the mover according to another embodiment.
Figure 14A:
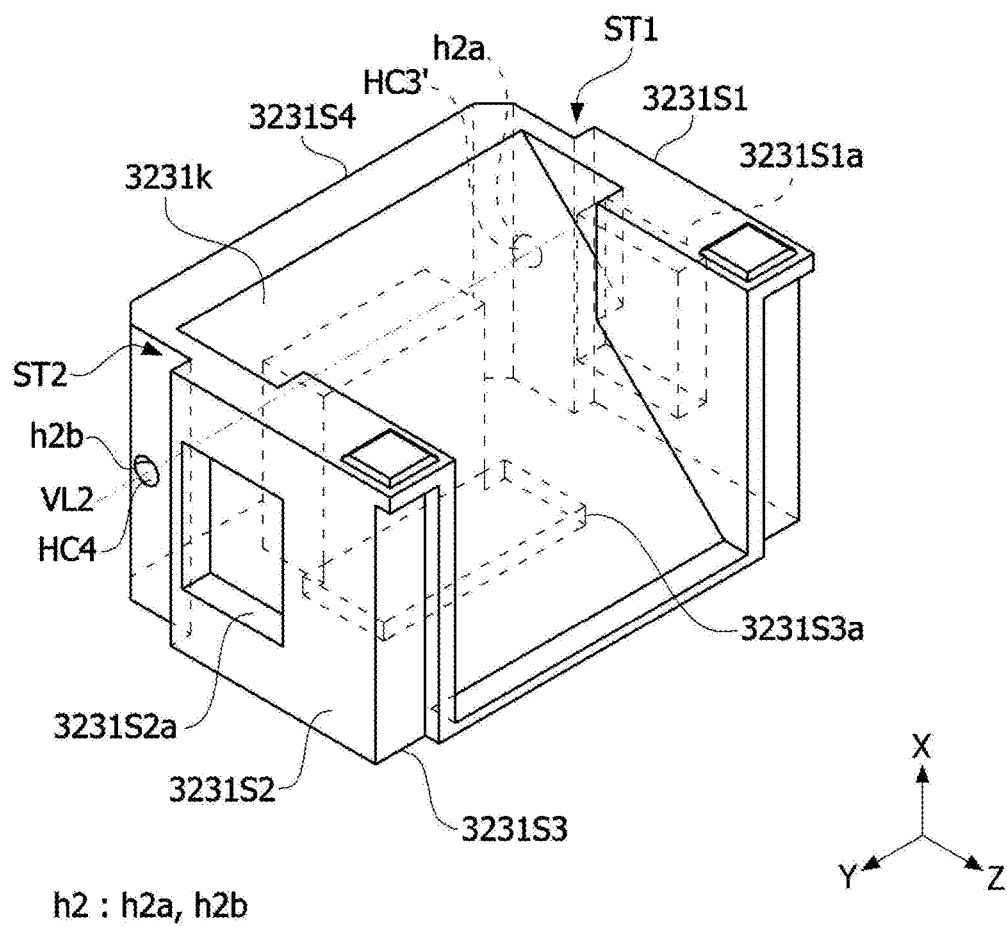
FIG. 14A is a perspective view of a prism holder according to another embodiment.
Figure 14B:
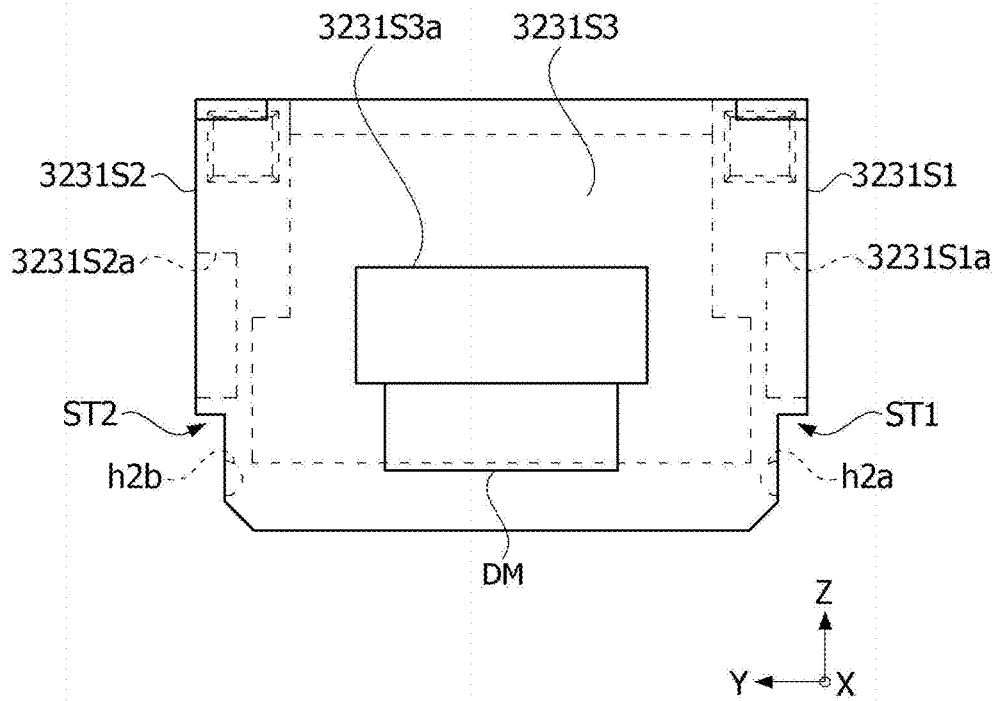
FIG. 14B is a bottom view of the prism holder according to another embodiment.
Figure 14C:
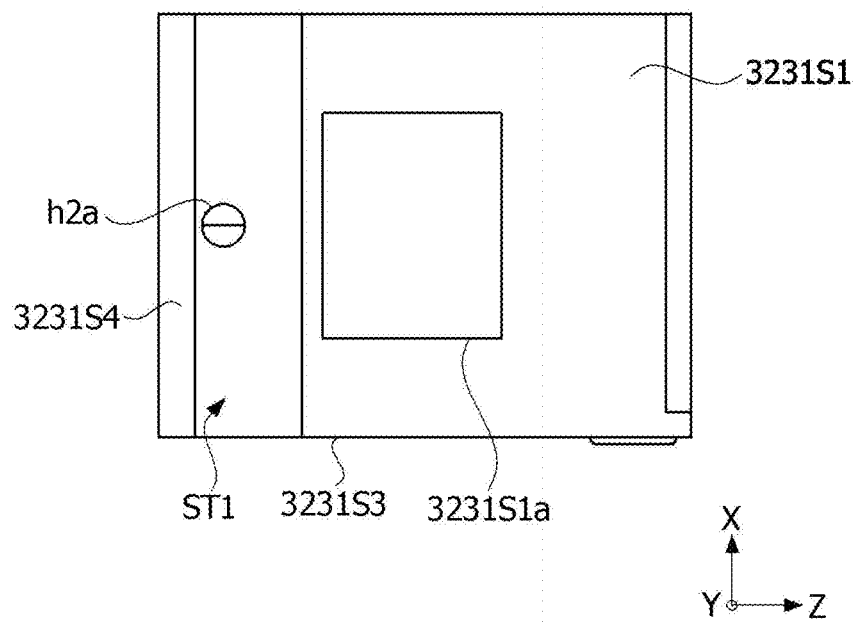
FIG. 14C is one side view of the prism holder according to another embodiment.
Figure 14D:
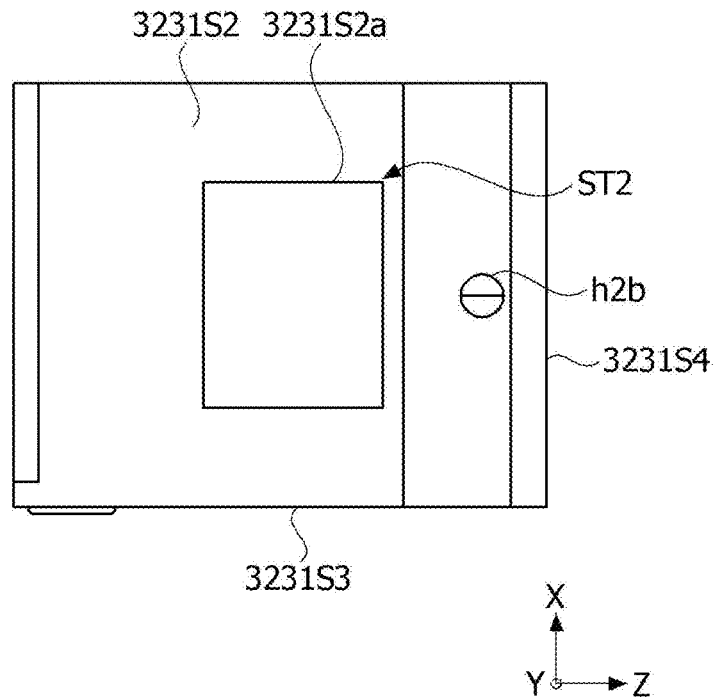
FIG. 14D is another side view of the prism holder according to another embodiment.

FIG. 13A is a perspective view of a mover according to another embodiment, FIG. 13B is a bottom view of the mover according to another embodiment, FIG. 14A is a perspective view of a prism holder according to another embodiment, FIG. 14B is a bottom view of the prism holder according to another embodiment, FIG. 14C is one side view of the prism holder according to another embodiment, and FIG. 14D is another side view of the prism holder according to another embodiment.

Referring to FIG. 13A, FIG. 13B, and FIGS. 14A to 14D, the prism 3232 may be seated on the prism holder. The prism 3232 may be a right-angle prism as a reflective unit, but the present invention is not limited thereto.

The prism 3232 may have a boss 3232a on a portion of an outer surface thereof. The prism 3232 may be easily coupled to the prism holder through the boss 3232a. Further, the prism 3232 may be seated on the seating surface of the prism holder on a bottom surface 3232b. Accordingly, in the prism 3232, the bottom surface 3232b may correspond to the seating surface of the prism holder. In one embodiment, the bottom surface 3232b may be formed as an inclined surface in the same manner as the seating surface of the prism holder. Accordingly, the prism is moved as the prism holder is moved, and at this same time, the prism 3232 can be inhibited from being separated from the prism holder according to the movement.

The prism holder 3231 may include a seating surface 3231k on which the prism 3232 is seated. The seating surface 3231k may be an inclined surface. Further, the prism holder 3231 may include a step portion 3231b on the seating surface 3231k. Further, in the prism holder 321, the step portion 3231b may be coupled to the boss 3232a of the prism 3232.

The prism holder 3231 may include a plurality of outer surfaces. For example, the prism holder 3231 may include a first outer prism surface 3231S1, a second outer prism surface 3231S2, a third outer prism surface 3231S3, and a fourth outer prism surface 3231S4.

The first outer prism surface 3231S1 may be located to face the second outer prism surface 3231S2 in the prism holder 3231. That is, the first outer prism surface 3231S1 may be arranged to be symmetrical to the second outer prism surface 3231S2 in the first direction (the X-axis direction).

Further, the first outer prism surface 3231S1 may be located to the first housing side part 3221 on the outside. Further, the second outer prism surface 3231S2 may be located to face the second housing side part 3222 on the outside.

Further, the first outer prism surface 3231S1 may include a first seating groove 3231S1a. Further, the second outer prism surface 3231S2 may include a second seating groove 3231S2a. The first seating groove 3231S1a and the second seating groove 3231S2a may be arranged to be symmetrical to each other in the first direction (the X-axis direction).

Further, the first magnet 3251a may be disposed on the first seating groove 3231S1a, and the second magnet 3251b may be disposed in the second seating groove 3231S2a. The first magnet 3251a and the second magnet 3251b may be arranged to be symmetrical to each other in the first direction (the X-axis direction). In one embodiment, the first outer prism surface 3231S1 and the second outer prism surface 3231S2 may overlap each other in the second direction (the Y-axis direction).

Accordingly, as described above, due to locations of the first and second seating grooves and the first and second magnets, an electromagnetic force induced by each magnet may be applied to the first outer prism surface 3231S1 and the second outer prism surface 3231S2 on the same axis. That is, a region (for example, a portion having the strongest electromagnetic force) applied onto the first outer prism surface 3231S1 and a region (for example, a portion having the strongest electromagnetic force) applied onto the second outer prims surface 3231S21 may be located on an axis parallel to the second direction (the Y-axis direction). Accordingly, the X-axis tilting can be accurately performed.

The first magnet 3251a may be disposed on the first seating groove 3231S1a, and the second magnet 3251b may be disposed in the second seating groove 3231S2a.

Further, the first outer prism surface 3231S1 may have a first step portion ST1 in a region adjacent to the fourth outer prism surface 3231S4. The second outer prism surface 3231S2 may also have a second step portion ST2 in a region adjacent to the fourth outer prism surface 3231S4 to correspond to the first outer prism surface 3231S1. A first extension part and a second extension part of the tilting plate may be located in the first step portion ST1 and the second step portion ST2, respectively.

In one embodiment, the prism holder 3231 may include second grooves h2a and h2b. The second grooves may include a (2-1)$^{th}$ groove h2a and a (2-2)$^{th}$ groove h2b. The first outer prism surface 3231S1 may include the (2-1)$^{th}$ groove h2a. Further, the second outer prism surface 3231S2 may include the (2-2)$^{th}$ groove h2b.

The (2-1)$^{th}$ ball 3242b1 and the (2-2)$^{th}$ ball 3242b2 may be seated on the (2-1)$^{th}$ groove h2a and the (2-2)$^{th}$ groove h2b, respectively. Further, the (2-1)$^{th}$ groove h2a may be at least partially overlap the (2-1)$^{th}$ ball 3242b1 in the first direction (the X-axis direction) or the third direction (the Z-axis direction). Further, the (2-2)$^{th}$ groove h2b may be at least partially overlap the (2-2)$^{th}$ ball 3242b2 in the first direction (the X-axis direction) or the third direction (the Z-axis direction). In one embodiment, a center HC3 of the (2-1)$^{th}$ groove h2a and a center HC4 of the (2-2)$^{th}$ groove h2b may be located on the same line VL21 in the second direction (the Y-axis direction). Further, the (2-1)$^{th}$ groove h2a and the (2-2)$^{th}$ groove h2b may have a circular shape. Due to this configuration, the (2-1)$^{th}$ ball 3242b1 and the (2-2)$^{th}$ ball 3242b2 can be easily inhibited from being separated from the (2-1)$^{th}$ groove h2a and the (2-2)$^{th}$ groove h2b.

Further, the (2-1)$^{th}$ groove h2a and the (2-2)$^{th}$ groove h2b may be arranged apart from each other along the first axis.

Further, (2-1)$^{th}$ groove h2a may be located between the first seating groove 3231S1a (or the first coil and the first magnet) and the fourth housing side part (or the base). Further, the (2-2)$^{th}$ groove h2b may be located between the second seating groove 3231S2a (or the second coil and the second magnet) and the fourth housing side part (or the base). Further, the (2-1)$^{th}$ groove h2a and the (2-2)$^{th}$ groove h2b may not overlap the first seating groove 3231S1a and the second seating groove 3231S2a in the second direction (the Y-axis direction).

That is, the (2-1)$^{th}$ groove h2a and the (2-2)$^{th}$ groove h2b may be arranged adjacent to the base of the tilting plate in the first outer prism surface 3231S1 and the second outer prism surface 3231S2, respectively. Accordingly, the camera actuator according to the embodiment can easily tilt the mover (e.g., tilt the mover in the Y axis) by using an electromagnetic force caused by the third magnet and the third coil. As well, the first and second extension parts of the tilting plate may not extend in the third direction so far as to be in contact with the first seating groove 3231S1a and the second seating groove 3231S2a. Accordingly, an attractive force (or a repulsive force) between the first and second extension parts of the tilting plate and the first and second coils (or the first and second magnets) may not act as noise.

Further, the $(2-1)^{th}$ groove h2a and the $(2-2)^{th}$ groove h2b may overlap the $(1-1)^{th}$ groove and the $(1-2)^{th}$ groove in the third direction (the Z-axis direction), respectively.

Further, a distance (e.g., a distance in the second direction) between the $(2-1)^{th}$ groove h2a and the $(2-2)^{th}$ groove h2h can be reduced due to the first step portion ST1 and the second step portion ST2, and thus a force for pressing the prism holder 3231 may be increased through the $(2-1)^{th}$ ball and the $(2-2)^{th}$ ball. Accordingly, a coupling force between the prism holder 3231 and the rotation part 3240 can be improved.

The third outer prism surface 3231S3 may be an outer surface that is in contact with the first outer prism surface 3231S1 and the second outer prism surface 3231S2 and extends from one side of the first outer prism surface 3231S1 and the second outer prism surface 3231S2 in the second direction (the Y-axis direction). Further, the third outer prism surface 3231S1 may be located the first outer prism surface 3231S1 and the second outer prism surface 3231S2. The third outer prism surface 3231S3 may be a bottom surface of the prism holder 3231.

The third outer prism surface 3231S3 may include a third seating groove 3231S3a. The third magnet 3251c may be disposed in the third seating groove 3231S3a. The third outer prism surface 3231S3 may be located to face the third housing side part 3223. Further, the third housing hole 3223a and the third seating groove 3231S3a may at least partially overlap each other in the first direction (the X-axis direction). Accordingly, the third magnet 3251c in the third seating groove 3231S3a and the third coil 3252c in the third housing hole 3223a may be located to face each other. Further, the third magnet 3251c and the third coil 3252c may generate an electromagnetic force, and thus the second camera actuator may be tilted in the Y axis.

Further, the X-axis tilting may be performed by the plurality of magnets (the first and second magnets 3251a and 3251b, but the Y-axis tilting may be performed only by the third magnet 3251c. In one embodiment, the width of the third seating groove 3231S3a may be greater than the width of the first seating groove 3231S1a or the second seating groove 3231S2a. Due to this configuration, the Y-axis tilting may be performed using current control similar to that of the X-axis tilting.

A groove may be formed inside the prism holder 3231 as described above. As a result, the weight of the prism holder 3231 can be reduced, the weight of the camera actuator can be finally reduced, and thus lightweight of the camera actuator can be implemented.

Figure 15A:
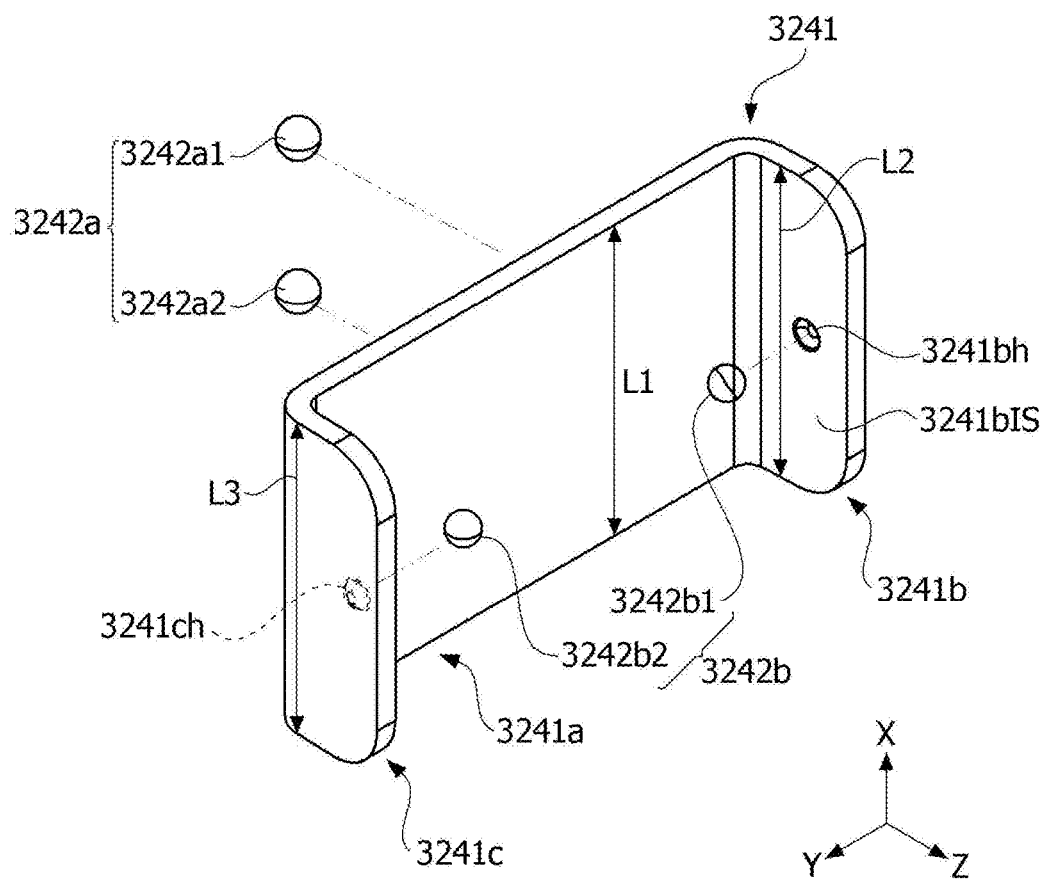
FIG. 15A is an exploded perspective view of a rotation part according to another embodiment.
Figure 15B:
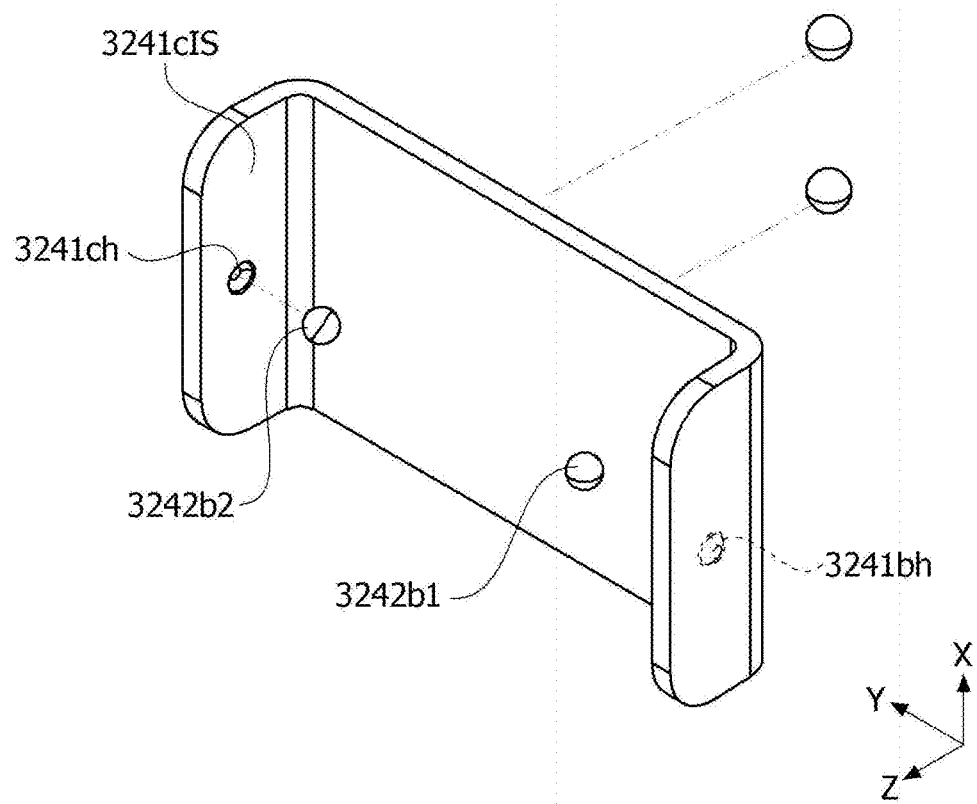
FIG. 15B is a perspective view of a tilting plate according to another embodiment.
Figure 15C:
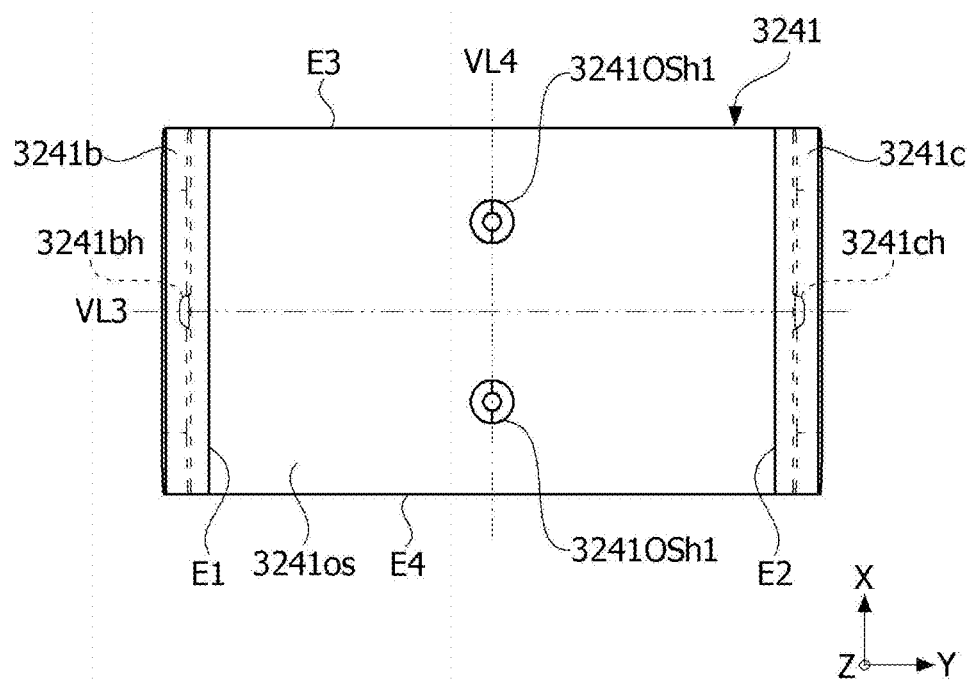
FIG. 15C is a side view of the tilting plate according to another embodiment.

FIG. 15A is an exploded perspective view of a rotation part according to another embodiment, FIG. 15B is a perspective view of a tilting plate according to another embodiment, and FIG. 15C is a side view of the tilting plate according to another embodiment.

Referring to FIGS. 15A to 15C, the rotation part according to the embodiment may include the tilting plate 3241 and the ball part 3242.

First, as described above, the ball part 3242 may include the first ball 3242a and the second ball 3242b. Further, the first ball 3242a and the second ball 3242b may be provided as a plurality of first balls 3242a and a plurality of second balls 3242b, and in the embodiment, a description will be made assuming that the numbers of the first balls 3242a and the second balls 3242b are two.

The tilting plate 3241 may include a base 3241a, a first extension part 3241b, and a second extension part 3241c.

The base 3241a may have a quadrangular shape, but the present invention is not limited thereto, and the base 3241a may be formed in any shape. The base 3241a may be located between the fourth housing side part and the fourth outer prism surface. In one embodiment, the base 3241a may at least partially overlap the fourth housing side part or the fourth outer prism surface in the third direction (the Z-axis direction).

Further, the base 3241a may include a $(1-1)^{th}$ plate groove 3241OSh1 and a $(1-2)^{th}$ plate groove 3241OSh2 arranged in an outer surface 3241OS thereof. The $(1-1)^{th}$ plate groove 3241OSh1 and the $(1-2)^{th}$ plate groove 3241OSh2 may overlap each other in the first direction (or the second axis). Further, the $(1-1)^{th}$ plate groove 3241OSh1 and the $(1-2)^{th}$ plate groove 3241OSh2 may be arranged side by side to be spaced apart from each other in the first direction (or the second axis).

Further, the $(1-1)^{th}$ ball 3242a1 and the $(1-2)^{th}$ ball 3242a2 may be seated on the $(1-1)^{th}$ plate groove 3241OSh1 and the $(1-2)^{th}$ plate groove 3241OSh2, respectively. Further, the $(1-1)^{th}$ plate groove 3241OSh1 and the $(1-2)^{th}$ plate groove 3241OSh2 may at least partially overlap the $(1-1)^{th}$ ball 3242a1 and the $(1-2)^{th}$ ball 3242a2 in the first direction (or the second axis). Due to this configuration, a coupling force between the $(1-1)^{th}$ ball 3242a1 and the $(1-2)^{th}$ ball 3242a2 and the tilting plate 3241 can be improved.

Further, the $(1-1)^{th}$ plate groove 3241OSh1 and the $(1-2)^{th}$ plate groove 3241OSh2 may be arranged to correspond to the $(1-1)^{th}$ groove and the $(1-2)^{th}$ groove and overlap each other in the third direction.

The outer surface 3241OS of the base 3241a may include a first corner E1 to a fourth corner E4.

The first corner E1 may be disposed to face the second corner E2. The third corner E3 may be disposed to face the fourth corner E4. The first corner E1 and the second corner E2 may be arranged between the third corner E3 and the fourth corner E4. The third corner E3 and the fourth corner E4 may be arranged between the first corner E1 and the second corner E2.

A $(2-1)^{th}$ plate groove 3241bh and a $(2-2)^{th}$ plate groove 3241ch, which will be described below, may be located on a third vertical line VL3. Further, the $(1-1)^{th}$ plate groove 3241OSh1 and the $(1-2)^{th}$ plate groove 3241OSh2 may be located on a fourth vertical line VL4. Due to this configuration, the two-axis tilting through the first ball 3242a and the second ball 3242b can be accurately performed without inclination to one side. Here, the third vertical line VL3 is a line that bisects the first corner E1 and the second corner E2 and is parallel to the second direction (or the first axis). The fourth vertical line VL4 may be a line that bisects the third corner E3 and the fourth corner E4 and is parallel to the first direction (or the second axis).

Further, the base may be made of a metal or an elastic material. Further, the base may be made of a magnetic material. This may be equally applied to the first and second extension parts. Further, an attractive force between the tilting plate 3241 and the coupling member may occur due to the magnetic body.

The first extension part 3241b may extend from one side of the base 3241a toward the mover. In one embodiment, the first extension part 3241b may be in contact with the first corner E1 of the base 3241a and extend in the third direction (the Z-axis direction).

The first extension part 3241b may be disposed to surround a portion of a side surface of the prism holder. The first extension part 3241b may be disposed to face a first side prism surface of the prism holder and may be located on the first step portion. Accordingly, the first extension part 3241*b* may at least partially overlap the prism holder in the second direction.

The first extension part 3241*b* may include a $(2-1)^{th}$ plate groove 3241*bh* formed in an inner surface 3241*b*IS. The $(2-1)^{th}$ ball 3242*b*1 may be seated on the $(2-1)^{th}$ plate groove 3241*bh*.

The second extension part 3241*c* may extend from the other side of the base 3241*a* toward the mover. In one embodiment, the second extension part 3241*c* may be in contact with the second corner E2 of the base 3241*a* and extend in the third direction (the Z-axis direction).

The second extension part 3241*c* may be disposed to surround a portion of a side surface of the prism holder. The second extension part 3241*c* may be disposed to face a second side prism surface of the prism holder and may be located on the second step portion. Accordingly, the second extension part 3241*c* may at least partially overlap the prism holder in the second direction.

The second extension part 3241*c* may include the $(2-2)^{th}$ plate groove 3241*ch* formed in an inner surface 3241*c*IS. The $(2-2)^{th}$ ball 3242*b*2 may be seated on the $(2-2)^{th}$ plate groove 3241*ch*.

The first extension part 3241*b* and the second extension part 3241*c* may be made of a metal or an elastic material. Further, the first extension part 3241*b* may press the $(2-1)^{th}$ ball 3242*b*1 in the $(2-1)^{th}$ plate groove 3241*bh* toward the inner side (e.g., toward the mover). Further, the second extension part 3241*c* may press the $(2-2)^{th}$ ball 3242*b*2 in the $(2-2)^{th}$ plate groove 3241*ch* toward the inner side (e.g., toward the mover). Accordingly, since the first extension part 3241*b* and the second extension part 3241*c* press the mover through the (2-1)th ball 3242*b*1 and the (2-2)th ball 3242*b*2, the tilting plate 3241 may be coupled to the mover.

Further, a length L1 of the base 3241*a* in the first direction (the X-axis direction) may be the same as or different from a length L2 of the first extension part 3241*b* or the second extension part 3241*c* in the first direction (the X-axis direction).

Further, the $(2-1)^{th}$ plate groove 3241*bh* and the $(2-2)^{th}$ plate groove 3241*ch* may be arranged side by side in the second direction (the first axis). Accordingly, the $(2-1)^{th}$ ball 3242*b*1 and the $(2-2)^{th}$ ball 3242*b*2 apply a force onto the outer surface of the prism holder on the same axis (for example, the first axis), and thus reliability of the prism holder can be improved, and a resistive force of the mover against the tilting can be equally applied to the first extension part and the second extension part.

Figure 16A:
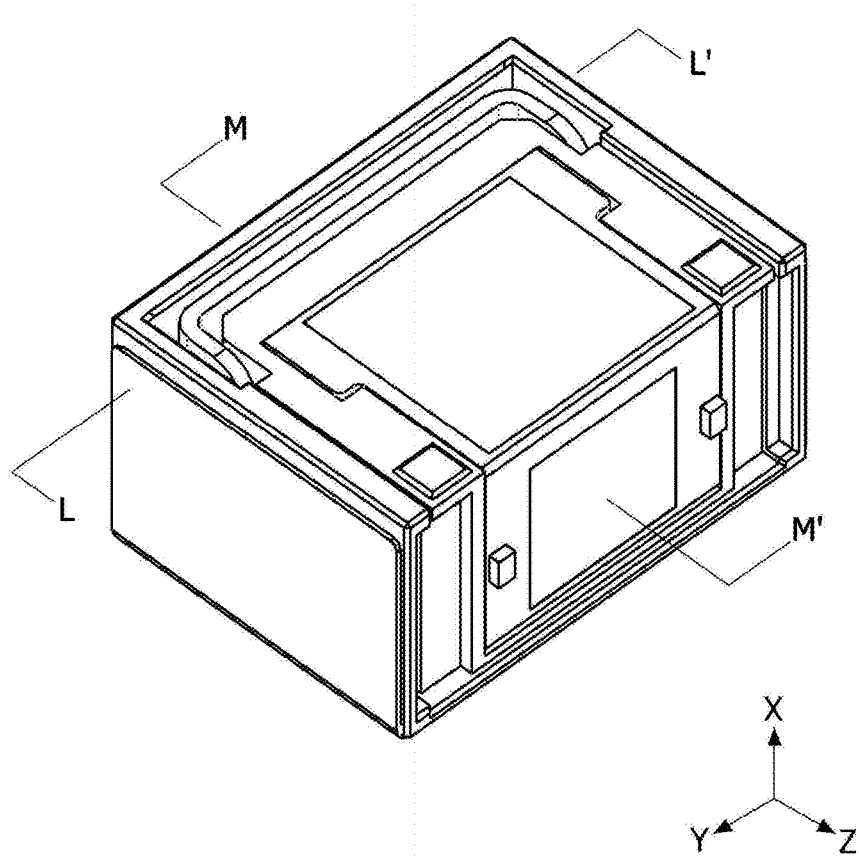
FIG. 16A is a perspective view of the second camera actuator according to another embodiment.
Figure 16C:
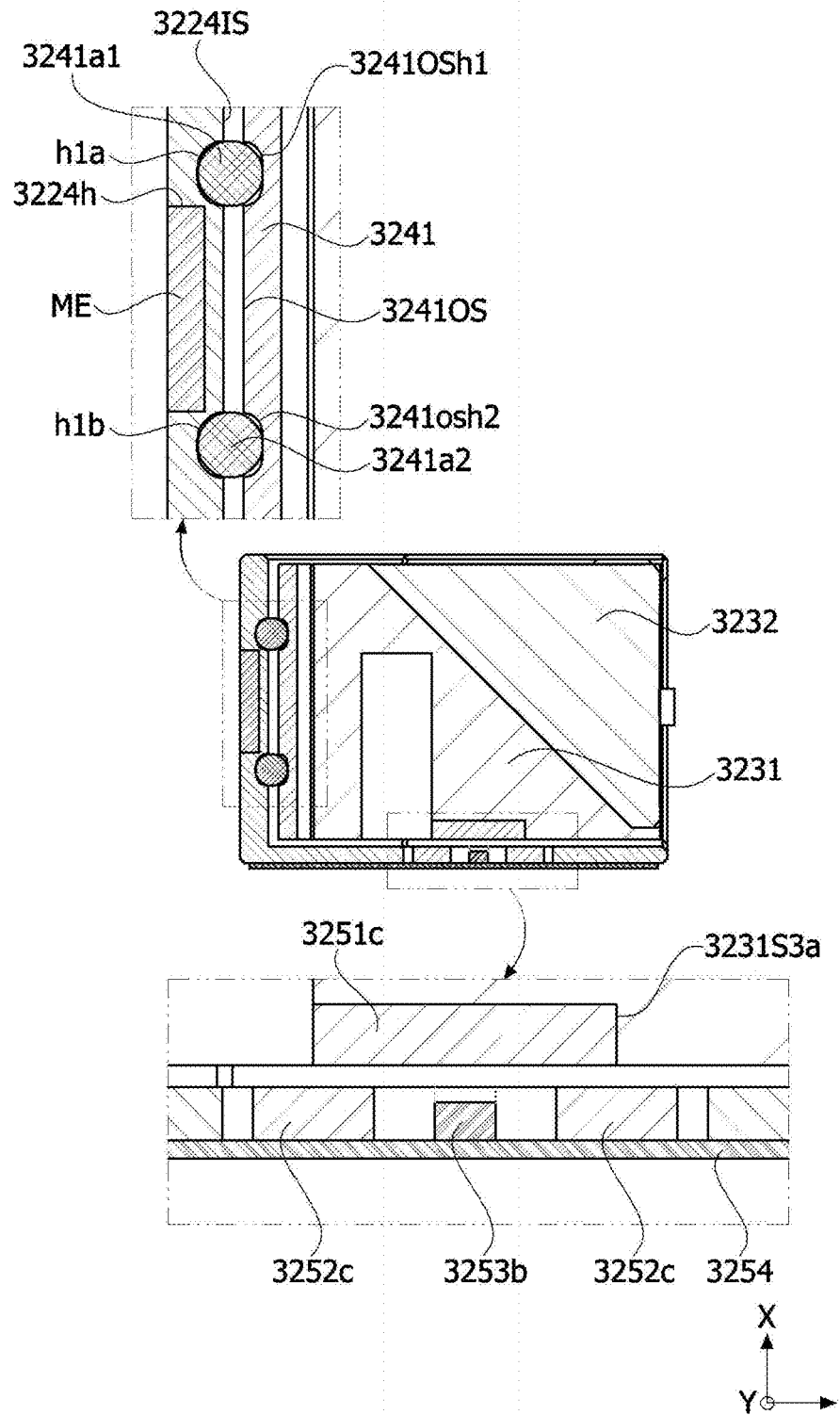
FIG. 16C is a cross-sectional view along line MM' of FIG. 16A.

FIG. 16A is a perspective view of the second camera actuator according to another embodiment, FIG. 16B is a cross-sectional view along line LL' of FIG. 16A, and FIG. 16C is a cross-sectional view along line MM' of FIG. 16A.

Referring to FIGS. 16A to 16C, the first coil 3252*a* may be located in the first housing side part 3221, and the first magnet 3251*a* may be located on the first outer prism surface 3231S1 of the prism holder 3231. Accordingly, the first coil 3252*a* and the first magnet 3251*a* may face each other. The first magnet 3251*a* may at least partially overlap the first coil 3252*a* in the second direction (the Y-axis direction).

Further, the second coil 3252*b* may be located in the second housing side part 3222, and the second magnet 3251*b* may be located on the second outer prism surface 3231S2 of the prism holder 3231. Accordingly, the second coil 3252*b* and the second magnet 3251*b* may face each other. The second magnet 3251*b* may at least partially overlap the second coil 3252*b* in the second direction (the Y-axis direction).

Further, the first coil 3252*a* and the second coil 3252*b* may overlap each other in the second direction (the Y-axis direction), and the first magnet 3251*a* and the second magnet 3251*b* may overlap each other in the second direction (the Y-axis direction).

Due to this configuration, an electromagnetic force applied to the outer surface (the first outer prism surface and the second outer prism surface) of the prism holder is located on a parallel axis in the second direction (the Y-axis direction), so that the X-axis tilting can be accurately performed.

Further, the $(1-1)^{th}$ ball 3242*a*l (or the $(1-2)^{th}$ ball) may be in contact with the $(1-1)^{th}$ groove h1*a* (or the $(1-2)^{th}$ groove) of the fourth housing side part to perform the X-axis tilting. Accordingly, the $(1-1)^{th}$ ball 3242*a*1 (or the $(1-2)^{th}$ ball) may be a reference axis (or a rotational axis) of the X-axis tilting. In this case, the tilting plate 3241 and the mover 3230 may move in a left-right direction (may be tilted in the X axis).

Further, the first housing side part 3221 may have a separation distance DW1 from the first outer prism surface 3231S1. Further, the second housing side part 3222 may have a separation distance DW2 from the second outer prism surface 3231S2. Due to the separation distances DW1 and DW2, the housing may have a space therein in which the mover performs the X-axis tilting.

Further, as described above, the first Hall sensor 3253*a* may be located outside the Hall sensor unit 3253 to be electrically connected and coupled with the board part 3254. However, the embodiments are not limited to the above location.

Further, the third coil 3252*c* may be located in the third housing side part 3223, and the third magnet 3251*c* may be located on the third outer prism surface 3231S3 of the prism holder 3231. The third coil 3252*c* and the third magnet 3251*c* may at least partially overlap each other in the first direction (the X-axis direction). Accordingly, the intensity of the electromagnetic force between the third coil 3252*c* and the third magnet 3251*c* can be easily controlled.

Further, according to the embodiment, the coupling groove 3224*h* in the fourth housing side part 3224 may be located between the $(1-1)^{th}$ groove h1*a* and the $(1-2)^{th}$ groove h1*b*. The coupling groove 3224*h* may not overlap the $(1-1)^{th}$ groove h1*a* and the $(1-2)^{th}$ groove h1*b* in the third direction. However, the coupling groove 3224*h* may at least partially overlap the $(1-1)^{th}$ groove h1*a* and the $(1-2)^{th}$ groove h1*b* in the first direction (the X-axis direction), thereby improving an attractive force between the coupling member ME and the tilting plate 3241.

Further, the coupling groove 3224*h* may be located at a side facing the $(1-1)^{th}$ groove h1*a* and the $(1-2)^{th}$ groove h1*b* in the fourth housing side part 3224. The coupling groove 3224*h* may be disposed in the outer surface of the fourth housing side part 3224 to minimize an attractive force that hinders the X-axis tilting through the $(1-1)^{th}$ ball 3242*a*1 and the $(1-2)^{th}$ ball 3242*a*2 in the $(1-1)^{th}$ groove h1*a* and the $(1-2)^{th}$ groove h1*b*. As well, influence of a magnetic force caused by the coupling member ME on the first magnet 3251*a*, the second magnet 325*b*, and the third magnet 3251*c* can be minimized.

Further, the $(1-1)^{th}$ ball 3242*a*l (or the $(1-2)^{th}$ ball) may be in contact with the $(1-1)^{th}$ groove h1*a* (or the $(1-2)^{th}$ groove) of the fourth housing side part to perform the X-axis tilting. Accordingly, the $(1-1)^{th}$ ball 3242*a*1 (or the $(1-2)^{th}$ ball) may be a reference axis (or a rotational axis) of the X-axis tilting. In this case, the tilting plate 3241 and the mover 3230 may move in the left-right direction (may be tilted in the X axis).

FIG. 17 is a view illustrating a driving unit according to another embodiment.

Referring to FIG. 17, as described above, the driving unit 3250 includes the driving magnet 3251, the driving coil 3252, the Hall sensor unit 3253, and the board part 3254.

Further, as described above, the driving magnet 3251 may include the first magnet 3251a, the second magnet 3251b, and the third magnet 3251c that provide a driving force caused by the electromagnetic force. The first magnet 3251a, the second magnet 3251b, and the third magnet 3251c may be located on the outer surface of the prism holder 3231.

Further, the driving coil 3252 may include a plurality of coils. In one embodiment, the driving coil 3252 may include the first coil 3252a, the second coil 3252b, and the third coil 3252c.

The first coil 3252a may be located to face the first magnet 3251a. Accordingly, as described above, the first coil 3252a may be located in the first housing hole 3221a of the first housing side part 3221. Further, the second coil 3252b may be located to face the second magnet 3251b. Accordingly, as described above, the second coil 3252b may be located in the second housing hole 3222a of the second housing side part 3222.

The second camera actuator according to the embodiment may control the mover 3230 to be rotated in the first axis direction (the X-axis direction) or the second axis direction (the Y-axis direction) by the electromagnetic force between the driving magnet 3251 and the driving coil 3252, to minimize occurrence of the decenter phenomenon or the tilting phenomenon when the OIS is implemented, thereby providing the best optical properties.

Further, the embodiment may provide an ultra-slim and ultra-small camera actuator and a camera module including the same, in which the OIS is implemented through the tilting plate 3241 of the rotation part 3240 disposed between the housing 3220 and the mover 3230, and thus a size limit of the actuator is resolved.

The board part 3254 may include a first board side part 3254a, a second board side part 3254b, and a third board side part 3254c.

The first board side part 3254a and the second board side part 3254b may be arranged to face each other. Further, the third board side part 3254c may be located between the first board side part 3254a and the second board side part 3254b.

Further, the first board side part 3254a may be located between the first housing side part and the shield can, and the second board side part 3254b may be located between the second housing side part and the shield can. Further, the third board side part 3254c may be located between the third housing side part and the shield can and may be a bottom surface of the board part 3254.

The first board side part 3254a may be coupled and electrically connected to the first coil 3252a. Further, the first board side part 3254a may be coupled and electrically connected to the first Hall sensor 3253a.

The second board side part 3254b may be coupled and electrically connected to the second coil 3252b. Further, it should be understood that the second board side part 3254b may be coupled and electrically connected to the first Hall sensor.

The third board side part 3254c may be coupled and electrically connected to the third coil 3252c. Further, the third board side part 3254c may be coupled and electrically connected to the second Hall sensor 3253b.

Figure 18A:
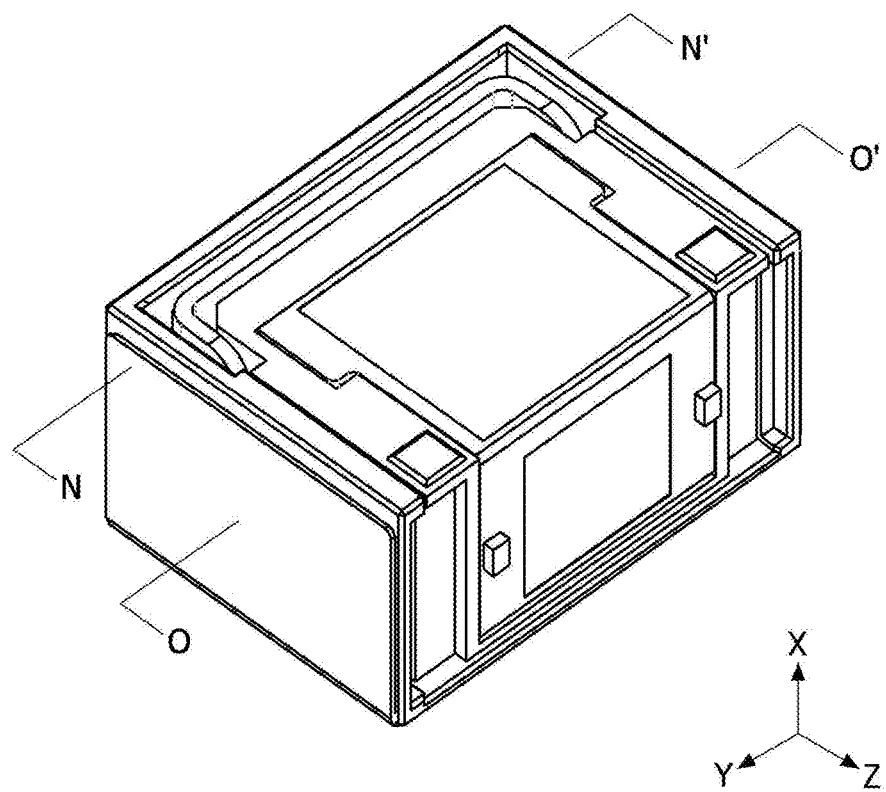
FIG. 18A is a perspective view of the second camera actuator according to another embodiment.
Figure 18B:
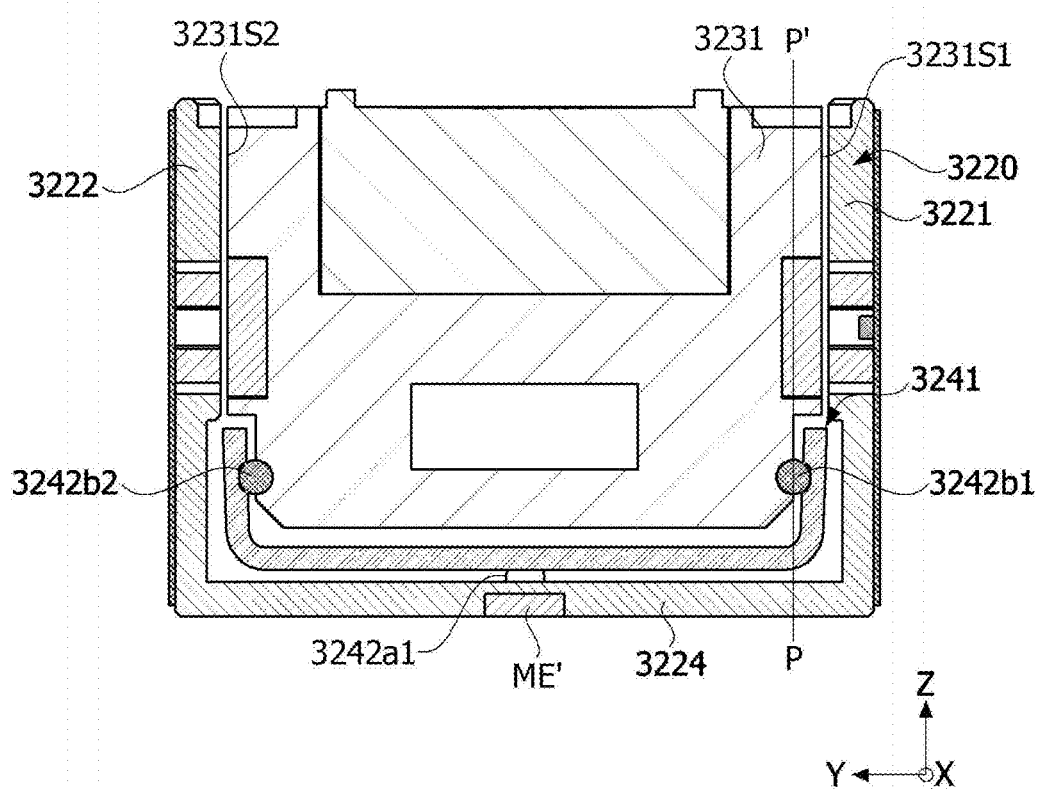
FIG. 18B is a cross-sectional view along line NN' of FIG. 18A.
Figure 18C:
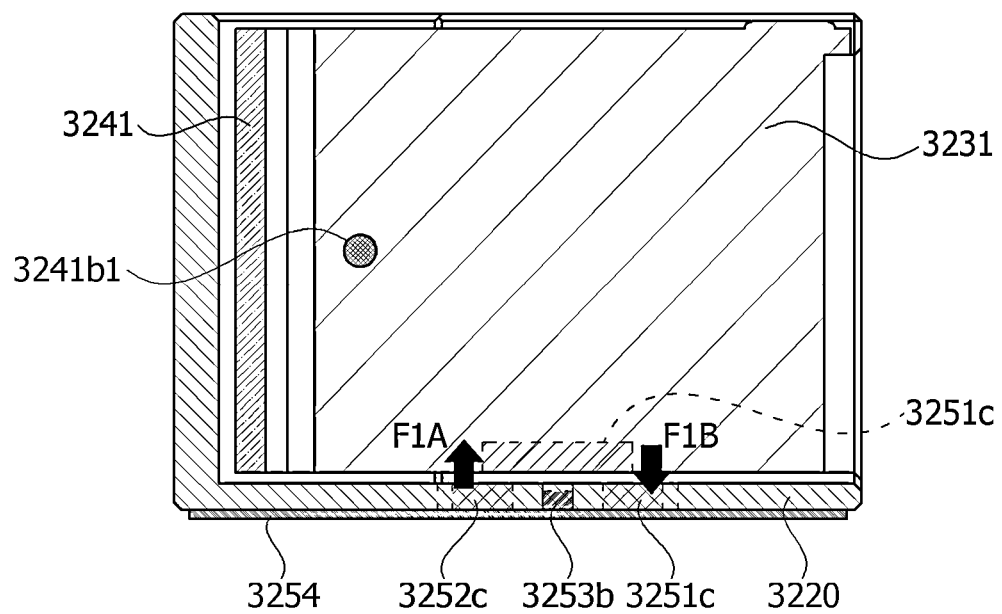
FIG. 18C is a cross-sectional view along line PP' of FIG. 18A.
Figure 18D:
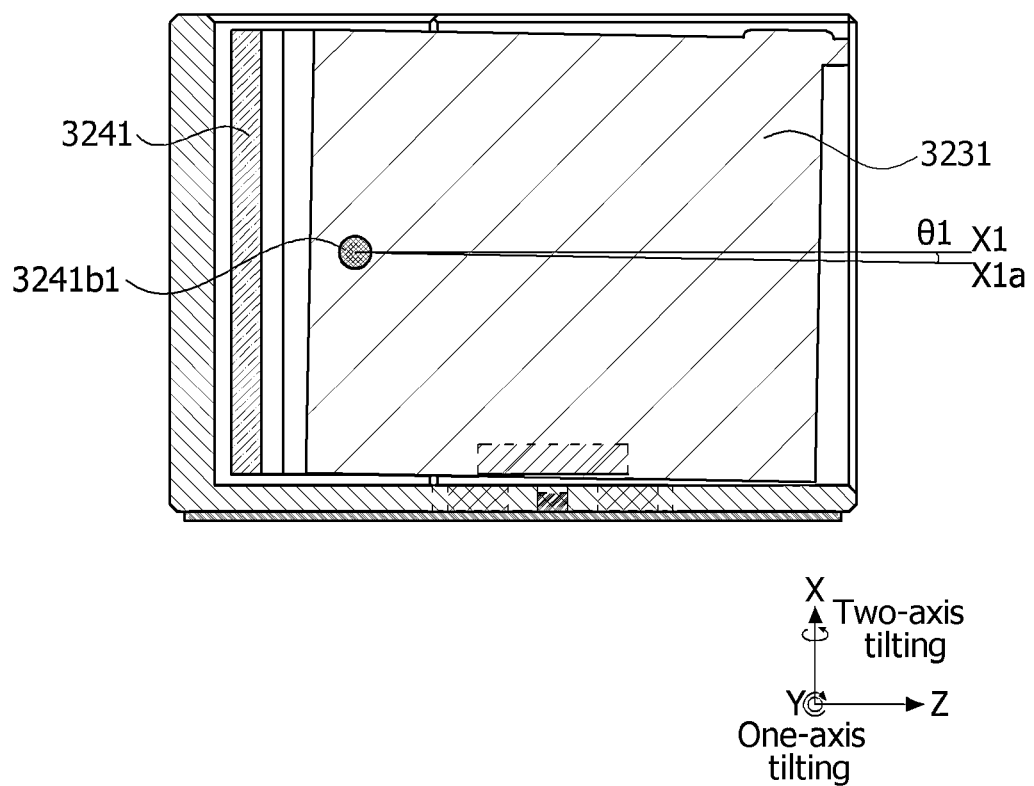

FIG. 18A is a perspective view of the second camera actuator according to another embodiment, FIG. 18B is a cross-sectional view along line NN' of FIG. 18A, FIG. 18C is a cross-sectional view along line PP' of FIG. 18A, and FIGS. 18D and 18E are views for describing one-axis tilting of the second camera actuator according to another embodiment.

Referring to FIGS. 18A to 18E, the Y-axis tilting may be performed. That is, the mover may rotate in the first direction (the X-axis direction) to implement the OIS.

In one embodiment, the third magnet 3251c disposed below the prism holder 3231 may form an electromagnetic force together with the third coil 3252c to tilt or rotate the mover 3230 in the first direction (the X-axis direction).

The $(2-1)^{th}$ ball 3242b1 and the $(2-2)^{th}$ ball 3242b2 of the tilting plate 3241 press the mover 3230 while spaced apart from each other in the second direction (the Y-axis direction), and thus may be coupled to the tilting plate 3241. Further, the mover may rotate or tilt the $(2-1)^{th}$ ball 3242b1 and the $(2-2)^{th}$ ball 3242b2 of the tilting plate 3241 in the first direction (the X-axis direction) with respect to the reference axis (or the rotational axis).

For example, the OIS may be implemented by rotating the mover 3230 at the first angle θ1 in the X-axis direction (X1→X1a) by the first electromagnetic forces F1A and F1B between the third magnet 3251c disposed in the third seating groove and the third coil 3252c disposed in the third board side part. Further, the OIS may be implemented by rotating the mover 3230 at the first angle θ1 in the X-axis direction (X1→X1b) by the first electromagnetic forces F1A and F1B between the third magnet 3251c disposed in the third seating groove and the third coil 3252c disposed in the third board side part. The first angle θ1 may be in the range of ±1° to ±3°. However, the present invention is not limited thereto.

Figure 19:
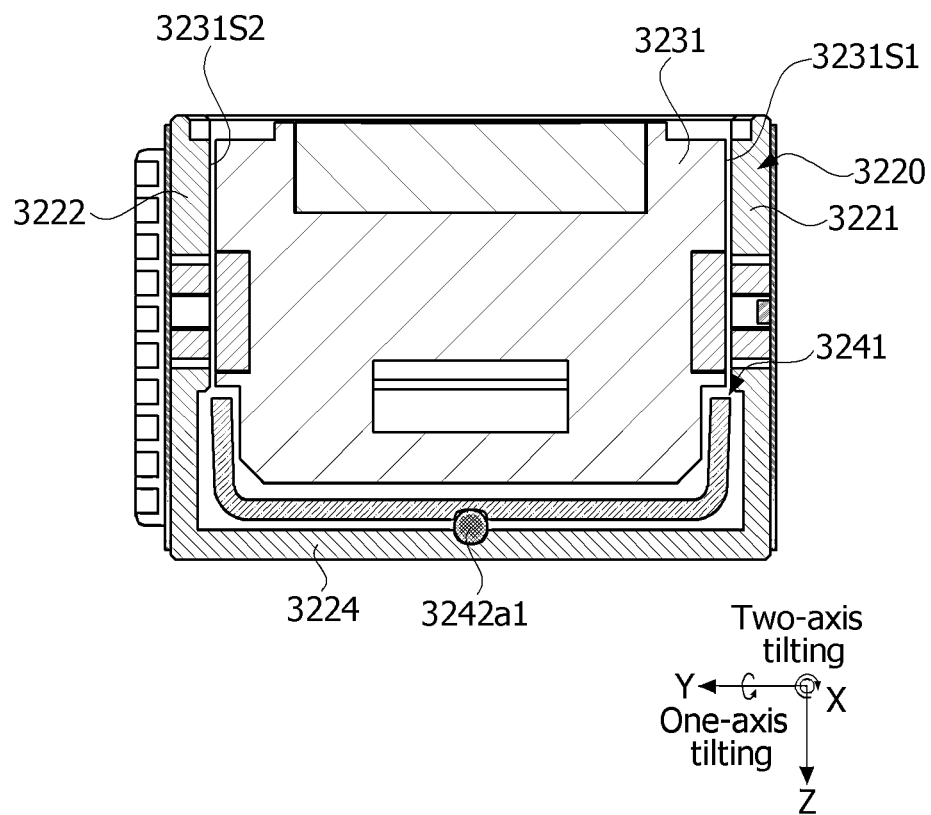
FIG. 19 is a cross-sectional view along line OO' of FIG. 18A.
Figure 20B:
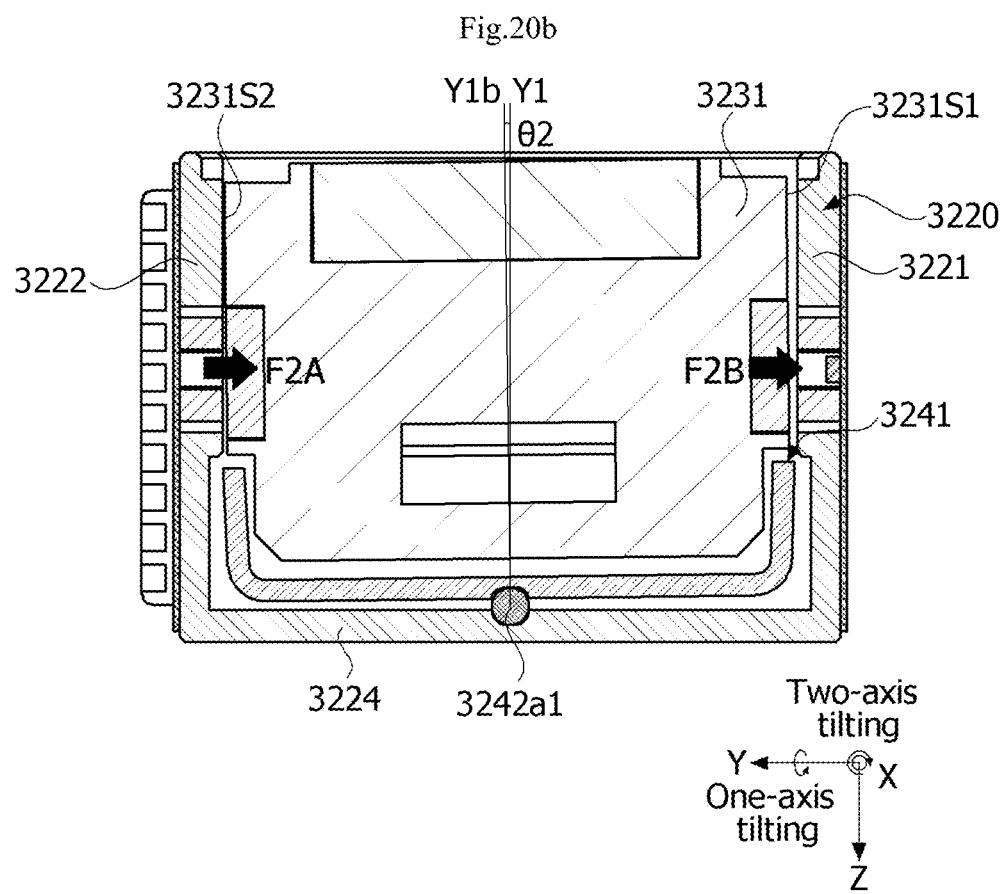

FIG. 19 is a cross-sectional view along line OO' of FIG. 18A, and FIGS. 20A and 20B are views for describing two-axis tilting of the second camera actuator according to another embodiment.

Referring to FIGS. 19 to 20B, the OIS may be implemented while the mover 3230 is tilted or rotated in the Y-axis direction.

In one embodiment, the first magnet 3251a and the second magnet 3251b arranged in the prism holder 3231, together with the first coil 3252a and the second coil 3252b, may generate electromagnetic forces, thereby tilting or rotating the tilting plate 3241 and the mover 3230 in the second direction (the Y-axis direction).

The $(1-1)^{th}$ ball 3242a1 and the $(1-2)^{th}$ ball 3242a2 of the tilting plate 3241 may be spaced apart from each other and may be spaced apart from each other in the first direction (the X-axis direction) between the housing and the mover. Further, the tilting plate 3241 may be supported by the $(1-1)^{th}$ ball 3242a1 and the $(1-2)^{th}$ ball.

The tilting plate 3241, together with the mover, may rotate or tilt the $(2-1)^{th}$ ball 3242b1 and the $(2-2)^{th}$ ball 3242b2 of the tilting plate 3241 in the second direction (the Y-axis direction) with respect to the reference axis (or the rotational axis).

The OIS may be implemented by rotating the mover 3230 and the tilting plate 3241 at the second angle θ2 in the Y-axis direction (Y1→Y1a) by the second electromagnetic forces F2A and F2B between the first and second magnets 3251a and 3251b disposed in the first seating groove and the first and second coils 3252a and 3252b disposed in the first and second board side parts. Further, the OIS may be implemented by rotating the mover 3230 at the first angle θ2 in the Y-axis direction (Y1→Y1b) by the first electromagnetic forces F2A and F2B between the first and second magnets 3251a and 3251b disposed in the first seating groove and the first and second coils 3252a and 3252b disposed in the first and second board side parts. The second angle θ2 may be in the range of ±1° to ±3°. However, the present invention is not limited thereto.

In this way, the second camera actuator according to the embodiment may control the mover 3230 to be rotated in the first axis direction (the X-axis direction) or the second axis direction (the Y-axis direction) by the electromagnetic force between the driving magnet in the prism holder and the driving coil disposed in the housing, to minimize occurrence of the decenter phenomenon or the tilting phenomenon when the OIS is implemented, thereby providing the best optical properties. Further, as described above, the "Y-axis tilting" means rotating or tilting in the first direction (the X-axis direction), and the "X-axis tilting" means rotating or tilting in the second direction (the Y-axis direction).

Figure 21:
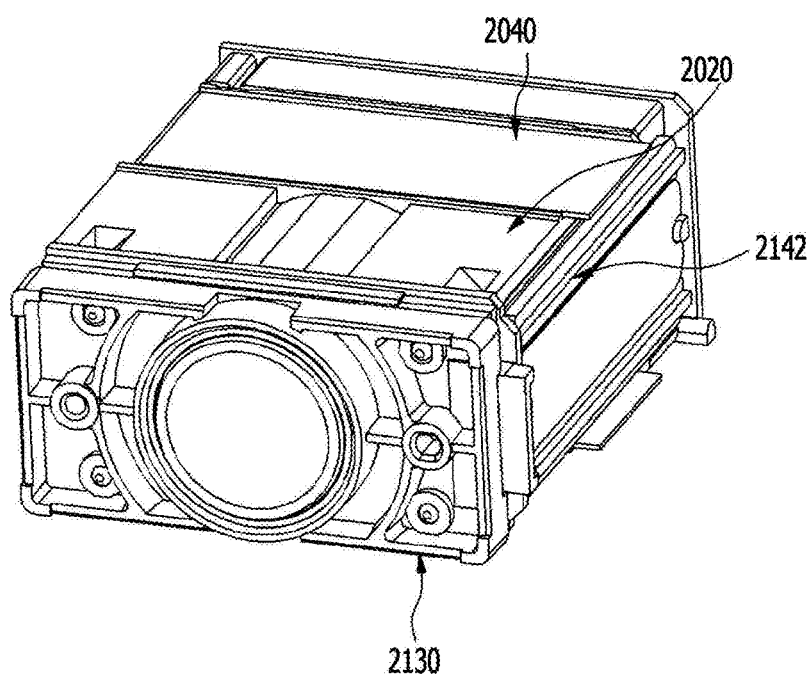
FIG. 21 is a perspective view of an actuator for auto focusing (AF) or zooming according to another embodiment of the present invention.
Figure 22:
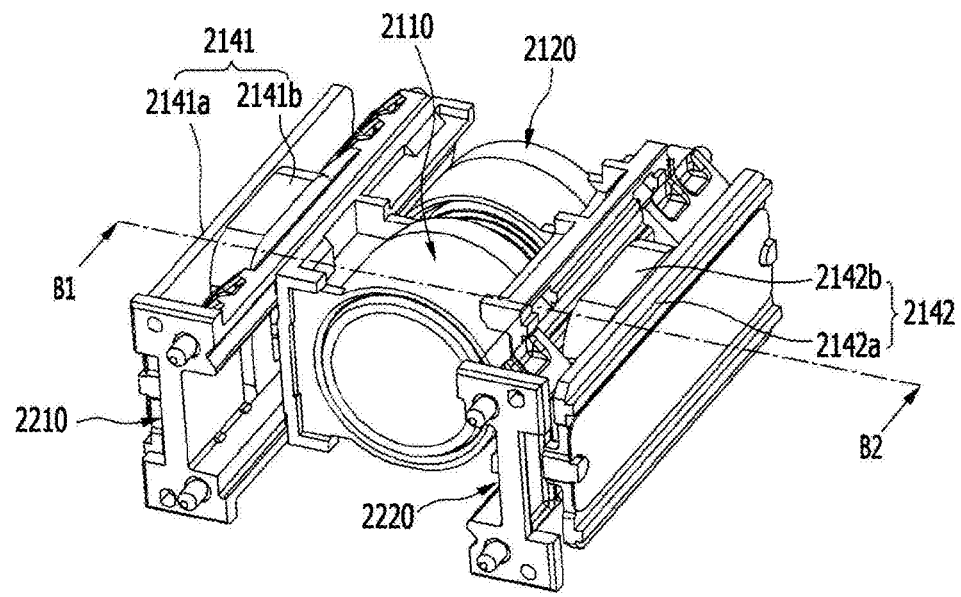
FIG. 22 is a perspective view illustrating a state in which some components are omitted from the actuator illustrated in FIG. 21 according to an embodiment.
Figure 23:
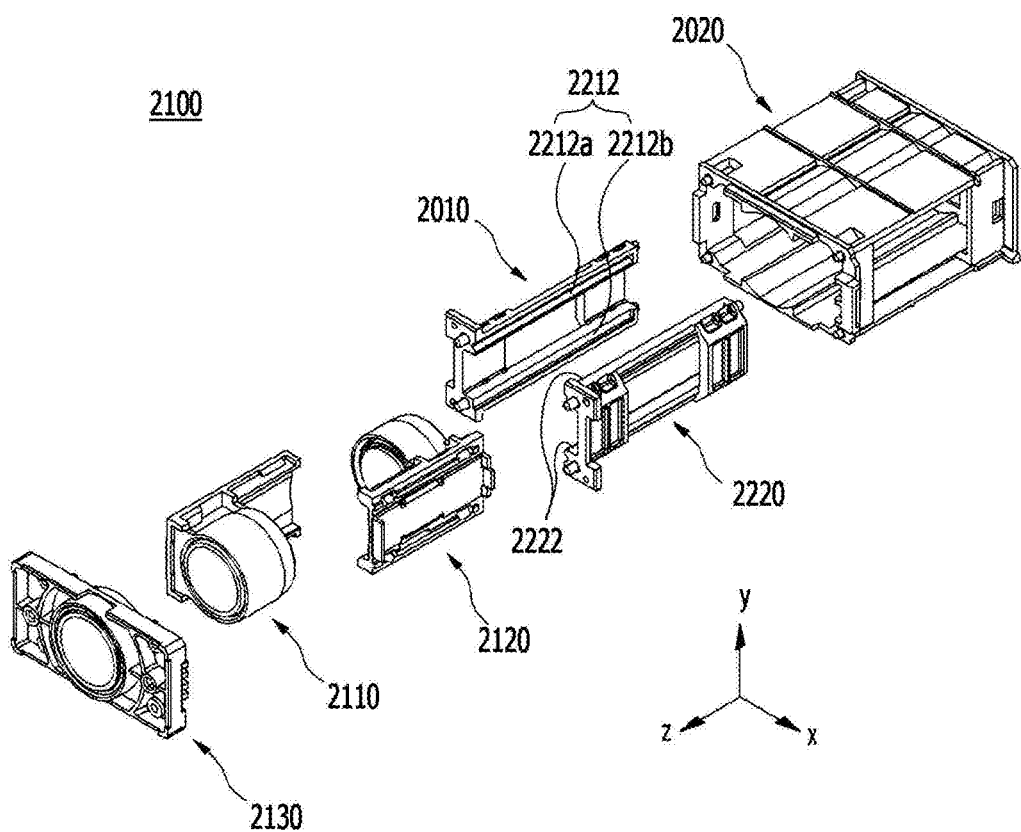
FIG. 23 is an exploded perspective view illustrating a state in which some components are omitted from the actuator illustrated in FIG. 21 according to an embodiment.
Figure 24A:
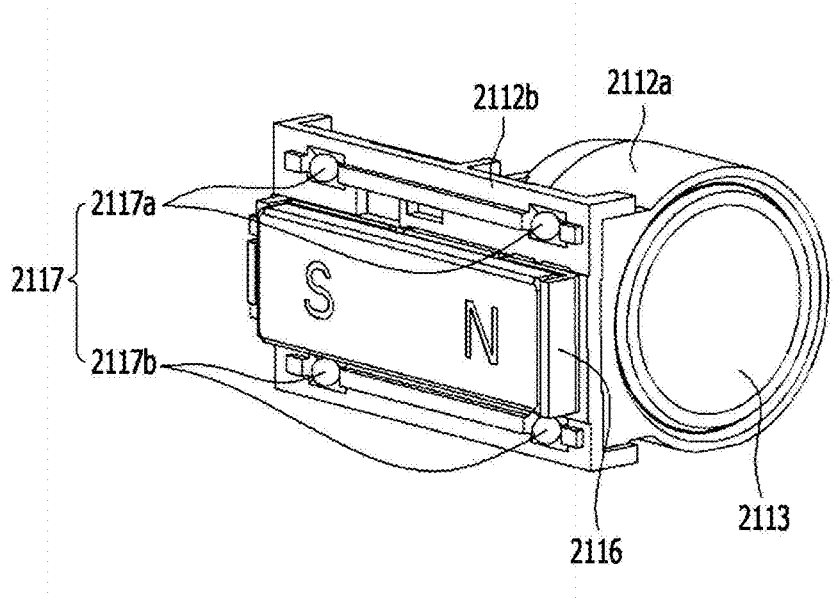
FIG. 24A is a perspective view of a first lens assembly in the actuator illustrated in FIG. 23 according to an embodiment.
Figure 24B:
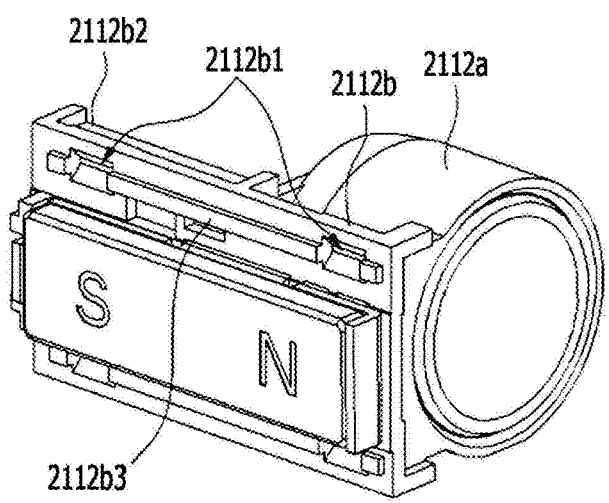
FIG. 24B is a perspective view illustrating a state in which some components are removed from the first lens assembly illustrated in FIG. 24A.

FIG. 21 is a perspective view of an actuator for AF or zooming according to another embodiment of the present invention, FIG. 22 is a perspective view illustrating a state in which some components are omitted from the actuator illustrated in FIG. 21 according to an embodiment, FIG. 23 is an exploded perspective view illustrating a state in which some components are omitted from the actuator illustrated in FIG. 21 according to an embodiment, FIG. 24A is a perspective view of a first lens assembly in the actuator illustrated in FIG. 23 according to an embodiment, and FIG. 24B is a perspective view illustrating a state in which some components are removed from the first lens assembly illustrated in FIG. 24A.

FIG. 21 is a perspective view of an actuator for AF or zooming according to another embodiment of the present invention, FIG. 22 is a perspective view illustrating a state in which some components are omitted from the actuator illustrated in FIG. 21 according to an embodiment, and FIG. 23 is an exploded perspective view illustrating a state in which some components are omitted from the actuator illustrated in FIG. 21 according to an embodiment.

Referring to FIG. 21, an actuator 2100 according to the embodiment may include a housing 2020, a circuit board 2040 disposed outside the housing 2020, a driving unit 2142, and a third lens assembly 2130.

FIG. 22 is a perspective view illustrating a state in which the housing 2020 and the circuit board 2040 are omitted from FIG. 1, and referring to FIG. 22, the actuator 2100 according to the embodiment may include a first guide part 2210, a second guide part 2220, a first lens assembly 2110, a second lens assembly 2120, a driving unit 2141, and the driving unit 2142.

The driving unit 2141 and the driving unit 2142 may include a coil or a magnet.

For example, when the driving unit 2141 and the driving unit 2142 include the coil, the driving unit 2141 may include a first coil 2141b and a first yoke 2141a, and the driving unit 2142 may include a second coil 2142b and a second yoke 2142a.

Alternatively, in contrast, the driving unit 2141 and the driving unit 2142 may include a magnet.

Referring to FIG. 23, the actuator 2100 according to the embodiment may include the housing 2020, the first guide part 2210, the second guide part 2220, the first lens assembly 2110, the second lens assembly 2120, and the third lens assembly 2130.

For example, the actuator 2100 according to the embodiment may include the housing 2020, the first guide part 2210 disposed on one side of the housing 2020, the second guide part 2220 disposed on the other side of the housing 2020, the first lens assembly 2110 corresponding to the first guide part 2210, the second lens assembly 2120 corresponding to the second guide part 2220, a first ball 2117 (see FIG. 24A) disposed between the first guide part 2210 and the first lens assembly 2110, and a second ball (not illustrated) between the second guide part 2220 and the second lens assembly 2120.

Further, the actuator 2100 according to the embodiment may include the third lens assembly 2130 disposed in front of the first lens assembly 2110 in an optical axis direction.

Referring to FIGS. 22 and 23, the actuator 2100 according to the embodiment may include the first guide part 2210 disposed adjacent to a first sidewall of the housing 2020 and the second guide part 2220 disposed adjacent to a second sidewall of the housing 2020.

The first guide part 2210 may be disposed between the first lens assembly 2110 and the first sidewall of the housing 2020.

The second guide part 2220 may be disposed between the second lens assembly 2120 and the second sidewall of the housing 2020. The first sidewall and the second sidewall of the housing 2020 may be arranged to face each other.

According to one embodiment, in a state in which the first guide part 2210 and the second guide part 2220 precisely numerically controlled in the housing 2020 are coupled to each other, as the lens assembly is driven, a frictional torque is reduced to reduce frictional resistance, and thus when zooming is performed, there are technical effects such as improvement of a driving force, reduction in power consumption, and improvement of control characteristics.

Accordingly, according to the embodiment, when the zooming is performed, the frictional torque is minimized while the occurrence of decenter of the lens, tilting of the lens, and a phenomenon in which central axes of a lens group and an image sensor are not aligned with each other is inhibited, and thus there are complex technical effects in that image quality and resolution may be significantly improved.

In particular, according to the present embodiment, the first guide part 22010 and the second guide part 2220 that are formed and assembled separately from the housing 2020 are separately adopted without arranging guide rails on the housing itself, and thus there is a special technical effect in that occurrence of gradients according to an injection molding direction can be inhibited.

In one embodiment, the length of the first guide part 2210 and the second guide part 2220 injection-molded in the X axis may be smaller than the length of the housing 2020, and in this case, when rails are arranged in the first guide part 2210 and the second guide part 2220, there are technical effects in that the occurrence of gradients during the injection molding can be minimized, and a possibility that straight lines of the rails are distorted is low.

In more detail, FIG. 24A is a perspective view of the first lens assembly 2110 in the actuator illustrated in FIG. 23 according to an embodiment, and FIG. 24B is a perspective view illustrating a state in which some components are removed from the first lens assembly 2110 illustrated in FIG. 24A.

Referring back to FIG. 23, the actuator 2100 according to the embodiment may include the first lens assembly 2110 moving along the first guide part 2210 and the second lens assembly 2120 moving along the second guide part 2220.

Referring back to FIG. 24A, the first lens assembly 2110 may include a first lens barrel 2112a in which a first lens 2113 is disposed and a first driving unit housing 2112b in which a driving unit 2116 is disposed. The first lens barrel 2112a and the first driving unit housing 2112b may be a first housing, and the first housing may have a barrel or body tube shape. The driving unit 2116 may be a driving magnet, but the present invention is not limited thereto, and in some cases, a coil may be disposed.

Further, the second lens assembly 2120 may include a second lens barrel (not illustrated) in which a second lens (not illustrated) and a second driving unit housing (not illustrated) in which a driving unit (not illustrated) is disposed. The second lens barrel (not illustrated) and the second driving unit housing (not illustrated) may be a second housing, and the second housing may have a barrel or body tube shape. The driving unit may be a driving magnet, but the present invention is not limited thereto, and in some cases, a coil may be disposed.

The driving unit 2116 may correspond to two first rails 2212.

The driving unit 2116 according to the embodiment may be driven using one or more balls. For example, the driving unit 2116 according to the embodiment may include a first ball 2117 disposed between the first guide part 2210 and the first lens assembly 2110 and a second ball (not illustrated) disposed between the second guide part 2220 and the second lens assembly 2120.

For example, in the embodiment, the first ball 2117 may include one or more $(1\text{-}1)^{th}$ balls 2117a arranged on an upper side of the first driving unit housing 2112b and one or more $(1\text{-}2)^{th}$ balls 2117 arranged on a lower side of the first driving unit housing 2112b.

In the embodiment, the $(1\text{-}1)^{th}$ ball 2117a among the first ball 2117 may move along a $(1\text{-}1)^{th}$ rail 2212a that is one of the first rails 2212, and the $(1\text{-}2)^{th}$ ball 2117b among the first ball 2117 may move along a $(1\text{-}2)^{th}$ rail 2212b that is the other one of the first rails 2212.

According to the embodiment, the first guide part includes the $(1\text{-}1)^{th}$ rail and the $(1\text{-}2)^{th}$ rail, the $(1\text{-}1)^{th}$ rail and the $(1\text{-}2)^{th}$ rail guide the first lens assembly 2110, and thus when the first lens assembly 2110 moves, there is a technical effect in that the accuracy of alignment of an optical axis with the second lens assembly 2120 may be increased.

Referring to FIG. 24B, in the embodiment, the first lens assembly 2110 may include a first assembly groove 2112b1 in which the first ball 2117 is disposed. The second lens assembly 2120 may include a second assembly groove (not illustrated) in which the second ball is disposed.

The first assembly groove 2112b1 of the first lens assembly 2110 may be provided as a plurality of first assembly grooves. In this case, a distance between two first assembly grooves 2112b1 among the plurality of first assembly grooves 2112b1 in the optical axis direction may be greater than a thickness of the first lens barrel 2112a.

In the embodiment, the first assembly groove 2112b1 of the first lens assembly 2110 may have a V shape. Further, the second assembly groove (not illustrated) of the second lens assembly 2120 may have a V shape. The first assembly groove 2112b1 of the first lens assembly 2110 may have a U shape or a shape in contact with the first ball 2117 at two points or three points in addition to a V shape. The second assembly groove (not illustrated) of the second lens assembly 2120 may have a U shape or a shape in contact with the second ball at two points or three points in addition to a V shape.

Referring to FIGS. 23 and 24A, in the embodiment, the first guide part 2210, the first ball 2117, and the first assembly groove 2112b1 may be arranged on a virtual straight line extending from the first sidewall toward the second sidewall. The first guide part 2210, the first ball 2117, and the first assembly groove 2112b1 may be arranged between the first sidewall and the second sidewall.

Figure 25:
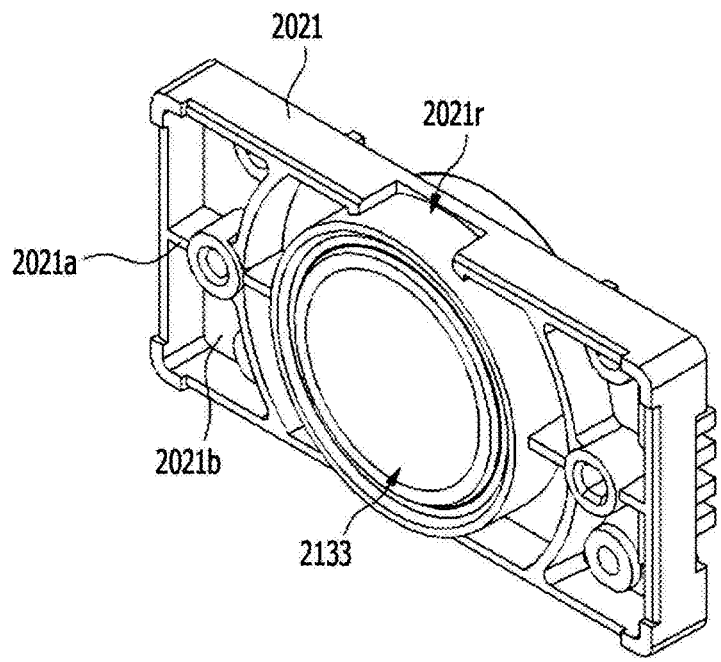
FIG. 25 is a perspective view of a third lens assembly in the actuator illustrated in FIG. 23 according to an embodiment.

Next, FIG. 25 is a perspective view of a third lens assembly 2130 in the actuator illustrated in FIG. 23 according to an embodiment.

Referring to FIG. 25, in the embodiment, the third lens assembly 2130 may include a third housing 2021, a third barrel, and a third lens 2133.

In the embodiment, as the third lens assembly 2130 has a barrel part recess 2021r at an upper end of the third barrel, there are complex technical effects in that the thickness of the third barrel of the third lens assembly 2130 may be uniformly adjusted, and thus the amount of injection molding can be reduced, thereby improving the accuracy of numerical management.

Further, according to the embodiment, in the third lens assembly 2130, the third housing 2021 may include a housing rib 2021a and a housing recess 2021b.

In the embodiment, as the third lens assembly 2130 has the housing recess 2021b in the third housing 2021, there are complex technical effects in that the amount of injection molding can be reduced to increase the accuracy of numerical management, and at the same time, the housing rib 2021a may be provided in the third housing 2021 to secure strength.

Figure 26:
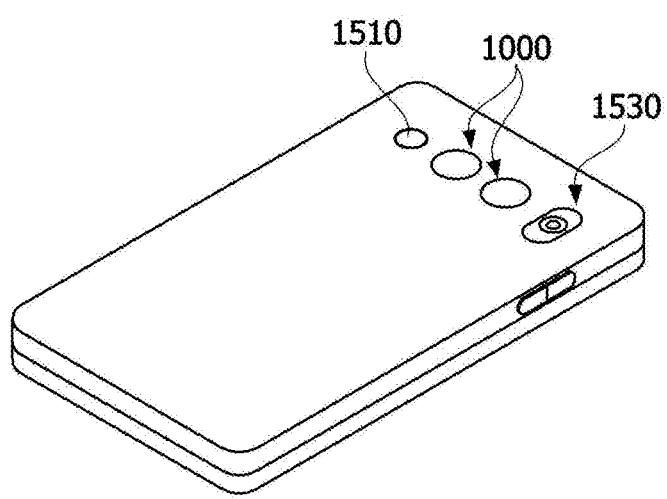
FIG. 26 is a perspective view of a mobile terminal to which the camera module according to an embodiment is applied.

FIG. 26 is a perspective view of a mobile terminal to which the camera module according to an embodiment is applied.

As illustrated in FIG. 26, a mobile terminal 1500 of the embodiment may include the camera module 1000, a flash module 1530, and an auto-focusing device 1510, which are provided on a rear surface thereof.

The camera module 1000 may include an image capturing function and an auto-focusing function. For example, the camera module 1000 may include the auto-focusing function using an image.

The camera module 1000 processes an image frame of a still image or a moving image obtained by an image sensor in a shooting mode and a video call mode.

The processed image frame may be displayed on a predetermined display unit and stored in a memory. A camera (not illustrated) may be disposed on a front surface of a body of the mobile terminal.

For example, the camera module 1000 may include a first camera module and a second camera module, and the OIS together with the AF function or the zooming function may be implemented by the first camera module. Furthermore, at least one of the AF function, the zooming function, and the OIS function may be performed by the second camera module.

The flash module 1530 may include a light emitting element therein that emits light. The flash module 1530 may be operated by a camera operation of the mobile terminal or control of a user.

The auto-focusing device 1510 may include one of packages of a surface light emitting laser element as a light emitting unit.

The auto-focusing device 1510 may include an auto-focusing function using laser. The auto-focusing device 1510 may be mainly used in a condition in which the auto-focusing function using an image of the camera module 1000 is degraded, for example, in a state close to 10 m or less or a dark environment.

The auto-focusing device 1510 may include a light emitting unit including a vertical cavity surface emitting laser (VSSEL) semiconductor element and a light receiving unit, such as a photodiode, which converts light energy into electrical energy.

Figure 27:
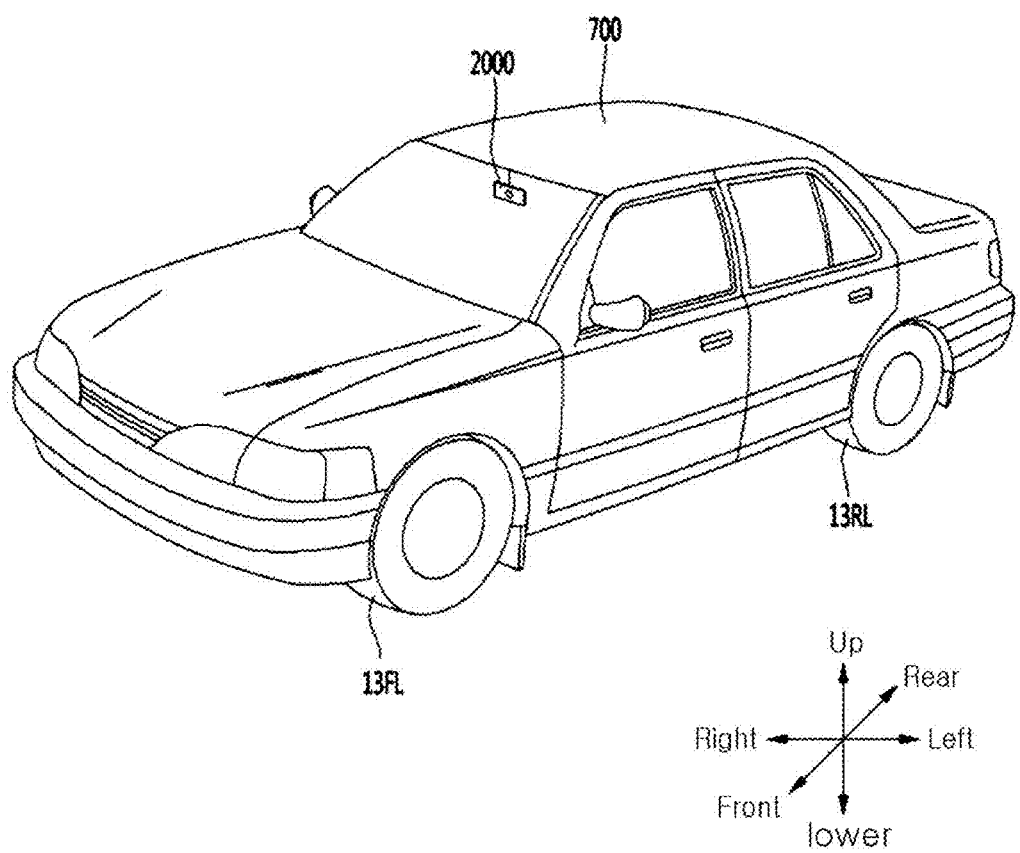
FIG. 27 is a perspective view of a vehicle to which the camera module according to an embodiment is applied.

FIG. 27 is a perspective view of a vehicle to which the camera module according to an embodiment is applied.

For example, FIG. 27 is an external view of a vehicle including a vehicle driving assistance device to which the camera module 1000 according to the embodiment is applied.

Referring to FIG. 27, a vehicle 700 according to the embodiment may be provided with wheels 13FL and 13FR rotated by a power source and a predetermined sensor. The sensor may be a camera sensor 2000, but the present invention is not limited thereto.

The camera sensor 2000 may be a camera sensor to which the camera module 1000 according to the embodiment is applied. The vehicle 700 according to the embodiment may acquire image information through the camera sensor 2000 that captures a front image or a surrounding image, determine whether a lane is identified using the image information, and generate a virtual lane when the lane is not identified.

For example, the camera sensor 2000 may acquire a front image by photographing a front side of the vehicle 700, and a processor (not illustrated) may obtain image information by analyzing an object included in the front image.

For example, when an object such as a lane, an adjacent vehicle, a driving obstacle, and a median, a curb, and a street tree corresponding to an indirect road marker is included in the image captured by the camera sensor 2000, the processor may detect this object and include the detected object in the image information. In this case, the processor may further supplement the image information by acquiring information on a distance from the object detected through the camera sensor 2000.

The image information may be information on the object captured in the image. The camera sensor 2000 may include an image sensor and an image processing module.

The camera sensor 2000 may process the still image or the moving image obtained by the image sensor (for example, a complementary metal-oxide semiconductor (CMOS) or a charge coupled device (CCD)).

The image processing module may process the still image or the moving image acquired through the image sensor, extract necessary information, and transmit the extracted information to the processor.

In this case, the camera sensor 2000 may include a stereo camera to improve the measurement accuracy of the object and further secure information such as a distance between the vehicle 700 and the object, but the present invention is not limited thereto.

Embodiments have been described above, but are merely illustrative, and do not limit the present invention, and those skilled in the art to which the present invention pertains may derive various modifications and applications not illustrated above without departing from the essential feature of the present embodiment. For example, each component specifically illustrated in the embodiments can be modified and implemented. Further, differences related to these modifications and applications should be construed as being included in the scope of the present invention defined in the appended claims.

The invention claimed is:

1. A camera actuator comprising:
   a housing;
   a mover disposed in the housing;
   a tilting plate disposed between the housing and the mover;
   a ball part including a first ball disposed between the housing and the tilting plate and a second ball disposed between the tilting plate and the mover; and
   a driving unit that is disposed in the housing and configured to drive the mover,
   wherein the tilting plate includes a base, a first extension part extending from the base to the mover, and a second extension part facing the first extension part,
   wherein the mover is tilted in a first axis with respect to the first ball pressing a first groove formed in the housing, and
   wherein the mover is tilted in a second axis perpendicular to the first axis with respect to the second ball pressing a second groove formed in the mover.

2. The camera actuator of claim 1,
   wherein the driving unit is configured to rotate the mover in a first direction or a second direction perpendicular to the first direction.

3. The camera actuator of claim 2,
   wherein the first ball includes a (1-1)th ball and a (1-2)th ball arranged side by side in the first direction,
   wherein the second ball includes a (2-1)th ball and a (2-2)th ball overlapping each other in the second direction.

4. The camera actuator of claim 3,
   wherein the (1-1)th ball and the (1-2)th ball are located on an outer surface of the base.

5. The camera actuator of claim 3,
   wherein the (2-1)th ball is located on an inner surface of the first extension part.

6. The camera actuator of claim 3,
   wherein the (2-2)th ball is located on an inner surface of the second extension part.

7. The camera actuator of claim 3,
   wherein the second groove includes a (2-1)th groove on which the (2-1)th ball is seated and a (2-2)th groove on which the (2-2)th ball is seated.

8. The camera actuator of claim 7,
   wherein the (2-1)th ball at least partially overlaps the (2-1)th groove in the first direction.

9. The camera actuator of claim 7,
   wherein the (2-2)th ball at least partially overlaps the (2-2)th groove in the first direction.

10. The camera actuator of claim 7,
    wherein the driving unit includes a driving magnet and a driving coil,
    wherein the driving magnet includes a first magnet, a second magnet, and a third magnet,
    wherein the driving coil includes a first coil, a second coil, and a third coil.

11. The camera actuator of claim 10,
    wherein the first magnet and the second magnet are arranged to be symmetrical to each other on the mover in the first direction.

12. The camera actuator of claim 10,
    wherein the first coil and the second coil are arranged to be symmetrical to each other between the housing and the mover in the first direction.

13. The camera actuator of claim 10,
    wherein the third magnet is disposed on a bottom surface of the mover.

14. The camera actuator of claim 10,
    wherein the third coil is disposed on a bottom surface of the housing.

15. The camera actuator of claim 10,
    wherein the (2-1)th groove is disposed between the first magnet and the base.

16. The camera actuator of claim 10,
wherein the (2-2)th groove is disposed between the second magnet and the base.

17. The camera actuator of claim 1,
wherein the housing includes a coupling member disposed in a housing side part facing the base.

18. The camera actuator of claim 17,
wherein the coupling member and the tilting plate are made of a magnetic material and generate an attractive force.

19. The camera actuator of claim 17,
wherein an attractive force is formed between the coupling member and the first ball.

20. The camera actuator of claim 1, comprising,
a lubricant disposed in the first groove and the second groove.

* * * * *